US011435862B2

(12) United States Patent
Sasaki et al.

(10) Patent No.: US 11,435,862 B2
(45) Date of Patent: Sep. 6, 2022

(54) TOUCH PANEL INPUT DEVICE, TOUCH PANEL INPUT METHOD, AND RECORDING MEDIUM

(71) Applicant: MITSUBISHI ELECTRIC CORPORATION, Tokyo (JP)

(72) Inventors: Yuichi Sasaki, Tokyo (JP); Yuki Furumoto, Tokyo (JP); Kimika Ikegami, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/226,677

(22) Filed: Apr. 9, 2021

(65) Prior Publication Data
US 2021/0232269 A1 Jul. 29, 2021

Related U.S. Application Data
(63) Continuation of application No. PCT/JP2018/038305, filed on Oct. 15, 2018.

(51) Int. Cl.
*G06F 3/044* (2006.01)
*G06F 3/039* (2013.01)
*G06F 3/0362* (2013.01)

(52) U.S. Cl.
CPC .......... *G06F 3/0446* (2019.05); *G06F 3/0362* (2013.01); *G06F 3/0393* (2019.05)

(58) Field of Classification Search
CPC .... G06F 3/0446; G06F 3/0362; G06F 3/0393; G06F 3/0383; G06F 3/03547; G06F 3/0488
See application file for complete search history.

(56) References Cited

U.S. PATENT DOCUMENTS 5,821,935 A * 10/1998 Hartman .............. B60Q 1/0082
340/438
5,841,428 A * 11/1998 Jaeger ................. G02F 1/13306
345/184

(Continued)

FOREIGN PATENT DOCUMENTS

JP   JR 2013-178678 A   9/2013
JP   2015-118663 A      6/2015

(Continued)

OTHER PUBLICATIONS

Sato et al., "Touché: Enhancing Touch Interaction on Humans, Screens, Liquids, and Everyday Objects", Proceedings of the SIGCHI Conference on Human Factors in Computing Systems, 2012, pp. 483-492.

*Primary Examiner* — Benyam Ketema
(74) *Attorney, Agent, or Firm* — Birch, Stewart, Kolasch & Birch, LLP

(57) ABSTRACT

A touch operation is performed on a touch panel on which a knob for input operation can be placed, using the knob or another operation object. A touch detection unit detects the touch operation in a first detection method and a second detection method which are different from each other. Based on the result of detection in the first detection method, a knob touch point determining unit identifies the position where the touch operation has been performed by the knob, and outputs the touch information. A knob-finger contact determining unit determines whether a finger is in contact with the knob based on the touch information and the result of detection in the second detection method. It is possible to perform, without fail, the determination as to whether a knob or another object is in contact with the touch panel, and whether a finger is in contact with the knob which is in contact with the touch panel.

27 Claims, 31 Drawing Sheets

(56) References Cited

U.S. PATENT DOCUMENTS

| | | | | |
|---|---|---|---|---|
| 6,704,032 B1* | 3/2004 | Falcon | G06F 3/0481 | |
| | | | | 715/765 |
| 7,084,859 B1* | 8/2006 | Pryor | G06F 3/0488 | |
| | | | | 345/173 |
| 9,310,901 B2* | 4/2016 | Wussler | G06F 3/0393 | |
| 9,547,428 B2* | 1/2017 | Lengeling | G06F 3/04847 | |
| 10,496,187 B2* | 12/2019 | Zuber | G06F 3/0346 | |
| 11,029,719 B2* | 6/2021 | Klein | G06F 3/016 | |
| 2001/0007449 A1* | 7/2001 | Kobachi | G06F 3/0421 | |
| | | | | 345/156 |
| 2004/0056781 A1* | 3/2004 | Rix | G06F 3/0202 | |
| | | | | 341/20 |
| 2004/0222968 A1* | 11/2004 | Endo | G06F 3/0338 | |
| | | | | 345/161 |
| 2005/0068135 A1* | 3/2005 | Nishino | G05G 9/047 | |
| | | | | 335/207 |
| 2005/0164148 A1* | 7/2005 | Sinclair | G06F 3/0224 | |
| | | | | 434/112 |
| 2006/0026535 A1* | 2/2006 | Hotelling | G06F 3/04883 | |
| | | | | 715/863 |
| 2006/0256090 A1* | 11/2006 | Huppi | G06F 1/1616 | |
| | | | | 345/173 |
| 2008/0192025 A1* | 8/2008 | Jaeger | G06F 3/0421 | |
| | | | | 345/173 |
| 2008/0211779 A1* | 9/2008 | Pryor | G06F 3/0488 | |
| | | | | 345/173 |
| 2008/0238879 A1* | 10/2008 | Jaeger | G06F 3/0338 | |
| | | | | 345/173 |
| 2010/0079403 A1* | 4/2010 | Lynch | G06F 3/04886 | |
| | | | | 345/173 |
| 2010/0090974 A1* | 4/2010 | Jung | G06F 3/0393 | |
| | | | | 345/173 |
| 2010/0265201 A1* | 10/2010 | Oh | G06F 3/0234 | |
| | | | | 345/184 |
| 2010/0328203 A1* | 12/2010 | Hsu | G06F 1/1607 | |
| | | | | 345/157 |
| 2011/0157056 A1* | 6/2011 | Karpfinger | G06F 3/041 | |
| | | | | 345/173 |
| 2011/0298721 A1* | 12/2011 | Eldridge | G06F 3/0362 | |
| | | | | 345/173 |
| 2013/0093702 A1* | 4/2013 | Argiro | G06F 3/04886 | |
| | | | | 345/173 |
| 2014/0168132 A1* | 6/2014 | Graig | G06F 3/0362 | |
| | | | | 345/174 |
| 2014/0253446 A1* | 9/2014 | Petersen | G06F 1/1607 | |
| | | | | 345/161 |
| 2014/0267118 A1* | 9/2014 | Thompson | G06F 3/03543 | |
| | | | | 345/173 |
| 2015/0136829 A1* | 5/2015 | Howes | B25C 1/008 | |
| | | | | 227/140 |
| 2015/0179122 A1* | 6/2015 | Brown | G06F 3/0443 | |
| | | | | 345/174 |
| 2015/0261297 A1* | 9/2015 | Quek | G06F 3/04886 | |
| | | | | 345/174 |
| 2015/0286294 A1* | 10/2015 | Köpcke | G06F 3/0362 | |
| | | | | 345/163 |
| 2017/0316901 A1* | 11/2017 | Sawada | H01H 19/02 | |
| 2018/0024649 A1* | 1/2018 | Uno | G06F 3/0338 | |
| | | | | 345/174 |
| 2018/0059815 A1* | 3/2018 | Craig | G06F 3/0362 | |
| 2018/0225022 A1* | 8/2018 | Choi | G06F 3/041 | |
| 2018/0260069 A1* | 9/2018 | Suzuki | G06F 3/0412 | |
| 2019/0272068 A1* | 9/2019 | Newman | G06F 3/03547 | |
| 2019/0310718 A1* | 10/2019 | Eraslan | G06F 3/0393 | |
| 2019/0391671 A1* | 12/2019 | Pfau | G06F 3/0393 | |
| 2020/0034018 A1* | 1/2020 | Choi | G06F 3/041 | |
| 2020/0278761 A1* | 9/2020 | Takaoka | G06F 3/0338 | |
| 2020/0301547 A1* | 9/2020 | Mori | G06F 3/044 | |

FOREIGN PATENT DOCUMENTS

| | | | | |
|---|---|---|---|---|
| JP | 2016-540317 A | 12/2016 | | |
| JP | 2018-147396 A | 9/2018 | | |
| WO | WO2016166793 | * 10/2016 | | G06F 3/041 |
| WO | WO2016/166793 A1 | 7/2017 | | |

* cited by examiner

FIG. 10(a) NO CONTACT
FIG. 10(g)
FIG. 10(m)
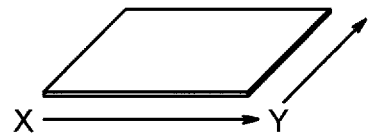
FIG. 10(b) CONTACT BY FINGER
FIG. 10(h)
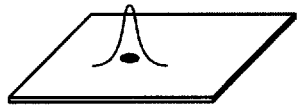
FIG. 10(n)
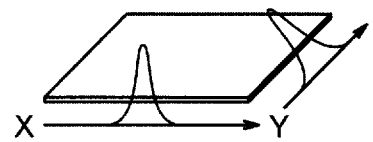
FIG. 10(c) ATTACHMENT OF WATER
FIG. 10(i)
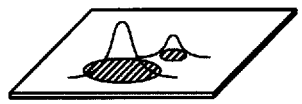
FIG. 10(o)
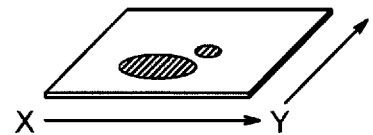
FIG. 10(d) CONTACT BY FINGER WITH PART WHERE WATER IS ATTACHED
FIG. 10(j)
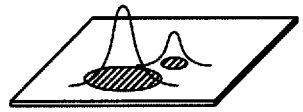
FIG. 10(p)
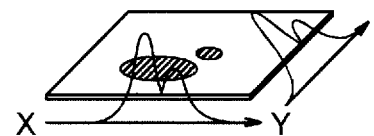
FIG. 10(e) CONTACT BY KNOB
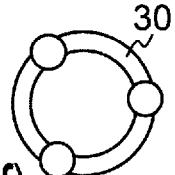
FIG. 10(k)
FIG. 10(q)
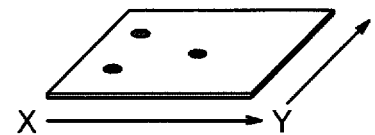
FIG. 10(f) FINGER IN CONTACT WITH KNOB
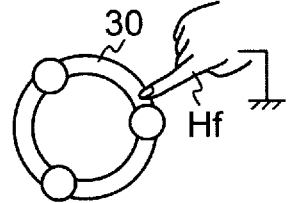
FIG. 10(l)
FIG. 10(r)
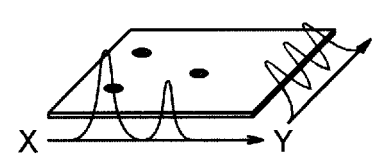

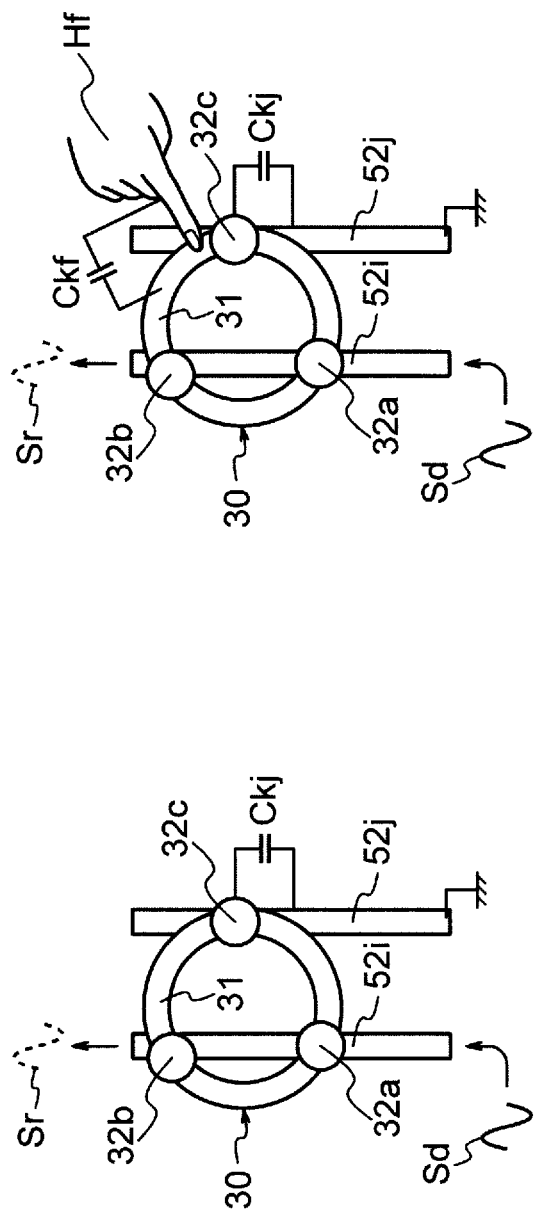

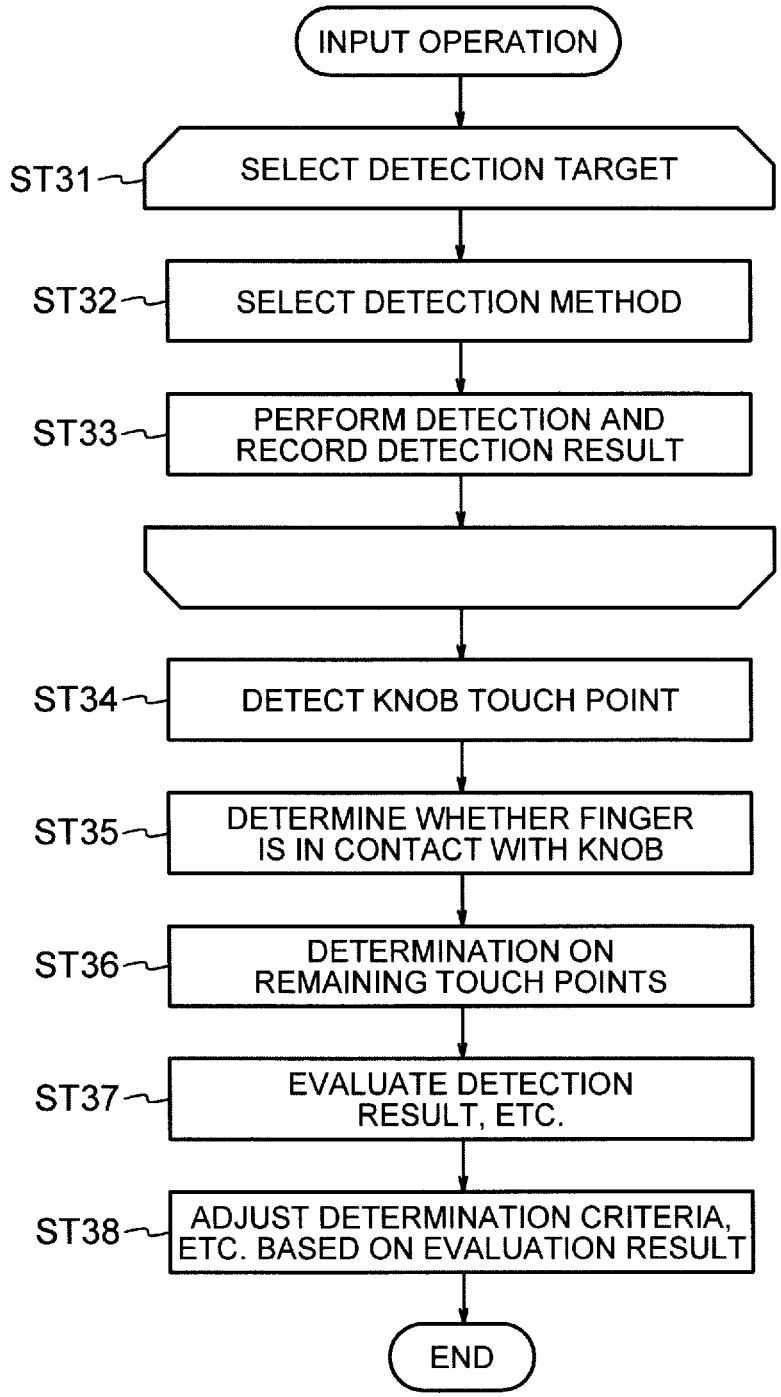

FIG. 32

| DETECTION TARGET | IMPEDANCE | DIELECTRIC CONSTANT | NUMBER OF TOUCH POINTS | AREA OF CONTACT |
|---|---|---|---|---|
| FINGER 1 | R1 | ε1 | 1 | S1 |
| FINGER 2 | R2 | ε2 | 2 | S2 |
| ⋮ | | | | |
| KNOB 1 | Rm | εm | 3 | Sm |
| KNOB 2 | Rm+1 | εm+1 | 4 | Sm+1 |
| ⋮ | | | | |
| STYLUS PEN | Ri | εi | 1 | Si |
| WATER 1 | Rj | εj | N | UNDETERMINED |
| ⋮ | | | | |

FIG. 33

| DETECTION TARGET | DETECTION METHOD | OPTIMUM DETECTION METHOD | SENSITIVITY (S/N RATIO) | SENSITIVITY UNDER FINGER CONTACT | COORDINATE ACCURACY |
|---|---|---|---|---|---|
| FINGER 1 | METHOD 1 | METHOD 1 | A1,1 [dB] | - | A1,1 [mm] |
| | METHOD 2 | | A1,2 [dB] | - | A1,2 [mm] |
| FINGER 2 | METHOD 1 | METHOD 1 | A2,2 [dB] | - | A2,2 [mm] |
| | METHOD 2 | | A2,2 [dB] | - | A2,2 [mm] |
| ⋮ | | | ⋮ | - | ⋮ |
| KNOB 1 | METHOD 1 | METHOD 2 | Am,1 [dB] | Bm,1 [dB] | Am,1 [mm] |
| | METHOD 2 | | Am,2 [dB] | Bm,2 [dB] | Am,2 [mm] |
| | METHOD 3 | | Am,3 [dB] | Bm,3 [dB] | Am,3 [mm] |
| KNOB 2 | | METHOD 2 | Am+1,2 [dB] | Bm+1,2 [dB] | Am+1,2 [mm] |
| ⋮ | | | ⋮ | ⋮ | ⋮ |
| STYLUS PEN | | METHOD 4 | Ai,4 [dB] | | Ai,4 [mm] |
| WATER 1 | METHOD 2 | | Aj,2 [dB] | | Aj,2 [mm] |
| ⋮ | | | | | |

TOUCH PANEL INPUT DEVICE, TOUCH PANEL INPUT METHOD, AND RECORDING MEDIUM

CROSS REFERENCE TO RELATED APPLICATION

This application is a continuation application of International Application No. PCT/JP2018/038305, filed Oct. 15, 2018, the disclosure of which is incorporated herein by reference.

TECHNICAL FIELD

The present invention relates to a touch panel input device, a touch panel input method, and a recording medium.

BACKGROUND ART

A device (touch panel input device) provided with a dial-like member (knob) placed on a touch panel (touch screen), for allowing, not only input operation by a finger on the touch panel, but also for allowing input operation by having the user hold the knob and turn or slide the knob has been proposed (Patent Reference 1).

The input operation by means of the knob or a finger on the touch panel is detected for example based on variation in the electrostatic capacitance.

PATENT REFERENCES

Patent Reference 1: Japanese Patent Publication No. 2013-178678 (Paragraphs 0013-0020, FIG. 1 to FIG. 3)

NON-PATENT REFERENCES

Non-Patent Reference 1: Sato, M. et al. 2012. Touché: enhancing touch interaction on humans, screens, liquids, and everyday objects. Proceedings of the SIGCHI Conference on Human Factors in Computing Systems (2012), 483-492.

A problem associated with the conventional touch panel input device is that it is not possible to determine, without fail, whether the touch panel is contacted by a knob or something (e.g. a finger) other than a knob and whether or not a knob contacting the touch panel is contacted by a finger.

SUMMARY

An object of the present invention is to make it possible to determine, without fail, whether the touch panel is contacted by a knob or something (e.g., a finger) other than a knob and whether or not a knob contacting the touch panel is contacted by a finger.

A touch panel input device according to the present invention includes:
a touch panel on which a knob for input operation can be placed, and a touch operation is performed by means of said knob or an operation object other than said knob; and
processing circuitry
to detect the touch operation on said touch panel in a first detection method and a second detection method which are different from each other;
to identify a position where the touch operation is performed by said knob as a knob touch point, based on a result of detection in said first detection method,
to output touch information concerning said knob touch point; and
to determine whether a finger is in contact with said knob, based on said touch information, and a result of detection in said second detection method, wherein,
touch points which consist of one or more response points at which an electrostatic capacitance variation satisfying a predetermined condition has occurred in the detection in said first detection method, and which satisfy a predetermined condition are identified as said knob touch points.

According to the present invention, it is possible to determine, without fail, whether the touch panel is contacted by a knob or something (e.g., a finger) other than a knob and whether or not a knob contacting the touch panel is contacted by a finger.

BRIEF DESCRIPTION OF THE DRAWINGS

FIGS. 10(a) to 10(r) are diagrams showing variations in the capacitance detected when a knob and a conductor other than a knob contact the touch panel.

FIGS. 15(a) and 15(b) are diagrams showing a different example of the detection method.

FIG. 31 is a flowchart showing a procedure of processes performed by the operation input processing unit shown in FIG. 29.

FIG. 32 is a diagram showing an example of data showing features of each detection target, stored in a memory shown in FIG. 30.

FIG. 33 is a diagram showing an example of data showing the detection method, the optimum detection method, and the like for each detection target, stored in the memory shown in FIG. 30.

DETAILED DESCRIPTION

First Embodiment

Figure 1:
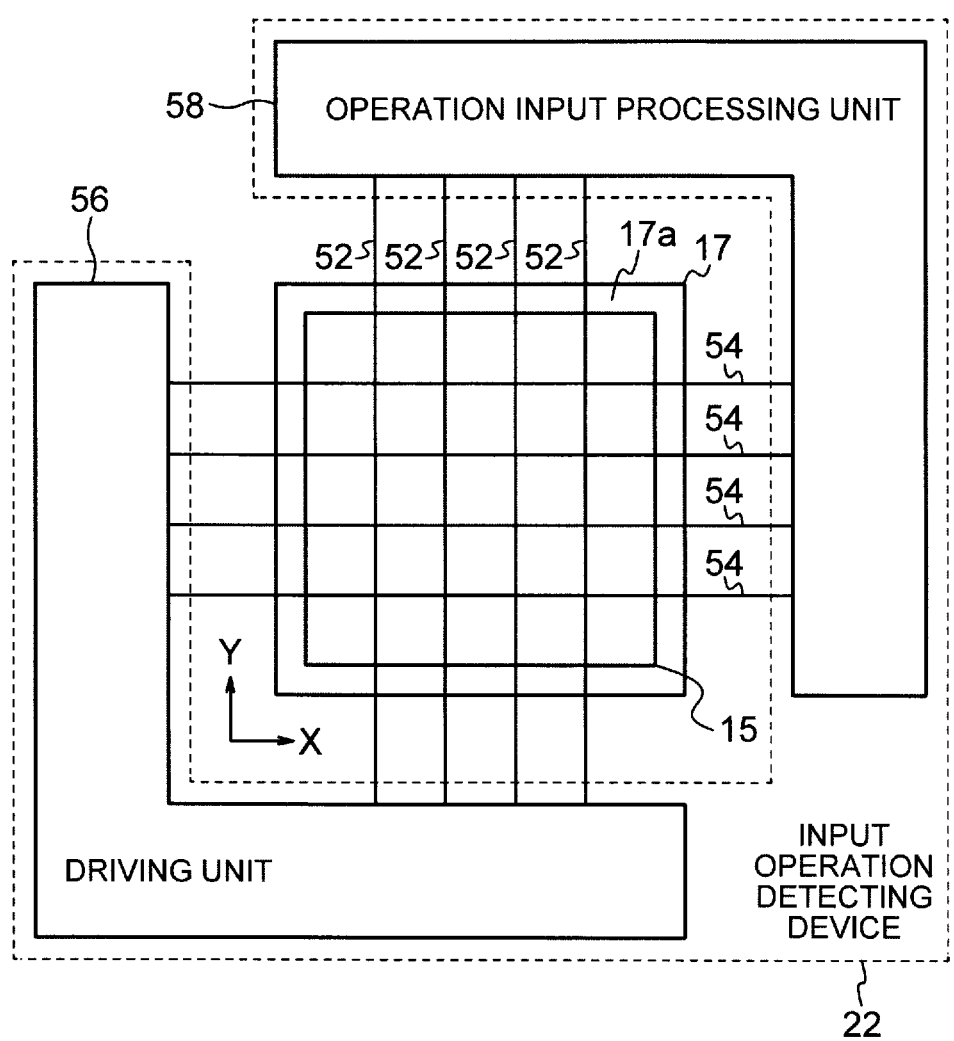
FIG. 1 is a schematic view showing a touch input device of a first embodiment of the present invention.
Figure 2:
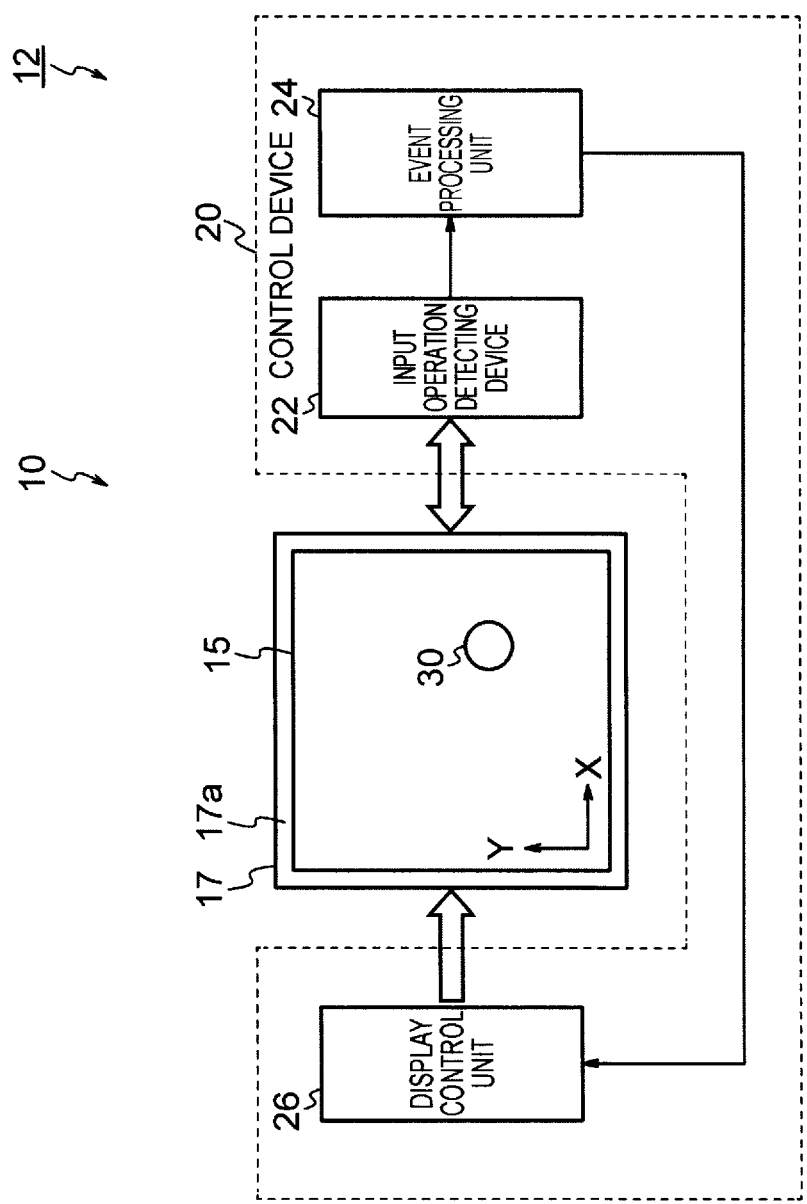
FIG. 2 is a schematic view showing a display device with a touch detection function, provided with a touch input device shown in FIG. 1.

FIG. 1 shows a touch input device 10 of a first embodiment of the present invention, and FIG. 2 shows a display device 12 with a touch detection function, provided with the touch input device 10 shown in FIG. 1.

The display device 12 with a touch detection function 12 is provided with an operation input function and a display function, and includes a touch panel 15, a display device 17, and a control device 20.

The control device 20 includes an input operation detecting device 22, an event processing unit 24, and a display control unit 26.

The touch panel 15 and the input operation detecting device 22 in combination form the touch input device 10.

The touch panel 15 is provided over a display surface 17a of the display device 17 so as to cover at least part of the display surface 17a.

The display device 17 is formed, for example, of a liquid crystal display device or an EL (Electroluminescence) display device. The display device 17 is controlled by the display control unit 26 to display an image. At the time of input operation using the touch input device 10, the display device 17 displays an image for assisting the input operation.

The touch input device 10 is provided with a knob 30 for input operation, placed on the touch panel 15, and enables the user to perform the input operation by holding, and rotating or sliding the knob 30.

The touch input device 10 also enables input operation on the touch panel 15 by means of an operation object other than the knob 30. As the operation object other than the knob 30, a finger, a stylus pen or the like is used.

The input operation detecting device 22 detects the input operation on the touch panel 15. The input operation includes a touch operation.

The input operation detecting device 22 identifies the position where the touch operation by means of an operation object is made on the touch panel 15.

The touch operation is performed by causing an operation object to contact or approach the touch panel 15. In the following description, it is assumed that the operation object is caused to contact the touch panel 15.

Also, in the following description, the input operation detecting device 22 performs determination as to whether a finger is in contact with the knob 30. However, the input operation detecting device 22 may perform determination as to whether a finger is in at least one of the state of being in contact with the knob 30 and the state of being in proximity to the knob 30.

The position on the touch panel 15 is represented by XY coordinates. That is, a first direction on the touch panel 15 is taken as an X direction, and a second direction orthogonal to the first direction is taken as a Y direction, a position in the X direction is represented by an X coordinate and a position in the Y direction is represented by a Y coordinate.

As shown in FIG. 1, the touch panel 15 has a first group of electrodes 52 and a second group of electrodes 54 extending along the display surface 17a of the display device 17. In FIG. 1, the number of the first group of electrodes 52 and the number of the second group of electrodes 54 are both assumed to be four, for the sake of simplicity.

The first group of electrodes 52 extend in the second direction (Y direction) at different positions in the first direction (X direction) and are referred to as X coordinate detecting electrodes, or simply as X electrodes.

The second group of electrodes 54 extend in the first direction (X direction) at different positions in the second direction (Y direction) and are referred to as Y coordinate detecting electrodes, or simply as Y electrodes.

The input operation detecting device 22 projects the amount of variation in the capacitance (capacitance variation amount) due to contact of the operation object with the touch panel 15 onto the X axis and the Y axis, and performs, for example, identification of the position of contact of the operation object on the touch panel 15, i.e., the touch position.

The input operation detecting device 22 includes a driving unit 56 and an operation input processing unit 58.

The driving unit 56 applies a drive signal to the electrodes 52 and 54 of the touch panel 15. In response to the drive signal, a detection signal corresponding to the capacitance variation amount at each position or each part of the touch panel 15 is obtained from the electrodes 52 and 54 of the touch panel 15.

The operation input processing unit 58 detects the capacitance variation amount at each position or each part of the touch panel 15 based on the detection signal, and performs identification of the touch position, identification of the operation object used for the touch operation, identification of the state of the operation object, and the like, based on the result of the detection.

The detection of the capacitance variation amount is performed in two different methods, i.e., a first detection method and a second detection method. In the following description, it is assumed that the first detection method is a mutual capacitance method, and the second detection method is a self capacitance method.

In the mutual capacitance method, one group of electrodes, e.g., X electrodes are used as transmission electrodes, and the other group of electrodes, e.g., Y electrodes are used as reception electrodes, and capacitance variation amounts at the intersections (intersecting parts) of the X electrodes and the Y electrodes are detected.

For example, the driving unit 56 sequentially selects one of the first group of electrodes and the second group of electrodes, e.g., the first group of electrodes (X electrodes), and applies the drive signal to the selected electrode, and the operation input processing unit 58 determines, from the detection signal appearing on the other group of electrodes, e.g., the second group of electrodes (Y electrodes) and the information identifying the electrode in the first group being selected, the capacitance variation amount at each position of the touch panel 15 (intersection between the X electrode and the Y electrode).

By arranging the capacitance variation amounts for all the intersections on a two-dimensional plane, a two-dimensional profile of the capacitance variation amounts is formed.

In the mutual capacitance method, it is possible to independently detect the capacitance variation amounts at a plurality of intersections between the X electrodes and the Y electrodes, so that even when the capacitance variation occurs at a plurality of positions simultaneously, such positions can be identified uniquely.

In the self capacitance method, the first group of electrodes and the second group of electrodes (X electrodes and Y electrodes) are sequentially selected, and the capacitance variation amount on the selected electrode is detected.

For example, the driving unit 56 sequentially selects the X electrodes and Y electrodes, and applies a drive signal to the selected electrode. The operation input processing unit 58 detects the capacitance variation amount on the selected electrode from the detection signal appearing on the selected electrode. When the driving unit 56 applies the drive signal to the selected electrode, it also performs control to maintain the potential of the electrodes in the neighborhood of the selected electrode to be the same as the potential of the selected electrode. This control is performed, for example, by applying the drive signal identical to the drive signal applied to the selected electrode, to the electrodes in the neighborhood of the selected electrode.

The operation input processing unit 58 acquires the capacitance variation amount for each electrode. A one-dimensional profile of the capacitance variation amount in the X direction is obtained from the capacitance variation amounts pertaining to all the X electrodes, and a one-dimensional profile of the capacitance variation amount in the Y direction is obtained from the capacitance variation amounts pertaining to all the Y electrodes.

In the self capacitance method, when a capacitance variation on one electrode is detected, it can be determined that the capacitance variation has occurred at some position in the longitudinal direction (extending direction) of that electrode, but the exact position in the longitudinal direction of the electrode at which the capacitance variation has occurred cannot necessarily be identified.

When the capacitance variation occurs at one point on the touch panel, it is possible to uniquely identify the position (X coordinate and Y coordinate) where the capacitance variation has occurred, by combining the results of detection at the plurality of X electrodes and the results of detection at the plurality of Y electrodes.

When the capacitance variation occurs simultaneously at two or more places on the touch panel, the position where the capacitance variation has occurred cannot be uniquely identified.

Figure 3:
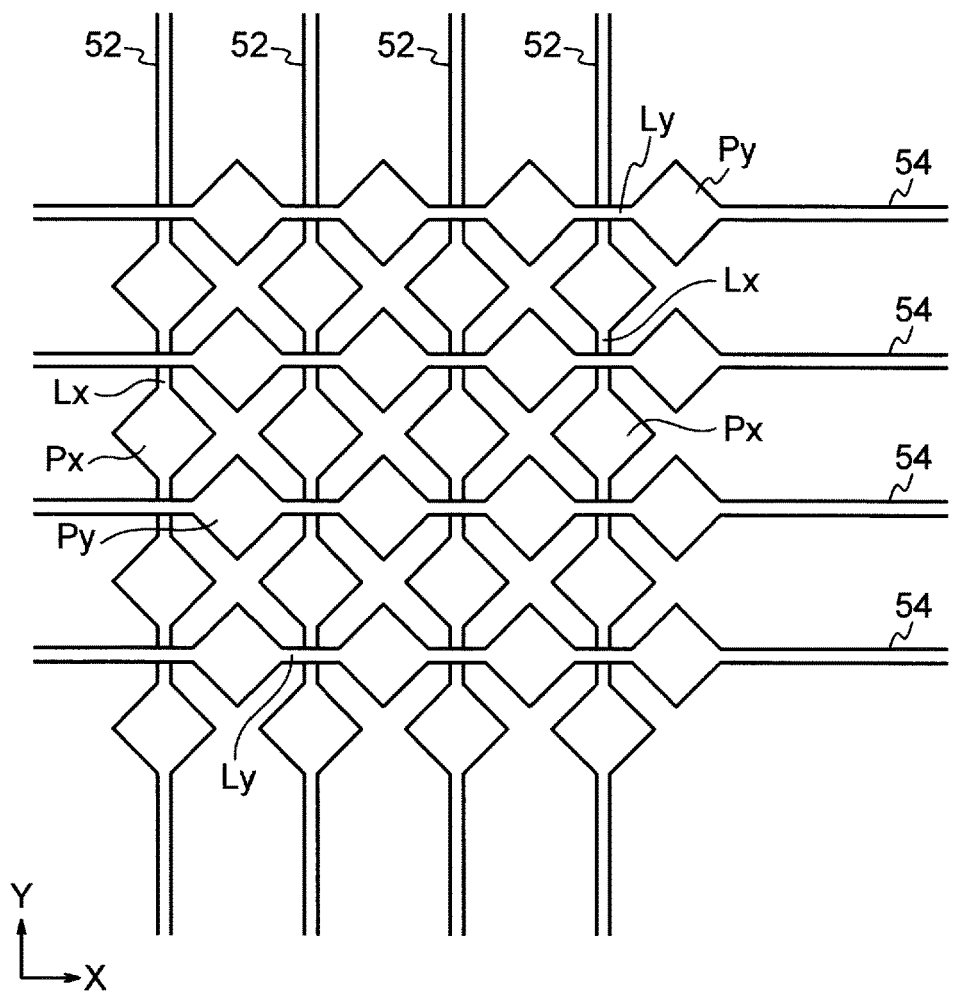
FIG. 3 is a view showing a concrete example of shapes of electrodes of the touch panel shown in FIG. 1.

In the following description, it is assumed that each of the electrodes 52 and 54 has a constant width. However, each of the electrodes 52 and 54 may, for example, be formed of a plurality of pads Px, Py, and connecting parts Lx, Ly connecting the pads Px, Py together, as shown in FIG. 3. The pad Px, Py may be relatively wide and the connecting parts Lx, Ly may have a width smaller than the pads Px, Py. The pads Px, Py may be of a rhombus shape as illustrated.

The pads Px of the X electrodes 52 and the pads Py of the Y electrodes 54 are so disposed as not to coincide as seen from the above, and the connecting parts Lx of the X electrodes 52 and the connecting parts Ly of the Y electrodes 54 may be formed to intersect with each other as seen from the above.

The knob 30 is placed on the touch panel 15, and is provided to be rotatable and slidable (movable).

Figure 4:
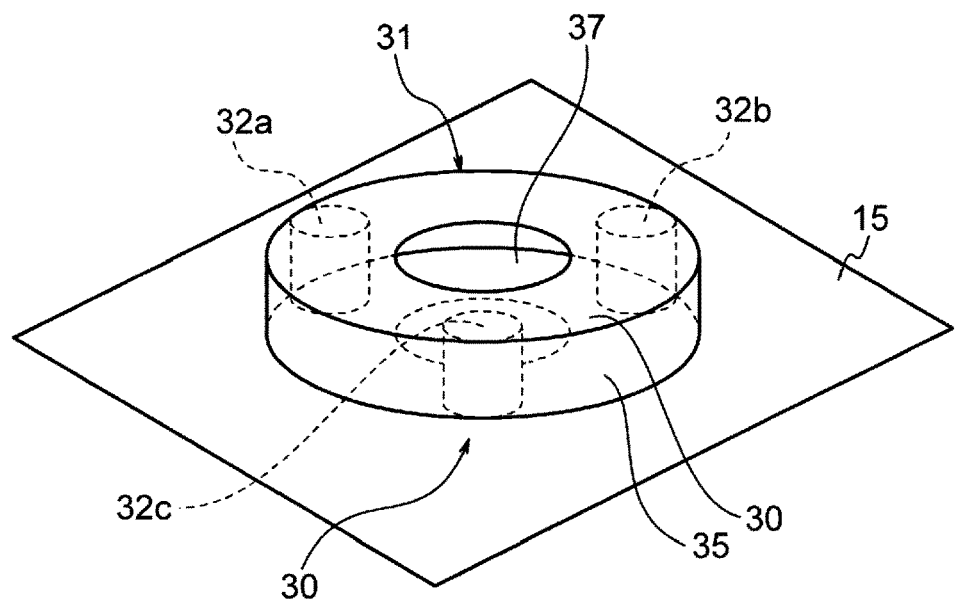
FIG. 4 is a perspective view of an example of a knob shown in FIG. 2.
Figure 5A:
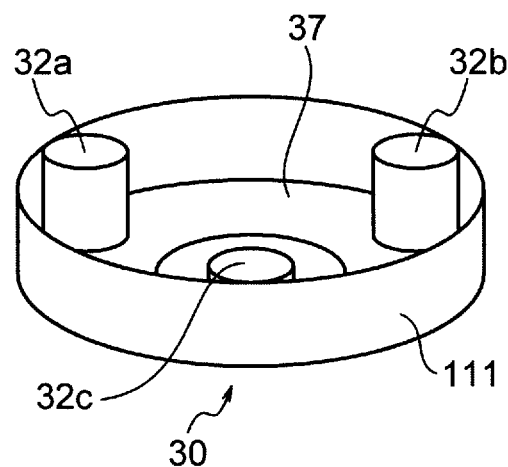
FIG. 5(a) is a perspective view of the knob shown in FIG. 4, with a top plate being removed.
Figure 5B:
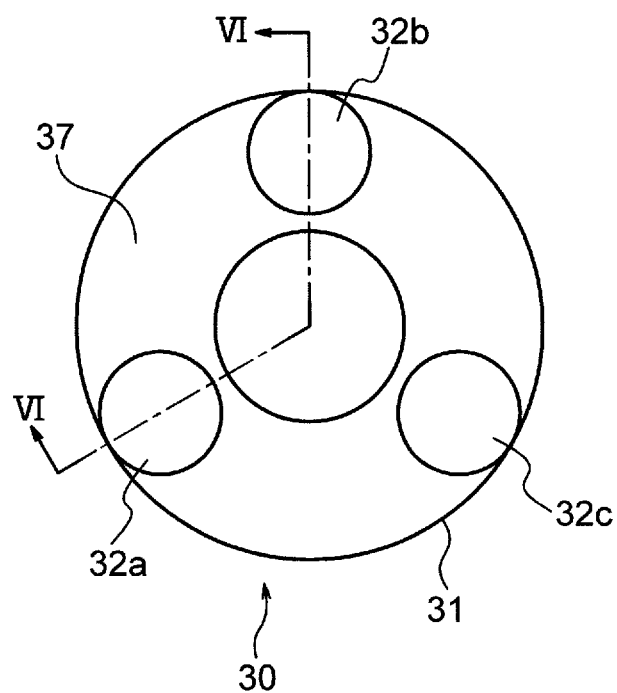
FIG. 5(b) is a plan view of the knob shown in FIG. 4, with the top plate being removed.
Figure 6:
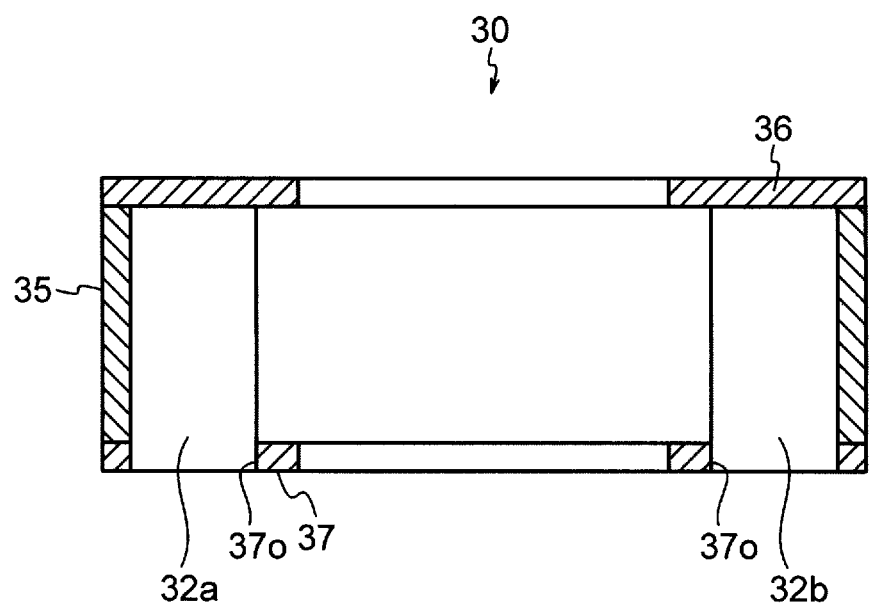
FIG. 6 is a cross-sectional view along the chain line VI-VI in FIG. 5(b).

An example of the knob 30 is explained referring to FIG. 4, FIGS. 5(*a*) and 5(*b*) and FIG. 6.

FIG. 4 is a perspective view of the knob 30 placed on the touch panel 15. The illustrated knob 30 has a case 31, and operation members 32*a*, 32*b*, 32*c* disposed in the case 31.

For example, the case 31 has a cylindrical side wall part 35, an annular top plate 36, and an annular bottom plate 37.

FIG. 5(*a*) is a perspective view of the knob 30 shown in FIG. 4, with the top plate 36 removed, FIG. 5(*b*) is a plan view of the knob 30 shown in FIG. 4, with the top plate 36 removed, and FIG. 6 is a cross-sectional view along the chain line VI-VI in FIG. 5(*b*). Incidentally, in FIG. 4, and FIGS. 5(*a*) and 5(*b*), the side wall part 35, the top plate 36 and the bottom plate 37 are shown to have no thickness, whereas in FIG. 6, the side wall part 35, the top plate 36 and the bottom plate 37 are shown to have a certain thickness.

The top plate 36 is attached to the upper end of the side wall part 35, and the bottom plate 37 is attached to the lower end of the side wall part 35.

The case 31 is formed to have a shape suitable for the user to hold, and the case 31 constitutes a handle part.

The case 31 is formed of an insulating material.

A layer or film of a conductor is formed on at least part of the side wall part 35 and the top plate 36 of the case 31, so that when the user holds the case 31, one or more fingers contact the layer or the film of the conductor.

The operation members 32*a*, 32*b*, 32*c* are cylindrical, and extend in the direction orthogonal to the top plate 36 and the bottom plate 37.

The operation members 32*a*, 32*b*, 32*c* are fixed to the case 31, and electrically connected to the above-mentioned conductor of the case 31.

The bottom plate 37 has openings 37*o* for permitting passage of the operation members 32*a*, 32*b*, 32*c*, and the operation members 32a, 32b, 32c extend through the above-mentioned openings 37o and are exposed at the lower surface of the case 31.

When the knob 30 is placed on the touch panel 15, the lower ends of the operation members 32a, 32b, 32c contact the touch panel 15.

When the user presses the knob 30 against the touch panel 15, the lower ends of the operation members 32a, 32b, 32c are pressed against the touch panel 15.

Resiliently deformable members may be fixed to the lower ends of the operation members 32a, 32b, 32c. The resiliently deformable members may be a conductor, or an insulator.

In either case, when the user presses the knob 30 against the touch panel 15, by changing the force with which the operation members are pressed, the electrostatic capacitance formed by the operation members and the electrodes of the touch panel can be changed.

Also, the structure may be such that the bottom plate 37 does not have openings, and the lower ends of the operation members 32a, 32b, 32c are separated by the bottom plate 37 from the touch panel 15. In such a case, the bottom plate 37 is formed to be thin, and when the lower surface of the bottom plate 37 is in contact with the touch panel 15, the lower ends of the operation members 32a, 32b, 32c are in proximity to the touch panel 15, whereby the touch operation is performed.

Also, the structure may be such that, when the user presses the knob 30 against the touch panel 15, the bottom plate 37 is resiliently deformable, so that by changing the force by which the knob 30 is pressed against the touch panel 15, the electrostatic capacitances formed by the operation members 32a, 32b, 32c and the electrodes of the touch panel 15 are changed.

The entirety of the operation members 32a, 32b, and 32c may be formed of a conductor. Alternatively, the internal part of each of the operation members 32a, 32b, and 32c may be formed of an insulator, and a layer or film of a conductor may be formed on the surface of the insulator.

The distances between the three operation members 32a, 32b, 32c may be equal. In other words, the three operation members 32a, 32b, and 32c are disposed at the vertex positions of an equilateral triangle.

Incidentally, the number of the operation members is not limited to three, and may be two or less, or four or more. When, for example, the number of the operation member is four, it is desirable that the four operation members are disposed at the vertex positions of a square.

The disposition of a plurality of operation members is not limited to the example described above, as long as the operation members have a predetermined positional relation.

As has been described above, each operation member enables detection of the operating position by causing its lower ends to be in contact with or in proximity to the touch panel thereby causing a capacitance variation.

The operation members are not limited to those of the cylindrical shape as illustrated, but may be those of a prism shape, or of a spherical shape. Also, they may be constituted of conductor patterns formed on the lower part of the case (for example, the lower surface or the upper surface of the bottom plate).

The case 31 may not be of the illustrated shape, but may be of any shape as long as it allows the user to hold.

The input operation detecting device 22 detects input operation by means of the above-described knob 30, and input operation by means of an operation object other than the knob.

In the following description, it is assumed that the operation object other than the knob 30 is a finger.

The capacitance variation generated when the knob 30 contacts the touch panel 15, and the variation in the detection signal due to the capacitance variation will now be described with reference to FIGS. 7(a) to 7(d).

Figure 7A:
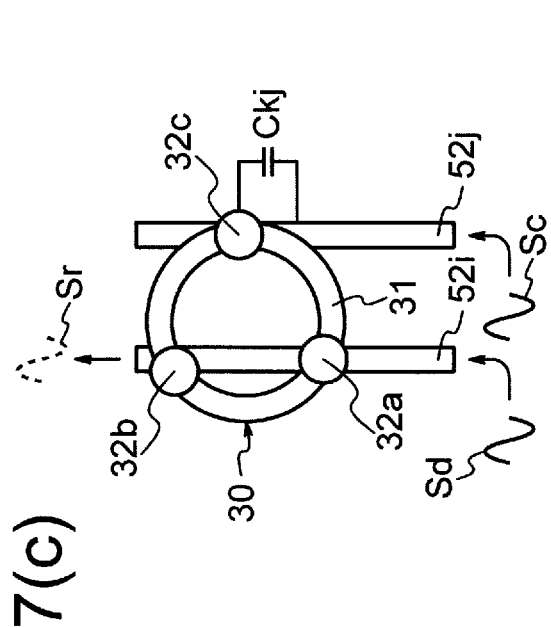
FIGS. 7(a) to 7(d) are diagrams showing variations in capacitances caused when a touch operation is made using a knob, and variations in the detection signal due to the variation in the capacitances.
Figure 7C:
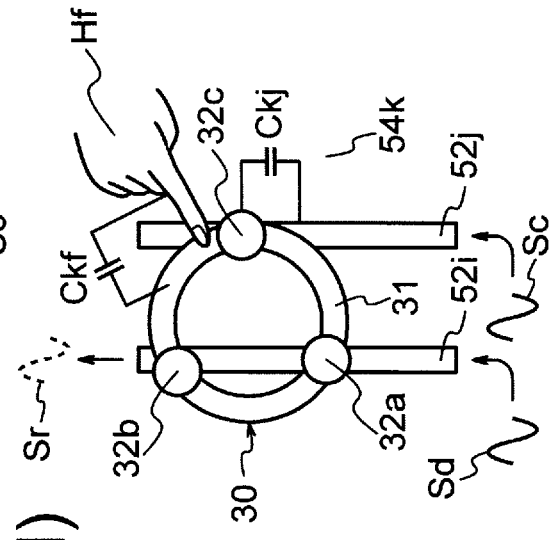
Figure 7B:
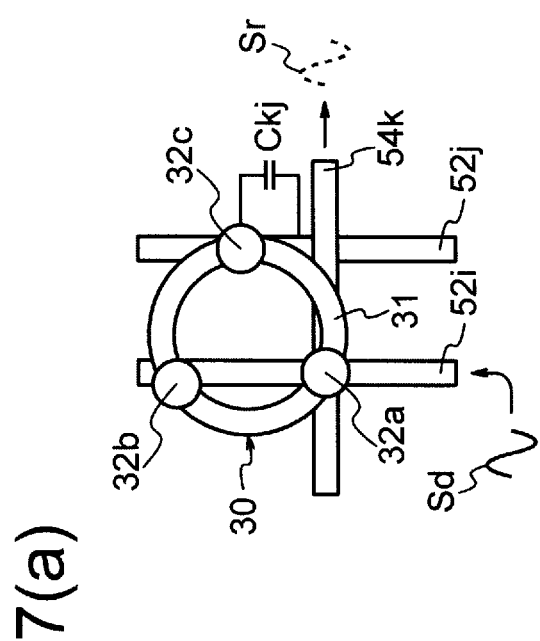
Figure 7D:
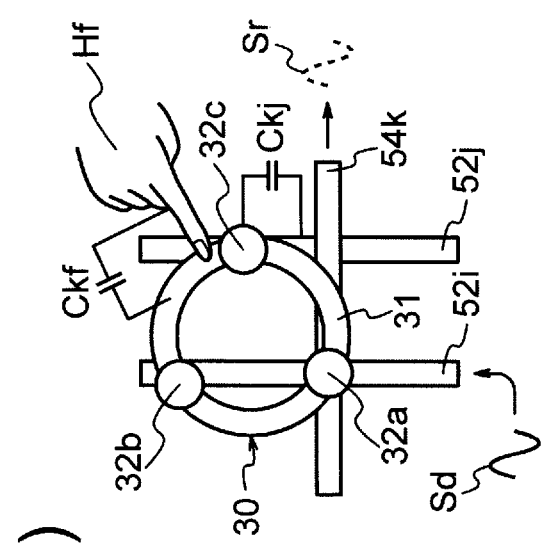

FIGS. 7(a) and 7(b) show variations in the mutual capacitance method, and FIGS. 7(c) and 7(d) show variations in the self capacitance method. FIGS. 7(a) and 7(c) show the states in which the knob 30 is not contacted by a finger, and FIGS. 7(b) and 7(d) show the states in which the knob 30 (specifically its case part 31) is contacted by a finger Hf.

In FIGS. 7(a) to 7(d), some of the X electrodes are denoted by reference characters 52i, 52j, and one of the Y electrodes is denoted by reference characters 54k. It is assumed that the X electrode 52i is selected, while the X electrode 52j is not selected. A drive signal Sd is applied to the selected X electrode 52i.

In the illustrated example, the operation members 32a, 32b are close to the selected electrode 52i, and the operation member 32c is close to the non-selected electrode 52j.

As was described above, the operation members 32a, 32b, 32c are electrically conductive to the case part 31 of the knob 30.

Because the operation member 32c is close to the electrode 52j, an electrostatic capacitance Ckj is formed by the knob 30 and the electrode 52j (FIGS. 7(a) to 7(d)).

When the knob 30 is contacted by a finger Hf as shown in FIGS. 7(b) and 7(d), an electrostatic capacitance Ckf is formed by the knob 30 and the finger Hf, and the knob 30 can be seen as being grounded via the electrostatic capacitance Ckf. This is because the human body can be regarded as being grounded.

Figure 8A:
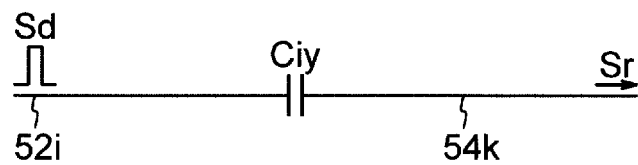
FIGS. 8(a) to 8(c) are equivalent circuit diagrams for explaining the detection in a mutual capacitance method.
Figure 8B:
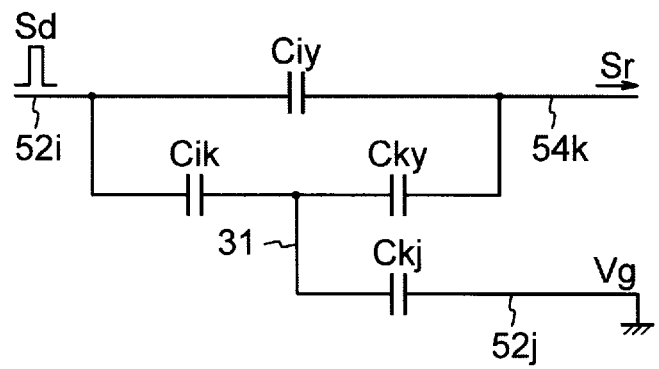
Figure 8C:
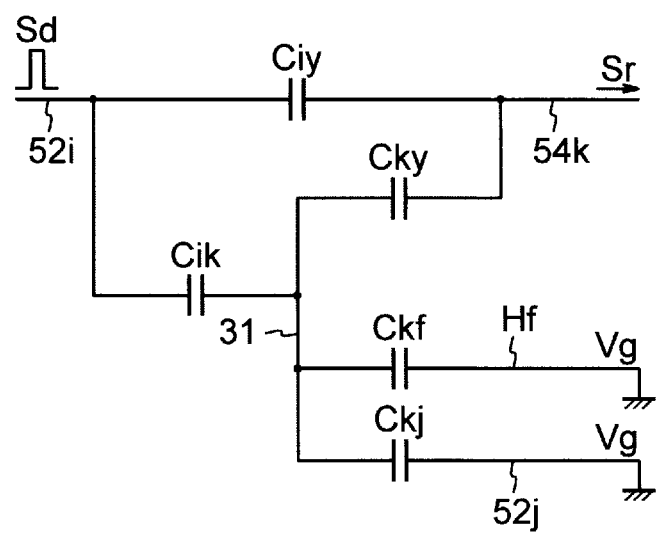

FIGS. 8(a) to 8(c) are equivalent circuit diagrams for explaining the detection in the mutual capacitance method, and showing principal electrostatic capacitances formed in the neighborhood of the intersection between the selected X electrode 52i and the selected Y electrode 54k in the detection.

Figure 9A:
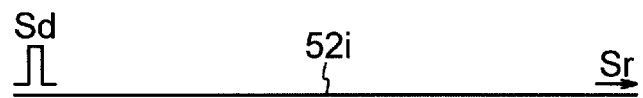
FIGS. 9(a) to 9(c) are equivalent circuit diagrams for explaining the detection in a self capacitance method.
Figure 9B:
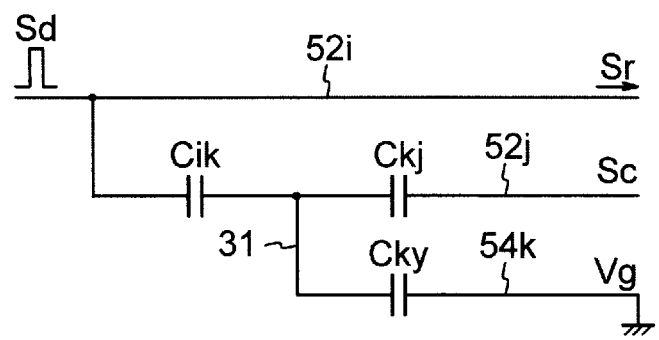
Figure 9C:
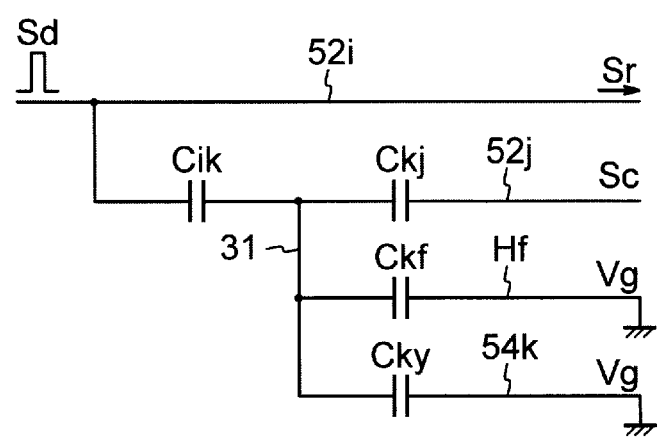

FIGS. 9(a) to 9(c) are equivalent circuit diagrams for explaining the detection in the self capacitance method, and showing the principal electrostatic capacitances formed at and near the selected X electrode 52i in the detection.

FIG. 8(a) and FIG. 9(a) show equivalent circuits for a case in which neither the knob 30 nor a finger HF is in contact with the touch panel 15 (the equivalent circuit of a part of the touch panel 15 where neither the knob 30 nor a finger Hf is in contact with the touch panel 15). FIG. 8(b) and FIG. 9(b) show equivalent circuits for a case shown in FIG. 7(a) and FIG. 7(b) in which the knob 30 which is not contacted by a finger is in contact with the touch panel 15 (the equivalent circuits of a part of the touch panel 15 where the knob 30 which is not contacted by a finger is in contact with the touch panel 15). FIG. 8(c) and FIG. 9(c) show equivalent circuits for a case shown in FIG. 7(b) and FIG. 7(d) in which the knob 30 contacted by a finger is in contact with the touch panel 15 (the equivalent circuits of a part of the touch panel 15 where the knob 30 contacted by a finger is in contact with the touch panel 15).

In FIGS. 8(a) to 8(c) and FIGS. 9(a) to 9(c), Ciy denotes an electrostatic capacitance formed between the electrode 52i and the electrode 54k, Cik denotes an electrostatic capacitance formed between the electrode 52i and the knob 30, Ckj denotes an electrostatic capacitance formed between the knob 30 and the electrode 52j, as mentioned above, Cky denotes an electrostatic capacitance formed between the knob 30 and the electrode 54k, and Ckf denotes an electrostatic capacitance formed between the knob 30 and the finger Hf, as mentioned above.

As shown in FIGS. 7(a) and 7(b), and FIGS. 8(a) to 8(c), in the mutual capacitance method, the drive signal Sd is applied to the selected X electrode 52i, and the drive signal Sd is not applied to the non-selected X electrode 52j, and the non-selected electrode 52j is maintained, for example, at the ground potential Vg. The Y electrode 54k is serving as a reception electrode, and a detection signal Sr is obtained from the Y electrode 54k. For example, the drive signal Sd is in the form of a voltage pulse, and the detection signal Sr is a signal due to the current flowing through the Y electrode 54k.

Because the drive signal Sd is not applied to the non-selected X electrode 52j, and the non-selected X electrode 52j is maintained at the ground potential Vg, it can be seen that the knob 30 is grounded via the electrostatic capacitance Ckj.

For this reason, the detection signal Sr differs depending on whether or not the knob 30 is in contact with the touch panel 15.

That is, if the knob 30 is in contact with the touch panel 15 (FIGS. 8(b), 8(c)), a charging current flows to the electrostatic capacitance Ckj when the drive signal Sd is applied, whereas if the knob 30 is not in contact with the touch panel 15 (FIG. 8(a)), no such a charging current flows when the drive signal Sd is applied. This difference causes a difference in the detection signal Sr. Based on this difference, determination can be made as to whether or not the knob 30 is in contact with the touch panel 15.

As has been described, in the mutual capacitance method, it is possible to determine whether or not the knob 30 is in contact with the touch panel 15 using the capacitance variation due to the electrostatic capacitance Ckj.

As shown in FIGS. 7(c) and 7(d) and FIGS. 9(a) to 9(c), in the self capacitance method, the drive signal Sd is applied to the selected X electrode 52i, a detection signal is obtained from the same electrode 52i. The drive signal Sd is, for example, in the form of a voltage pulse, and the detection signal Sr is a signal due to the current flowing through the electrode 52i.

In the self capacitance method, a signal Sc similar to the drive signal Sd is applied to the electrode(s) 52j in the neighborhood of the selected X electrode 52i, so that the electrode(s) 52j in the neighborhood is maintained at the same potential as the selected electrode 52i.

Because the non-selected electrode(s) 52j is maintained at the same potential as the selected electrode 52i, as shown in FIG. 7(c) and FIG. 9(b), even when the knob 30 is in contact with the touch panel 15, the electrostatic capacitance Ckj gives almost no effect on the detection signal Sr.

Therefore, the detection signal Sr obtained when the drive signal Sd is applied to the selected electrode 52i does not differ much from the detection signal Sr when the knob 30 is not in contact with the touch panel 15 (FIG. 9(a)).

In contrast, because of the electrostatic capacitance Ckf, the detection signal Sr obtained when the knob 30 is contacted by a finger Hf as shown in FIG. 7(d) and FIG. 9(c) differs significantly from the detection signal Sr obtained when the situation is different (when the knob 30 is not in contact with the touch panel 15 (FIG. 9(a)) or the knob 30 is not contacted by a finger (FIG. 7(c) and FIG. 9(b))).

This is because, if the knob 30 is contacted by a finger Hf, a charging current flows into the electrostatic capacitance Ckf when the drive signal Sd is applied, whereas no such charging current flows when the drive signal Sd is applied in the above-mentioned different situation.

Based on such a difference in the detection signal Sr, it is possible to determine whether the knob 30 is contacted by a finger Hf.

As mentioned above, in the mutual capacitance method, it is possible to detect the contact of the knob 30 with the touch panel 15, even when the knob 30 is not contacted by a finger Hf, but it is not possible to determine whether the knob 30 is contacted by a finger Hf.

In contrast, in the self capacitance method, it is possible to determine whether the knob 30 is contacted by a finger Hf.

In the following description, when the variation amount of the electrostatic capacitance is not smaller than a threshold value (capacitance variation amount threshold value), the situation is referred to as "there is a response".

So far, description has been made on a case in which the operation member 32a is close to the electrodes 52i and 54k, the operation member 32b is close to the electrode 52i, and the operation member 32c is close to the electrode 52j. However, the variation in the detection signal Sr responsive to the drive signal Sd will be the same as above if any of the operation members 32a, 32b, 32c is close to the electrode 52i, any of the operation members 32a, 32b, 32c is in close to the electrode 52j, and any of the operation members 32a, 32b, 32c is close to the electrode 54k.

The signal Sc applied to the non-selected X electrodes need not be identical with the drive signal Sd applied to the selected X electrode, but it is sufficient if its value is sufficiently near the value of the drive signal Sd. Here, "sufficiently near" means within a range in which the result of the detection similar to that described above is obtained.

The capacitance variations detected when various conductors including the knob 30 are in contact with the touch panel are shown in FIGS. 10(a) to 10(r). FIGS. 10(a) to 10(f) show different states with respect to the contact of the conductor with the touch panel, and FIGS. 10(g) to 10(l) show the detection results in the mutual capacitance method, and FIGS. 10(m) to 10(r) shows the detection results in the self capacitance method.

When the touch panel is not contacted by a conductor as shown in FIG. 10(a), there is no response in the mutual capacitance method and in the self capacitance method as shown in FIGS. 10(g) and 10(m).

When the touch panel is contacted by a human finger Hf as shown in FIG. 10(b), there is a response in both of the mutual capacitance method and the self capacitance method, as shown in FIGS. 10(h) and 10(n).

When water Wt is attached to the touch panel, and the water is grounded (for example, when a human finger Hf is in contact with the water Wt) as shown in FIG. 10(d), there is a response in both of the mutual capacitance method and the self capacitance method as shown in FIGS. 10(j) and 10(p).

When water Wt is attached to the touch panel and the water is not grounded (when there is no contact by a human finger nor any other means) as shown in FIG. 10(c), there is a response in the mutual capacitance method as shown in FIG. 10(i), but there is no response in the self capacitance method as shown in FIG. 10(o).

When the touch panel is contacted by the knob 30, and the knob 30 is grounded (e.g., when a human finger Hf is in contact) as shown in FIG. 10(f), there is a response in the mutual capacitance method and in the self capacitance method as shown in FIGS. 10(l) and 10(r). This was also explained with reference to FIGS. 7(b) and 7(d).

When the touch panel is contacted by the knob 30, and the knob 30 is not grounded (there is no contact by a human finger, nor any other means) as shown in FIG. 10(e), there is a response in the mutual capacitance method as shown in FIG. 10(k), but there is no response in the self capacitance method as shown in FIG. 10(q). This was also explained with reference to FIGS. 7(a) and 7(c).

As has been described, in the mutual capacitance method, it is not possible to determine whether or not the knob 30 contacting the touch panel is contacted by a human finger (FIGS. 10(k) and 10(l)).

Similarly, it is not possible to determine whether or not water attached to the touch panel is contacted by a human finger (FIGS. 10(i) and 10(j)).

Furthermore, it is not possible to determine which of water, a human finger and the knob 30 is in contact with the touch panel (FIGS. 10(h) to 10(l)).

It is however possible to determine whether or not some conductor is attached or in contact (FIGS. 10(g) to 10(l)).

In the self capacitance method, it is possible to determine whether or not the knob 30 contacting the touch panel is contacted by a human finger (FIGS. 10(q) and 10(r)).

Similarly, it is possible to determine whether or not water attached to the touch panel is contacted by a human finger (FIGS. 10(o) and 10(p)).

It is however not possible to discriminate between the state (FIG. 10(r)) in which the knob 30 contacted by a human finger Hf is in contact with the touch panel, the state (FIG. 10(p)) in which the water Wt contacted by a human finger Hf is attached to the touch panel, and the state (FIG. 10(n)) in which a human finger HF is in contact with the touch panel.

Also, it is not possible to discriminate between the state (FIG. 10(q)) in which the knob 30 which is not grounded is in contact with the knob 30, the state (FIG. 10(o)) in which water which is not grounded is attached to the touch panel, and the state (FIG. 10(m)) in which no conductor is in contact or attached.

Furthermore, as was stated above, in the mutual capacitance method, when the capacitance variation has taken place at a plurality of positions, it is possible to uniquely identify the positions where the capacitance variation has taken place.

In contrast, in the self capacitance method, when the capacitance variation has taken place at a plurality of positions, it is not possible to uniquely identify the positions where the capacitance variation has taken place.

In the present embodiment, considering the differences between the two methods, the two methods are combined to perform detection of and discrimination between the contact of a finger with the touch panel, the contact of the knob 30 with the touch panel, and the contact of a finger with the knob 30, and the like.

Figure 11:
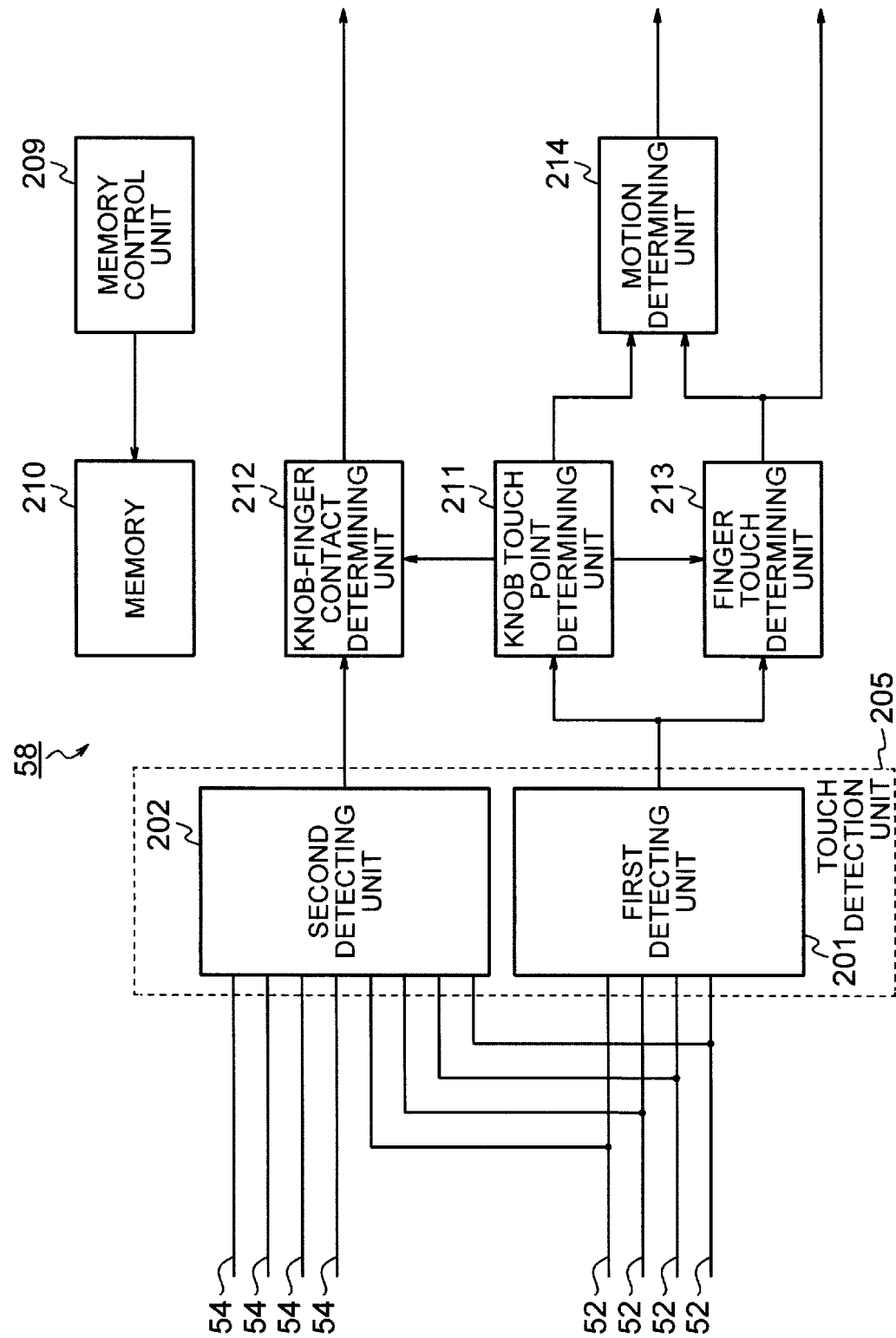
FIG. 11 is a block diagram showing an example of a configuration of an operation input processing unit shown in FIG. 1.

FIG. 11 shows an example of a configuration of the operation input processing unit 58.

The operation input processing unit 58 includes a first detecting unit 201, a second detecting unit 202, a memory control unit 209, a memory 210, a knob touch point determining unit 211, a knob-finger contact determining unit 212, a finger touch determining unit 213, and a motion determining unit 214.

The first detecting unit 201 and the second detecting unit 202 in combination form a touch detection unit 205.

In cooperation with the driving unit 56, the first detecting unit 201 detects the capacitance variation amount in the mutual capacitance method.

At the time of detection of the capacitance variation amount in the mutual capacitance method, the first detecting unit 201 detects the capacitance variation amount at each of intersections between the X electrodes 52 and the Y electrodes 54, based on the detection signal obtained from the reception electrode (X electrode), and information indicating the electrode being driven, acquires the detection value corresponding to the capacitance variation amount, and outputs data indicating the acquired detection value. The first detecting unit 201 detects one or more touch points from the detection values pertaining to a plurality of intersections.

The intersection where the capacitance variation amount is not smaller than a threshold value (mutual capacitance variation amount threshold value) is referred to as a response point.

For example, a region consisting of mutually consecutive response points is recognized as a touch point. Such a region may be recognized as a touch point provided that the capacitance variation amounts of the response points are distributed in a mountain shape, that is, there is a peak (local maximum) in the capacitance variation amount at or near the center, and the capacitance variation amount gradually decreases with the distance from the position of the peak. That the peak is not smaller than a threshold value may be used as an additional condition. That the area of the above-mentioned region (the number of the response points constituting the region) is not smaller than a predetermined value may be used as an additional condition.

The first detecting unit 201 outputs data indicating the position of the detected touch point.

The position of the touch point is represented by a combination of an X coordinate and a Y coordinate.

When the touch point is formed of a region consisting of one or more intersections, the position of a representative point of such a region may be recognized as the position of the touch point. For example, the position where the capacitance variation amount is the largest in such a region may be recognized as the position of the touch point. Alternatively, the position of the geometric center of gravity of such a region may be recognized as the position of the touch point.

The first detecting unit 201 also outputs data indicating the touch strength pertaining to the detected touch point. For example, the touch strength is represented by an average value, a maximum value or a total value of the capacitance variation amounts of one or more intersections constituting the touch point.

The first detecting unit 201 may also output data indicating the area (the number of intersections) of the touch region pertaining to the detected touch point.

The data representing the position of the touch point, the data representing the touch strength of the touch point, and the data representing the area of the touch region are stored as touch information pertaining to the touch point in the memory 210.

In cooperation with the driving unit 56, the second detecting unit 202 detects the capacitance variation amount in the self capacitance method.

At the time of detection of the capacitance variation amount in the self capacitance method, the second detecting unit 202 acquires the detection value corresponding to the capacitance variation amount for each electrode, based on the detection signal obtained from the reception electrode, and outputs data indicating the acquired detection value.

A collection of the capacitance variation amounts of the X electrodes can be said to be data obtained by projecting the capacitance variation amounts onto the X axis, or an X direction profile of the capacitance variation amounts.

Similarly, a collection of the capacitance variation amounts of the Y electrodes can be said to be data obtained by projecting the capacitance variation amounts onto the Y axis, or a Y direction profile of the capacitance variation amounts.

The data obtained by detection by the second detecting unit 202 are also stored in the memory 210.

The data which is obtained at each functional part in the operation input processing unit 58 and is stored in the memory 210, is later read and used in the particular functional part or other functional parts.

The writing in and reading from the memory 210 is performed by the memory control unit 209.

In FIG. 3, illustration of the signal lines for the writing in and reading from the memory 210 is omitted. This applies to other drawings of similar nature which will be subsequently referred to.

The knob touch point determining unit 211 determines whether the touch points detected by the first detecting unit 201 include touch points by the operation members 32a, 32b, 32c of the knob 30. In the following description, touch points by the operation members of the knob 30 are called knob touch points.

For example, when the number of the touch points detected by the first detecting unit 201 is not smaller than three, the knob touch point determining unit 211 extracts a combination of three touch points satisfying a predetermined condition from the detection results of all the detected touch points and recognizes the extracted combination as knob touch points.

For example, the predetermined condition is that the three touch points are separated by mutually equal distance, and within a predetermined value range. The predetermined range is a range extending from a value obtained by subtracting a predetermined tolerance from a standard distance between the operation members, to a value obtained by adding the tolerance to the standard distance.

That the touch strength at each of the three touch points is not smaller than a threshold value (touch strength threshold value) may be used as an additional condition.

The knob-finger contact determining unit 212 makes determination (knob-finger contact determination) as to whether a finger is in contact with or separated from the knob, based on the data indicating the position of each knob touch point recognized by the knob touch point determining unit 211, and the results of detection by the second detecting unit 202 (the profile of the capacitance variation amounts in the X direction and the profile of the capacitance variation amounts in the Y direction).

For example, it is determined that a finger is in contact with the knob if, with regard to at least one knob touch point among the three knob touch points recognized by the knob touch point determining unit 211, an average or a total of the detection values of the capacitance variation amounts in the self capacitance method at either or both of the same X direction positions and the same Y direction positions as the particular knob touch point is not smaller than a threshold value (knob-finger contact determination threshold value).

Each of the knob touch points may extend over a plurality of electrodes, so that the same X direction positions as the knob touch point may include positions of a plurality of electrodes, and the same Y direction positions as the knob touch point may include positions of a plurality of electrodes.

"An average or a total of the detection values of the capacitance variation amounts" mentioned above means such an average or a total pertaining to such a plurality of electrodes.

The knob-finger contact determining unit 212 causes the above-mentioned result of determination at each processing timing to be stored in the memory 210. The above-mentioned results of determination for each knob touch point are stored in association with the touch information pertaining to the particular knob touch point. By accumulating the results of determination at difference processing timings, a time series (a history) of knob-finger contact determination results is formed.

When the knob-finger contact determining unit 212 finds that a change has occurred in the knob-finger contact state, based on the time series of the determination results (for example, from the latest determination result and the immediately preceding determination result), it outputs data indicating the change. A change in the knob-finger contact state means a change (transition) from one to the other of the state in which a finger is in contact with the knob and the state in which no finger is in contact with the knob.

The finger touch determining unit 213 receives the result of determination by the knob touch point determining unit 211, and the detection result by the first detecting unit 201, determines whether each of at least one touch point which has not been recognized as the knob touch point by the knob touch point determining unit 211 is a touch point at which a touch operation by means of a finger has been made, and outputs the determination result.

The finger touch determining unit 213 causes the result of the above determination at each processing timing to be stored in the memory 210. The result of the above determination is stored in association with the above-mentioned touch information pertaining to the particular touch point. By accumulating the determination results at difference processing timings, a time series (a history) of the finger touch determination results is formed.

The motion determining unit 214 senses rotation of the knob and sliding of the knob, based on a history of the positions (recorded in the memory 210) of the knob touch points identified by the knob touch point determining unit 211.

The motion determining unit 214 also senses a gesture for input operation by means of a finger motion, based on the history of the positions (recorded in the memory 210) of the finger touch points identified by the finger touch determining unit 213.

The event processing unit 24 shown in FIG. 2 performs an event processing based on the detection result by the knob-finger contact determining unit 212, the determination result by the finger touch determining unit 213, and the determination result by the motion determining unit 214.

For example, when any of the below-listed events (a) to (f) has occurred, the event processing unit 24 performs control associated with the event in advance. This control includes control over each functional unit (display control unit 26, or the like).

(a) The knob-finger contact determining unit 212 has detected that a finger has been brought into contact with the knob 30 (there has been a transition from the state in which the finger is not in contact to the state in which the finger is in contact).

(b) The knob-finger contact determining unit 212 has detected that a finger has been separated from the knob 30 (there has been a transition from the state in which the finger is in contact to the state in which the finger is not in contact).

(c) The finger touch determining unit 213 has detected that a finger has been brought into contact with the touch panel 15 (there has been a transition from the state in which the finger is not in contact to the state in which the finger is in contact).

(d) The finger touch determining unit 213 has detected that a finger has been separated from the touch panel 15 (there has been a transition from the state in which the finger is in contact to the state in which the finger is not in contact).

(e) The motion determining unit 214 has sensed that the knob is rotating, or sensed that the knob is sliding.

(f) The motion determining unit 214 has sensed that a gesture for the input operation has been performed by a finger.

The display control unit 26 shown in FIG. 2 causes the display device 17 to display an image or the like for assisting the input operation.

The input operation by means of the touch input device 10 is executed in a state in which an image for assisting the input operation is displayed by the display device 17.

Where the touch input device 10 is used in vehicle mounted information equipment, the display control unit 26 may control, in addition to the image display by the display device 17, image display by an HUD (Head-up Display), not illustrated, provided in the vehicle.

More specifically, the display control unit 26 may have a function of causing the HUD to display an image indicating the type, the contents and the like of control executed responsive to the input operation by means of the knob 30 or a finger.

In this case, the event processing unit 24 may instruct the display control unit 26 to perform the control for causing the HUD to display the above-mentioned image, when the input operation is detected.

The user can perform the input operation by means of the knob 30, and can ascertain the type, the contents or the like of control executed responsive to the input operation, while keeping his/her line of sight directed toward the front of the vehicle.

As a result, the movement of the user's line of sight can be reduced.

Figure 12:
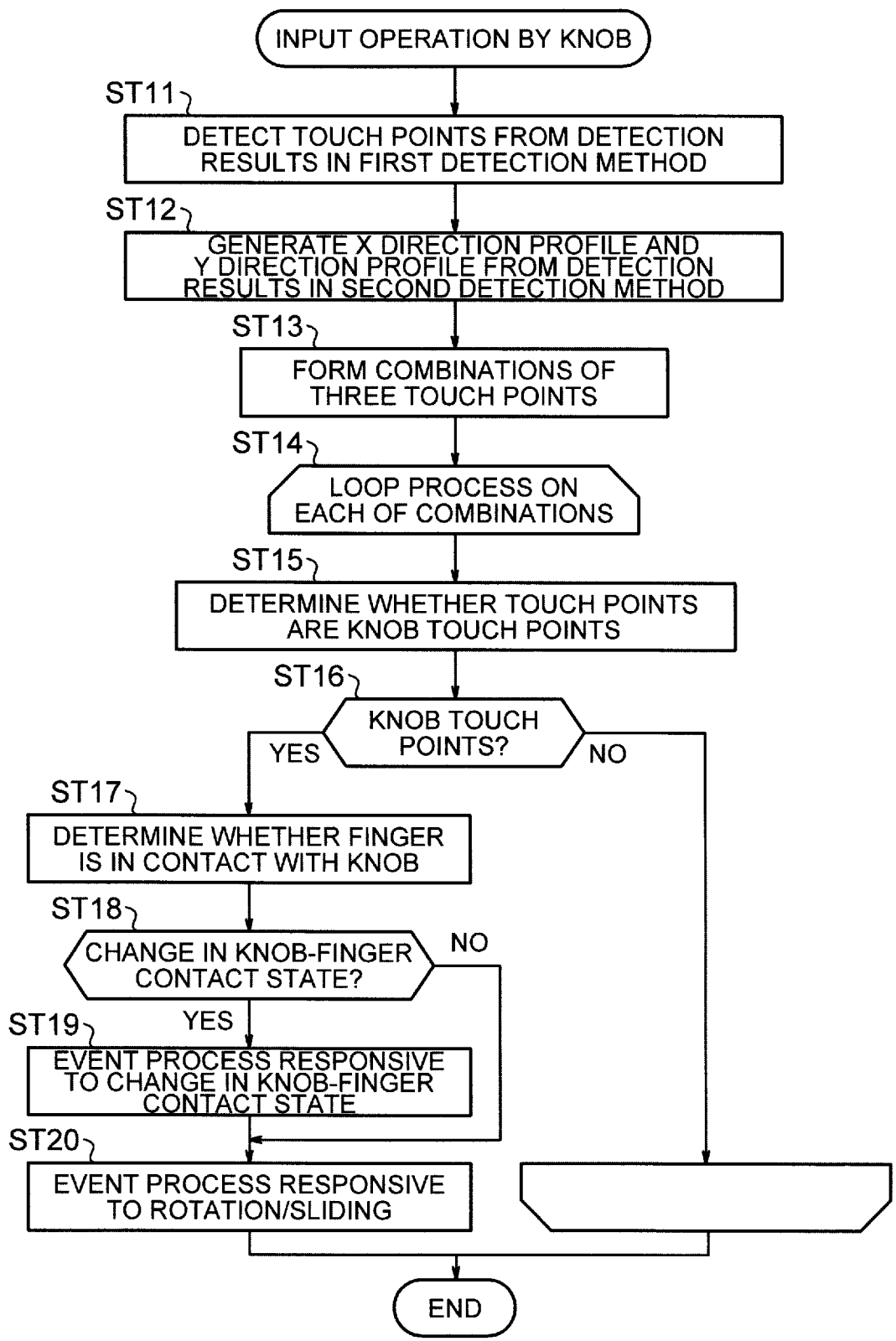
FIG. 12 is a flowchart showing a procedure of processes performed by a control device shown in FIG. 2 in response to the input operation by means of the knob.

Now, the procedure of processes in response to the input operation by means of the knob, among the processes of the control device 20, is described with reference to FIG. 12.

In step ST11, the first detecting unit 201, in cooperation with the driving unit 56, performs detection of the capacitance variation amount in the first detection method (mutual capacitance method) to detect the capacitance variation amount at each of the intersections between the X electrodes 52 and the Y electrodes 54, and detects one or more touch points from the detection results. Additionally, the first detecting unit 201 outputs data indicating the positions of the detected touch points, and data indicating the touch strength and data indicating the area of the touch region pertaining to each detected touch point.

In step ST12, the second detecting unit 202, in cooperation with the driving unit 56, performs detection of the capacitance variation amount in the second detection method (self capacitance method), to generate an X direction profile of the capacitance variation amount and a Y direction profile of the capacitance variation amount, and outputs data indicating the generated profiles.

In step ST13, when the number of the touch points detected by the first detecting unit 201 is not smaller than three, the knob touch point determining unit 211 finds all possible combinations of three touch points, from all the touch points detected, In step ST14, the knob touch point determining unit 211 repeats the processes of step ST15 to step ST16, for all of the combinations of the three touch points.

In step ST15, the knob touch point determining unit 211 determines whether or not the three touch points forming each of the combinations are knob touch points.

This determination is performed by pre-setting the conditions to be satisfied if the three touch points are knob touch points, and determining whether the three touch points forming each combination satisfy the preset condition.

In step ST16, the knob touch point determining unit 211 determines whether knob touch points have been found. If none has been found, the process of step ST15 is repeated, and if no knob touch point is found with regard to all the combinations, it is decided that there is no knob 30 on the touch panel 15.

If knob touch points are found, the knob touch point determining unit 211 terminates the search for the knob touch points, and proceeds to step ST17.

In step ST17, the knob-finger contact determining unit 212 performs determination (knob-finger contact determination) as to whether or not a finger is in contact with the knob (the knob with which the touch operation is performed at the knob touch points recognized in step ST16), based on the detection results by the second detecting unit 202.

In step ST18, the knob-finger contact determining unit 212 determines whether there has been a change in the knob-finger contact state, based on the history of the knob-finger contact determination results in step ST17 performed previously (for example, from the result of the knob-finger contact determination at step ST17 performed immediately before and the results of the knob-finger contact determination in step ST17 performed earlier). If there has been a change in the knob-finger contact state, the next step performed is step ST19. Otherwise (if there has been no change in the knob-finger contact state) the next step performed is step ST20.

In step ST19, the event processing unit 24 executes an event process responsive to the change in the contact state. As part of this event process, the display control unit 26 notifies the user that there has been a change in the contact state.

In step ST20, the motion determining unit 214 senses the rotation of the knob and senses the sliding of the knob, based on the history of the positions of the knob touch points, and the event processing unit 24 executes the event process responsive to the rotation or sliding of the knob sensed by the motion determining unit 214.

A concrete example of the operation (recognition of the knob touch point) in step ST15 is described below.

First, the knob touch point determining unit 211 determines the distances between the three touch points of each combination.

Next, decision is made as to whether the determined distances are all within a predetermined range.

If the determined distances are within the predetermined range, the three touch points are found to be touch points by the operation members of the knob 30.

Incidentally, in addition to the above condition, that the touch strength of each touch point is not smaller than a threshold value (touch strength threshold value) may be used as an additional condition.

A concrete example of the knob-finger contact determination in step ST17 is described next.

For example, it is determined that a finger is in contact with the knob if, with regard to at least one knob touch point, among the three knob touch points recognized in step ST16, an average or a total of the detection values of the capacitance variation amount in the self capacitance method, at either or both of the same X direction positions and the same Y direction positions as the particular knob touch point is not smaller than a threshold value (knob-finger contact determination threshold value).

Here, a restriction "at the three knob touch points" may be imposed in place of "at least one knob touch point". That is, it may be determined that a finger is in contact with the knob if, with regard to each of the three knob touch points recognized in step ST16, an average or a total of the detection values of the capacitance variation amount in the self capacitance method, at either or both of the same X direction positions and the same Y direction positions as the particular knob touch point is not smaller than a threshold value (self capacitance variation amount threshold value).

Also, it may be determined that a finger is in contact with the knob if a total of the detection values of the capacitance variation amount in the X direction positions respectively corresponding to the three knob touch points is not smaller than a threshold value (X direction total threshold value), or a total of the detection values of the capacitance variation amount in the Y direction positions respectively corresponding to the three knob touch points is not smaller than a threshold value (Y direction total threshold value).

In the above described example of step ST17 (knob-finger contact determination), the capacitance variation amount detected in the self capacitance method is used. However, the knob-finger contact determination can be made using both of the temporal change of the detection value of the capacitance variation amount detected in the mutual capacitance method, and the temporal change of the detection value of the capacitance variation amount detected in the self capacitance method.

Moreover, the detection values of the capacitance variation amount in the past (i.e., a history of the detection results) may also be used for the knob-finger contact determination.

Furthermore, the determination can be made based on the capacitance variation amount detected in the self capacitance method with regard to a plurality of mutually adjacent or mutually consecutive electrodes. This will next be explained with reference to FIGS. 13(*a*) and 13(*b*).

Figure 13A:
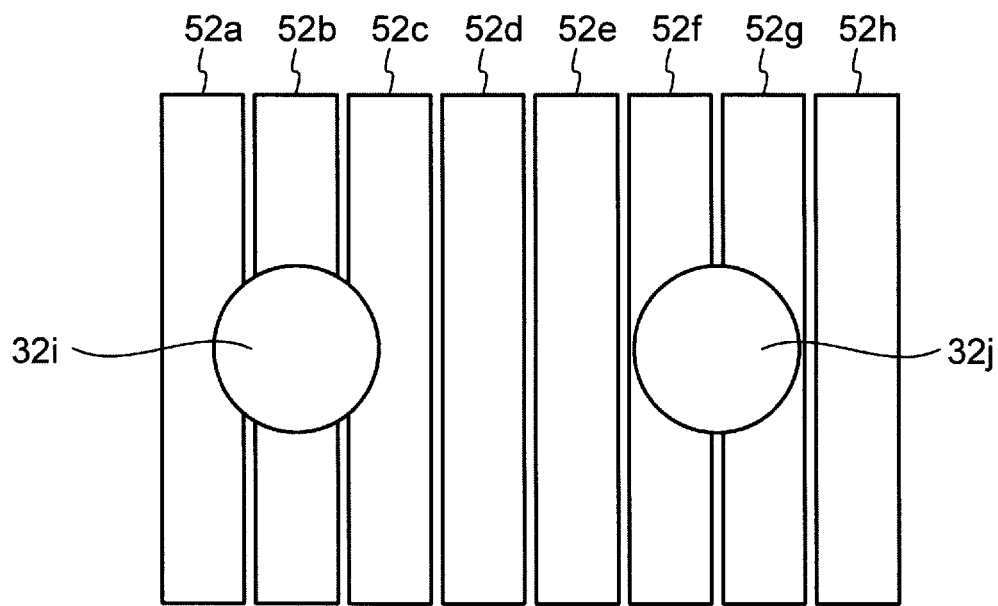
FIGS. 13(a) and 13(b) are diagrams for making determination based on capacitance variation amounts pertaining to a plurality of mutually consecutive electrodes.
Figure 13B:
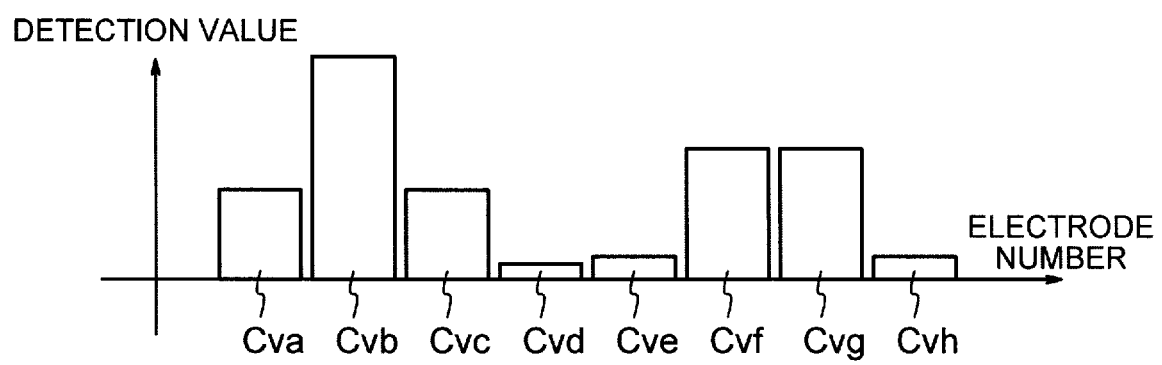

In FIGS. 13(*a*), 52*a* to 52*h* denote part of the X electrodes 52 shown in FIG. 1. Incidentally, in FIG. 1, the number of the X electrodes 52 is assumed to be four, whereas in FIG. 13(*a*), the number of the X electrodes 52 is assumed to be eight or more. Each of 32*i*, 32*j* indicates one of the operation members 32*a*, 32*b*, 32*c*.

As will be seen from FIG. 13(*a*), depending on the positions of the operation members 32*i*, 32*j* relative to the electrodes 52*a* to 52*h*, the number of the electrodes opposite to each operation member varies, and the area of the part of each operation member opposite to each electrode varies.

In the example shown in FIG. 13(*a*), the operation member 32*i* is opposite to three electrodes 52*a* to 52*c*, and the operation member 32*j* is opposite to two electrodes 52*f* and 52*g*. The area of the part of the operation member 32*i* opposite to the electrode 52*b* is large, while the areas of the parts of the operation member 32*i* opposite to the electrodes 52*a*, 52*c* are small.

As a result, the capacitance variation amount detected by the electrode opposite to the operation member varies from one electrode to another, as shown in FIG. 13(*b*).

If, however, a total or an average value of the detection values Cva to Cvc of the capacitance variation amounts pertaining to the electrodes 52*a* to 52*c*, and a total or an average value of the detection values Cvf, Cvg of the capacitance variation amounts pertaining to the electrodes 52*f*, 52*g* are used, the difference between them will be smaller.

Therefore, by using such a total or an average value in the knob-finger contact determination, robustness against the difference in the positional relation between the electrodes and the operation members can be improved.

Specifically, when a capacitance variation not smaller than a threshold value (self capacitance variation amount threshold value) is detected in connection with a plurality of mutually consecutive electrodes, an average value or a total value of the capacitance variation amounts may be determined, and used for the determination as to whether or not the operation member is in contact.

Next, description is made of a problem encountered when the knob is in contact with the touch panel 15, and also some other conductor is in contact with the touch panel 15. Here, the other conductor is assumed to be water.

FIGS. 14(*a*) to 14(*g*) show different states with regard to contact of the knob and water with the touch panel, FIGS. 14(*f*) to 14(*j*) show detection results in the mutual capacitance method, and FIGS. 14(*k*) to 14(*o*) show detection results in the self capacitance method.

FIGS. 14(*a*), 14(*b*), 14(*c*) show cases in which water Wt is attached at a position aligned with the knob 30 in the X direction, and FIGS. 14(*d*), 14(*e*) show cases in which water Wt is attached to an edge of the touch panel 15, and is in contact with the edge casing (frame body) 15*f*.

If detection is performed in the mutual capacitance method in a state in which water Wt is attached to the touch panel 15 as shown in FIGS. 14(*a*), 14(*b*), 14(*c*), capacitance variation is detected (FIGS. 14(*f*), 14(*g*), 14(*h*)) at both of the position where water Wt is attached and the position of the operation member of the knob 30.

In contrast, in the self capacitance method, there is a response at a part where water which is grounded (e.g., a finger Hf is in contact) is attached (FIG. 14(*m*)), whereas there is no response at a part where water which is not grounded (there is no contact by a finger or anything else) (FIGS. 14(*k*), 14(*l*)).

Therefore, in a situation shown in FIG. 14(*b*) where a finger Hf is in contact with the knob 30 which is in contact with the touch panel 15, and water Wt attached to the touch panel 15 is not grounded (there is no contact by a finger or anything else)), the X direction profile (detection results by the X electrodes) in the self capacitance method indicates a response at a position corresponding to the knob 30, but indicates no response at the part where water is attached (FIG. 14(*l*)).

In a situation shown in FIG. 14(*c*), in which the knob 30 in contact with the touch panel 15 is not contacted by a finger Hf, and water Wt attached to the touch panel 15 is grounded (contacted by a finger Hf), the X direction profile in the self capacitance method indicates no response at the position corresponding to the knob 30, but indicates a response at the part where water is attached (FIG. 14(*m*)).

In situations shown in FIGS. 14(*a*), 14(*b*), 14(*c*), in which water Wt is attached at a position aligned with the knob 30 in the X direction, it is not possible to discriminate between the capacitance variation due to the water Wt contacted by a finger Hf (FIG. 14(*m*)), and the capacitance variation due to the knob 30 contacted by a finger Hf (FIG. 14(*l*)), from the Y direction profile (detection results by the Y electrodes) in the self capacitance method.

Therefore, when knob touch points are detected in steps ST15, ST16, and if there is one or more response points at positions different from the knob touch points, the method of the knob-finger contact determination (determination criteria) used in step ST17 may be changed depending on the positions of such response points.

Figure 14A:
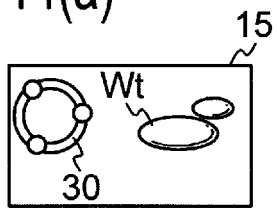
FIGS. 14(a) to 14(o) are diagrams showing variations in the electrostatic capacitances due to attachment of water to the touch panel, and the effects on the detection of the knob.
Figure 14B:
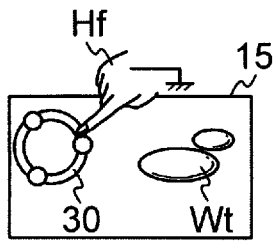
Figure 14C:
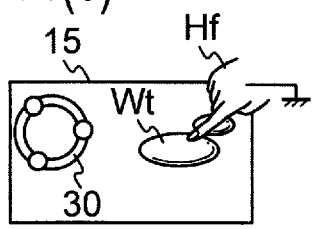
Figure 14D:
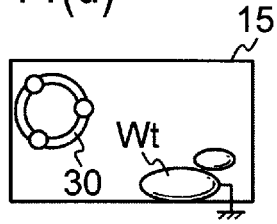
Figure 14E:
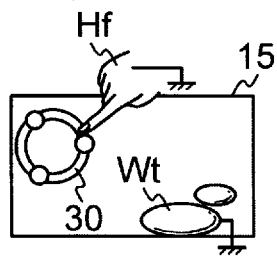
Figure 14F:
Figure 14G:
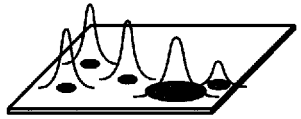
Figure 14H:
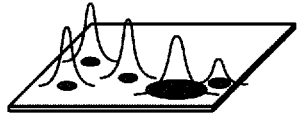
Figure 14I:
Figure 14J:
Figure 14K:
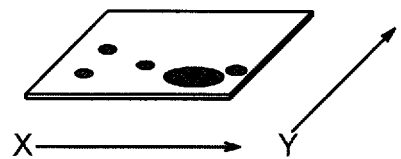
Figure 14L:
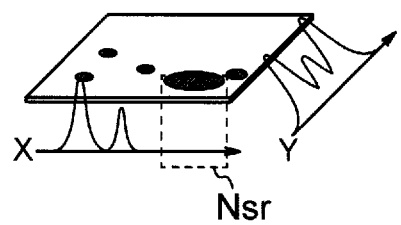
Figure 14M:
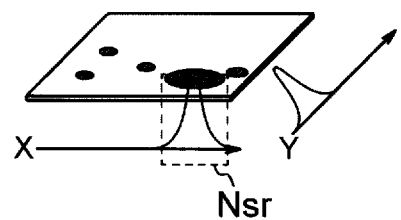

For example, it may be so arranged that, if knob touch points are detected in step ST15, and there are one or more response points at positions different from the knob touch points (FIGS. 14(f), 14(g), 14(h)), the detection values obtained by the detection by the X electrodes pertaining to the response points at positions different from the knob touch points (part enclosed by a frame Nsr of a dotted line in FIGS. 14(l), 14(m)) are not used for the knob-finger contact determination, and the knob-finger contact determination is made using the detection values obtained by the detection by the X electrodes at the same X direction positions as the knob touch points, among the detection values obtained by the detection by the X electrodes.

To generalize, the knob-finger contact determining unit 212 may use the detection values obtained in the detection in the second detection method, by the electrodes at the same X direction positions as the knob touch points, among the X electrodes, for the determination as to whether a finger is in contact with the knob, and may use the detection values obtained in the detection in the second detection method by the electrodes at the same Y direction positions as the knob touch points, among the Y electrodes, for the determination as to whether a finger is in contact with the knob.

Furthermore, it may be so arranged that when one or more response points which are at positions different from the knob touch points recognized by the knob touch point determining unit 211 are at positions aligned with the knob touch points in the X direction, the knob-finger contact determining unit 212 does not use the detection values obtained in the second detection method by the electrodes at X direction positions different from the knob touch points, among the X electrodes, for the determination as to whether a finger is in contact with the knob, and when one or more response points which are at positions different from the knob touch points recognized by the knob touch point determining unit 211 are at positions aligned with the knob touch points in the Y direction, the knob-finger contact determining unit 212 does not use the detection values obtained in the second detection method by the electrodes at Y direction positions different from the knob touch points, among the Y electrodes, for the determination as to whether a finger is in contact with the knob.

Moreover, when one or more response points which are at positions different from the knob touch points are at positions aligned with the knob touch points in the X direction, or at positions aligned with the knob touch points in the Y direction, the knob-finger contact determination may be made using the detection values of the capacitance variation amount detected by the first detecting unit 201, for example, the temporal change of the detection values.

In the various processes described above, the condition that "there are one or more response points at positions different from the knob touch points" may be replaced with a condition that "there is a touch point other than the knob touch point". This applies to concrete examples, variations, and the like which will be described below. The "touch point" is a region consisting of consecutive response points, as described above.

In this case, as a condition for recognizing that "there is a touch point other than the knob touch point at a position aligned with the knob touch point in the X direction", it may be stipulated that "the X electrode forming an intersection where the capacitance variation amount is at a maximum in the region forming the knob touch point, and N X electrodes (N being a predetermined integer) in the neighborhood of the above-mentioned X electrode and the X electrode forming an intersection where the capacitance variation amount is at a maximum in the region forming the touch point other than the knob touch point, and M X electrodes (M being a predetermined integer) in the neighborhood of the above-mentioned X electrode do not coincide with each other.

Similarly, as a condition for recognizing that "there is a touch point other than the knob touch point at a position aligned with the knob touch point in the Y direction", it may be stipulated that the Y electrode forming an intersection where the capacitance variation amount is at a maximum in the region forming the knob touch point, and N Y electrodes (N being a predetermined integer) in the neighborhood of the above-mentioned Y electrode, and the Y electrode forming an intersection where the capacitance variation amount is at a maximum in the region forming the touch point other than the knob touch point, and M Y electrodes (M being a predetermined integer) in the neighborhood of the above-mentioned Y electrode do not coincide with each other.

Moreover, it may be determined that, when the area of the touch point other than the knob touch point is larger than the area of the knob touch point (area of the lower end of the operation member), the touch point in question is a part where water is attached.

Figure 14N:
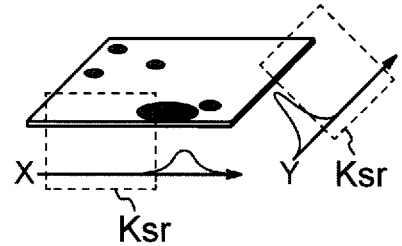
Figure 14O:
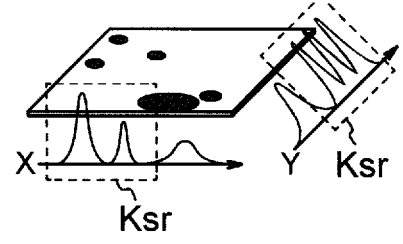

Furthermore, when water Wt is attached to an edge of the touch panel 15 and is in contact with the edge casing (frame body) as shown in FIGS. 14(d), 14(e), an electrostatic capacitance is created between the electrodes and water, and a problematical response may occur in the detection in the self capacitance method (FIGS. 14(n), 14(o)).

In this case, the knob-finger contact determination may be made based on the temporal change in the detection value obtained by detection in the self capacitance method. For example, it may be determined that a finger has been brought into contact with the knob when the detection value obtained by detection in the self capacitance method has increased quickly and by a large amount, and it may be determined that a finger has been separated from the knob when the detection value obtained by detection in the self capacitance method has decreased quickly and by a large amount. With this arrangement, it is possible to detect the change from one to the other of the state in which a finger is in contact with the knob and the state in which a finger is separated from the knob, based on the temporal change in the detection value in the part indicated by a frame Ksr of a dotted line in FIGS. 14(n), 14(o).

Moreover, the knob-finger contact determination by the knob-finger contact determining unit 212 may be temporarily suspended when one or more response points at positions different from the knob touch points are at positions aligned in the X direction or positions aligned in the Y direction with the knob touch points. In such a case, it may be regarded that the state recognized by the knob-finger contact determination performed immediately before is maintained.

Moreover, it may be so arranged that when one or more response points at positions different from the knob touch points are at positions aligned in the X direction or positions aligned in the Y direction with the knob touch points, either or both of the output of the result of the knob-finger contact determination by the knob-finger contact determining unit 212, and the output of the information concerning the knob touch point by the knob touch point determining unit 211 are not performed.

Moreover, the capacitance variation amount detected by the first detecting unit 201 is proportional to the area of the part of the operation member of the knob 30 in contact with the touch panel. Therefore, when the case part 31 of the knob 30 is bent, the operation member may be partially separated from the surface of the touch panel 15, so that, with regard to some or all of the operation members 32a, 32b, 32c, the detected capacitance variation amount may become insufficient. As a result, the identification of the knob touch point by the knob touch point determining unit 211 may fail, or the reliability of the result of the identification of the knob touch point by the knob touch point determining unit 211 may become low.

In this case, it may be so arranged that until the knob-finger contact determining unit 212 determines that "a finger is in contact with the knob" based on the output of the second detecting unit 202, the knob touch point determining unit 211 withholds the identification of the knob touch point, or the output of the touch information pertaining to the knob touch point, and after the knob-finger contact determining unit 212 determines that a finger is in contact with the knob, the knob touch point determining unit 211 performs the identification of the knob touch point, and the output of the touch information pertaining to the knob touch point.

Furthermore, when the sensitivity of the first detecting unit 201 is insufficient, the knob touch point determining unit 211 may be unable to sufficiently generate the touch information concerning each knob touch point, and may be unable to identify the knob touch point. To cope with such a situation, it may be so arranged that the position information of the knob touch point (including the information indicating the positional relation between the three knob touch points) obtained when the knob-finger contact determining unit 212 determines that a finger is in contact with the knob is stored in the memory 210, and once the above-mentioned information is stored, the knob-finger contact determining unit 212 determines whether a finger is in contact with the knob using the stored information, and based on the detection result by the second detecting unit 202.

Moreover, when information of one or two of the three knob touch points is obtained, the position(s) of the remaining knob touch point(s) may be estimated based on the information on the above-mentioned one or two points, and the position information of the knob touch points stored in the memory 210. In this case, the velocity of the movement of each knob touch point may be detected, for example, by the motion determining unit 214, and the detected velocity of the movement may be taken account of.

In the above-described example, the first detecting unit uses the mutual capacitance method, and the second detecting unit uses the self capacitance method. However, some other detection methods may be used.

What is essential is that the first detection method is capable of identifying the position of the knob touch point (s), and the second detection method has a higher reliability than the first detection method in determining whether a finger is in contact with the knob, As has been described, by using the knob for the input operation, even when the line of sight cannot be directed to the display device 17 during driving, in an application to vehicle-mounted equipment, when the knob is touched by a hand, the functions (type, contents and the like of control executed responsive to the input operation) assigned to the input operation by means of the knob are displayed by an HUD, so that it is possible to perform operation while watching the displayed information, with the result that the safety of driving can be improved.

Moreover, by using the knob, it is possible to perform input operation similar to a dial operation, without requiring a dedicated sensor device, with the result that the operability is improved and the cost can be reduced.

Furthermore, in the above-described embodiment, one or more touch points are detected in the first detection method, and the knob touch points are identified based on the positional relation between the detected touch points, so that the positions of the knob touch points can be correctly recognized while restraining erroneous response due to a conductor (e.g., water) other than the knob. Furthermore, by using the results of detection in the second detection method, it is possible to determine whether a finger is in contact with the knob without fail.

Moreover, by using the results of detection in the above-described first detection method, and the results of detection in the second detection method, it is possible to detect erroneous sensing due to attachment of water. Also, in an application in vehicle mounted equipment, it is possible to restrain erroneous operation when the knob, not being held, due to vibration of the vehicle.

Furthermore, the determination as to whether a finger is in contact with the knob is made using the results in the second detection unit capable of determining whether a finger is in contact with the knob, so that, as the first detecting unit, one which is most suitable mainly for the identification of the touch position by the knob, with the result that the accuracy of touch position detection (coordinate accuracy) can be made higher.

The detection in the first detection method can be made in a way different from the one described above.

For example, as the first detection method, in place of the mutual capacitance method, a self capacitance method may be used, in which the capacitance variation amount is detected in a state in which the neighboring electrodes are controlled to the ground potential as shown in FIGS. 15(a) and 15(b).

In the method shown in FIGS. 15(a) and 15(b), the driving unit 56 sequentially selects the X electrodes and the Y electrodes, applies a drive signal Sd to the selected electrode, for example, the selected X electrode 52i, and does not apply the drive signal Sd to the non-selected electrodes 52j to maintain the non-selected X electrodes 52j at the ground potential.

Figure 16:
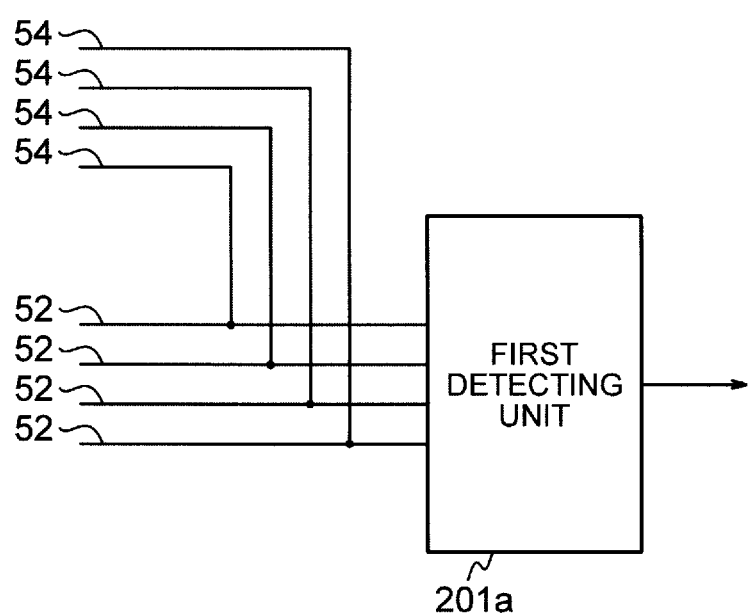
FIG. 16 is a block diagram showing a variation of a first detecting unit.

For the detection of the capacitance variation amount in the method shown in FIGS. 15(a) and 15(b), the first detecting unit 201a shown in FIG. 16 is used in place of the first detecting unit 201 shown in FIG. 11. The first detecting unit 201a shown in FIG. 16 is connected to the X electrodes 52 and to the Y electrodes 54.

The first detecting unit 201a, in cooperation with the driving unit 56, detects the capacitance variation amount in the self capacitance method.

At the time of detection of the capacitance variation amount in the self capacitance method, the first detecting unit 201a acquires, based on the detection signal obtained from the selected electrode, a detection value corresponding to the capacitance variation amount of the selected electrode.

A set of the capacitance variation amounts of the X electrodes constitutes an X direction profile of the capacitance variation amounts, and a set of the capacitance variation amounts of the Y electrodes constitutes a Y direction profile of the capacitance variation amounts.

As shown in FIGS. 15(a) and 15(b), when the knob 30 is in contact with the touch panel 15, an electrostatic capacitance Ckj is formed between the knob 30 and the electrode 52j.

When the knob 30 is contacted by a finger Hf as shown in FIG. 15(b), an electrostatic capacitance Ckf is formed by the knob 30 and the finger Hf, whereas when the knob 30 is not contacted by a finger Hf as shown in FIG. 15(a), such an electrostatic capacitance Ckf is not formed.

When the knob 30 is not in contact with the touch panel 15, neither of the electrostatic capacitances Ckf, Ckj is formed.

The capacitance variation due to the electrostatic capacitance Ckj, among the electrostatic capacitances Ckj, Ckf mentioned above, is detected based on the detection signal Sr.

That is, if the knob 30 is in contact with the touch panel 15, a charging current flows to the electrostatic capacitance Ckj when the drive signal Sd is applied, whereas if the knob 30 is not in contact with the touch panel 15, no such charging current flows even when the drive signal Sd is applied.

Due to this difference, there occurs a difference in the detection signal Sr at the time of application of the drive signal Sd.

Therefore, based on such a difference in the detection signal Sr, the capacitance variation amount pertaining to each electrode is detected. Also, based on the detection result, determination as to whether the knob 30 is in contact with the touch panel 15, and identification of the touch point are performed.

Incidentally, instead of controlling the neighboring electrodes at the ground potential, the neighboring electrodes may be made to be in a floating state.

In the self capacitance method shown in FIGS. 15(a) and 15(b), when the capacitance variation at each electrode is detected, it can be determined that the capacitance change has occurred at some position along the longitudinal direction (extension direction) of the electrode, but it cannot be necessarily determined at which position along the longitudinal direction of the electrode the capacitance variation has occurred.

If the capacitance variation has occurred at one place on the touch panel, by combining the detection results at a plurality of X electrodes and the detection results at a plurality of Y electrodes, it is possible to uniquely identify the position (X coordinate and Y coordinate) where the capacitance variation has occurred.

If the capacitance variation has occurred simultaneously at two or more places on the touch panel, it is not possible to uniquely identify the positions where the capacitance variation has occurred. As a result, it is not possible to discriminate between the true touch points and ghost points in the process of identifying the touch points based on the X direction profile of the capacitance variation amounts and the Y direction profile of the capacitance variation amounts.

However, it is possible to discriminate between the true touch points and ghost points based on the results of detection in another detection method, and known information. For example, the true touch points and the ghost points are both tentatively accepted as touch point candidates, and the touch point candidates which satisfy a condition based on the known information may be determined to be knob touch points. For example, if the operation members of the knob are known to be disposed at the three vertex positions of an equilateral triangle, that the touch point candidates are at the vertex positions of an equilateral triangle may be used as the condition based on the known information.

Second Embodiment

In the example explained with reference to FIG. 7(a) to FIG. 14 in the first embodiment, the mutual capacitance detection method is used as the first detection method, and the self capacitance detection method is used as the second detection method.

In the second embodiment, as the second detection method, in place of the self capacitance method, a method (hereinafter referred to as an "intersection grounding method") in which all the electrodes are simultaneously driven and then the intersections (intersecting parts) are controlled to the ground potential, as shown in FIGS. 17(a) to 17(d).

In the intersection grounding method, the capacitance variation amount at an intersection (intersecting part) between one electrode, e.g., X electrode, and the other electrode, e.g., Y electrode is detected, as in the mutual capacitance method. However, the intersection grounding method differs from the mutual capacitance method in that the electrode to which the drive signal is applied and the electrode from which the detection signal is obtained are the same.

For example, the driving unit 56 sequentially selects one of the first and second groups, e.g., the first group of electrodes (X electrodes), and also sequentially selects the other of the first and second groups, e.g., the second group of electrodes (Y electrodes), applies the drive signal Sd to the selected X electrode, changes the potential of the selected Y electrode quickly, for example, stepwise, and determines the capacitance variation amount at each position (intersection between the X electrode and the Y electrode) of the touch panel 15 based on the detection signal Sr appearing at the selected X electrode and information indicating the selected Y electrode. As the drive signal Sd, a signal maintaining a relatively high voltage for a predetermined period is applied, and a signal Sb which varies quickly, i.e., is switched, from a relatively high potential Vh to a relatively low potential Vl is applied to the selected Y electrode. As the detection signal Sr, a signal representing the current flowing through the selected X electrode when the voltage on the selected Y electrode is switched is obtained. For example, the relatively high potential (hereinafter referred to simply as "high potential") Vh is equal to the potential of the drive signal Sd. For example, the relatively low potential Vl is the ground potential Vg. In the following description, it is assumed that the relatively low potential is the ground potential Vg.

Also, in the following description, it is assumed that the X electrodes are sequentially selected and the drive signal Sd is applied to the selected X electrode, and while each X electrode is selected, the Y electrodes are sequentially selected, and the potential of the signal Sb applied to the selected Y electrode is switched.

Figures 17C, 17D:
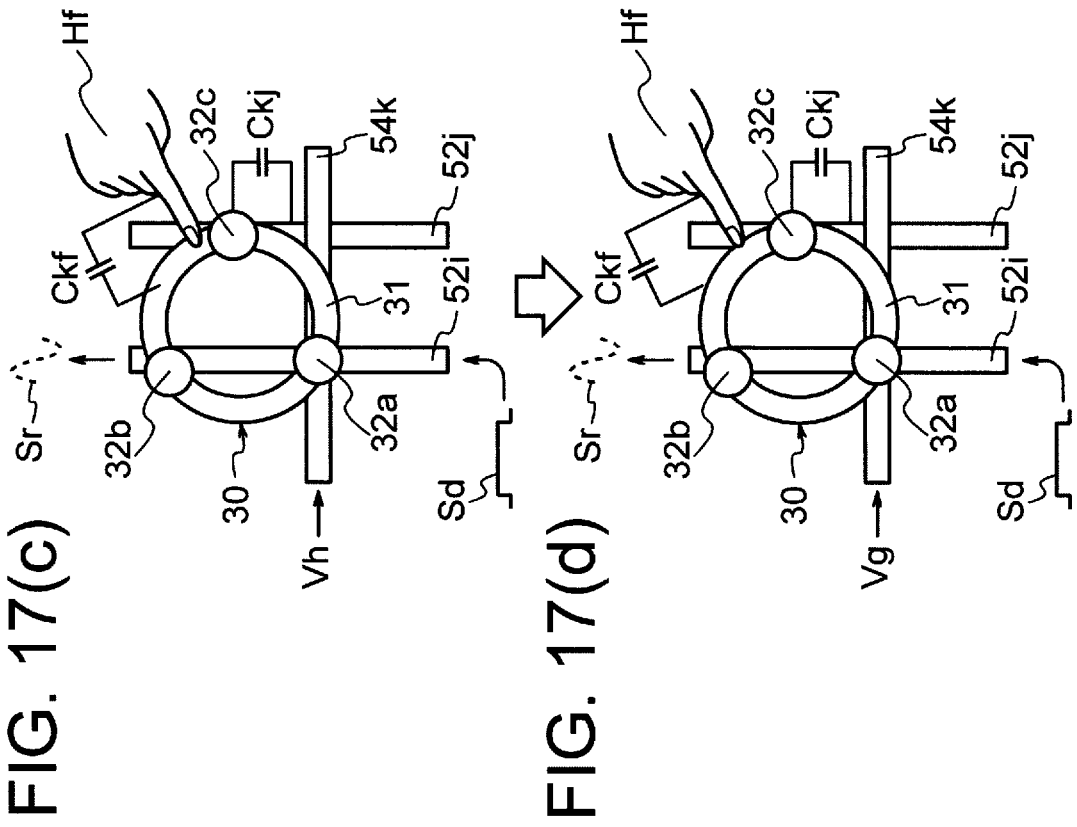
FIGS. 17(a) to 17(d) are diagrams showing switching of the applied voltage when detection is performed in an intersection grounding method, and the variation in the detection signal due to the switching.
Figures 17A, 17B:
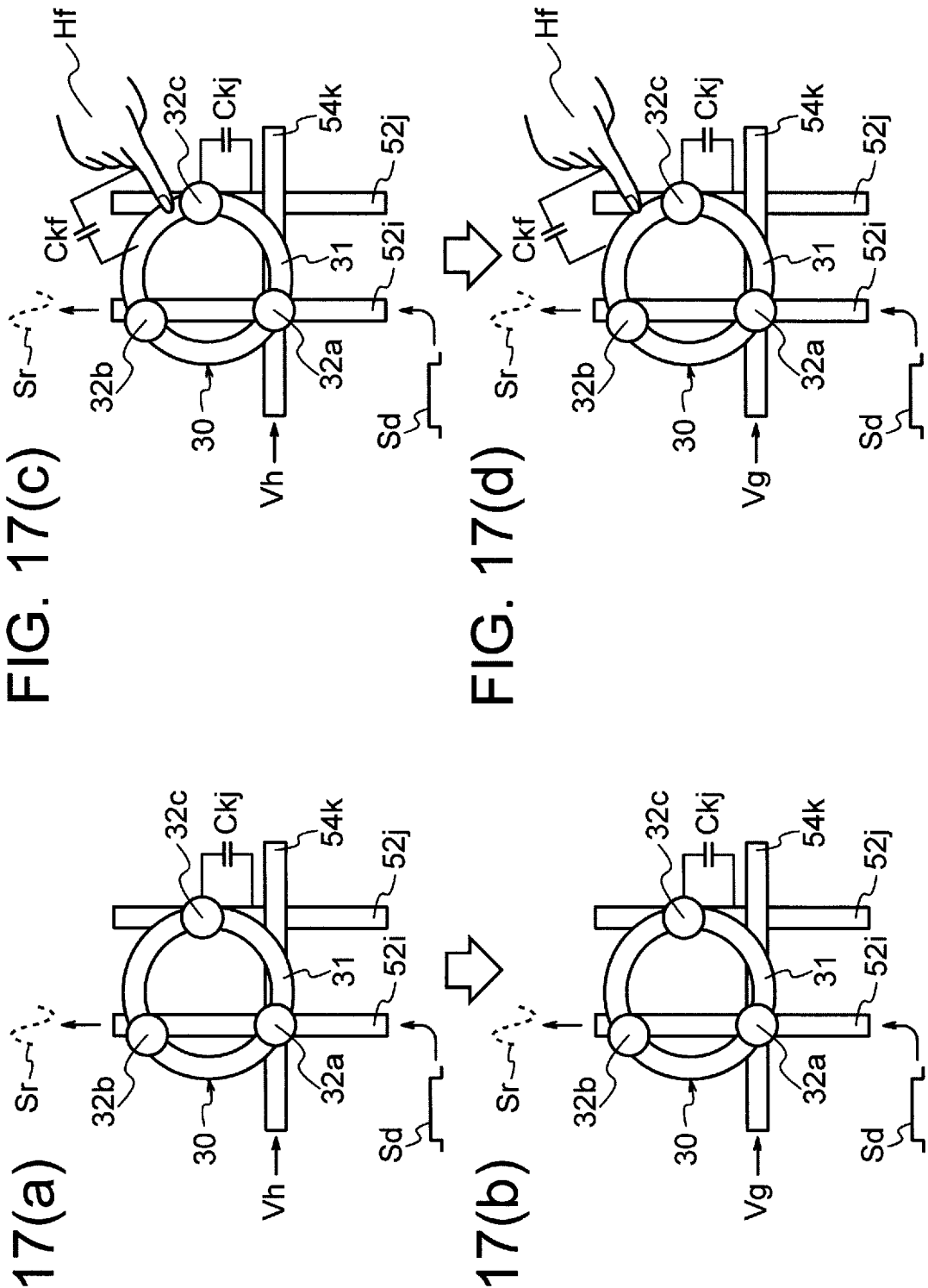

FIGS. 17(a) and 17(c) show states in which the signal Sb applied to the selected Y electrode 54k is at a high potential Vh, while FIGS. 17(b) and 17(d) show states in which the signal Sb applied to the selected Y electrode 54k is at the ground potential Vg.

As shown in FIGS. 17(a) to 17(d), the drive signal Sd maintained at a relatively high voltage value is applied to all the X electrodes, including the selected electrode 52i and the non-selected electrode 52j, and the signal Sb applied to the selected Y electrode 54k is switched from the high potential Vh to the ground potential Vg during the period in which the drive signal Sd is applied to all the X electrodes.

By switching the potential applied to the selected Y electrode 54k to the ground potential Vg, as described above, the intersection between the selected X electrode 52i and the selected Y electrode 54k is controlled to the ground potential, and the signal Sr then appearing on the selected X electrode 52i is detected.

Figure 18A:
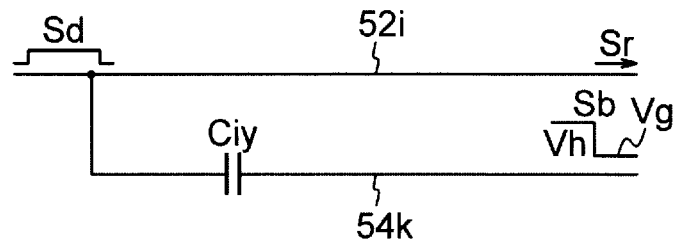
FIGS. 18(a) to 18(c) are equivalent circuit diagrams for explaining the detection in the intersection grounding method.
Figure 18B:
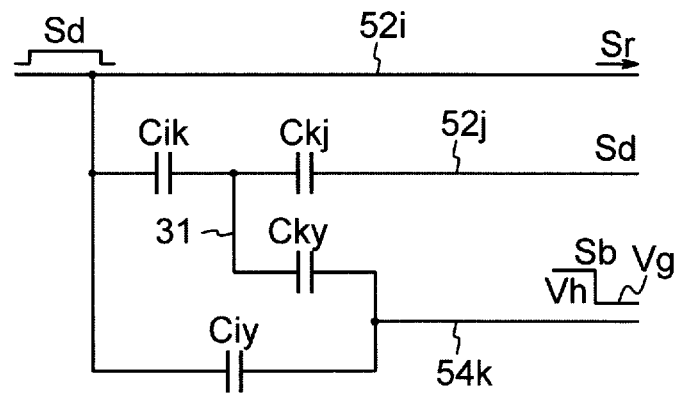
Figure 18C:
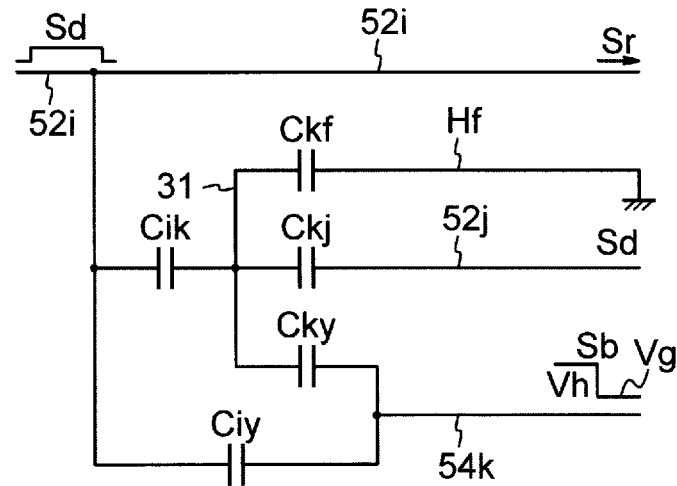

FIGS. 18(a) to 18(c) are equivalent circuit diagrams for explaining the detection in the intersection grounding method, and show principal electrostatic capacitances formed in the neighborhood of the intersection between the selected X electrode 52i and the selected Y electrode 54k.

FIG. 18(a) shows an equivalent circuit for a case in which neither the knob 30 nor a finger Hf is in contact with the touch panel 15 (equivalent circuit of a part of the touch panel 15 where neither the knob 30 nor a finger Hf is in contact). FIG. 18(b) shows an equivalent circuit for a case in which the knob which is not contacted by a finger Hf is in contact with the touch panel 15, as shown in FIG. 17(a) and FIG. 17(b) (equivalent circuit of a part of the touch panel 15 where the knob 30 which is not contacted by a finger is in contact) is in contact with the touch panel 15). FIG. 18(c) is an equivalent circuit for a case in which the knob 30 contacted by a finger Hf is in contact with the touch panel 15, as shown in FIG. 17(c) and FIG. 17(d) (equivalent circuit of a part of the touch panel 15 where the knob 30 contacted by a finger is in contact).

In FIGS. 18(a) to 18(c), Ciy denotes an electrostatic capacitance formed between the electrode 52i and the electrode 54k, Cik denotes an electrostatic capacitance formed between the electrode 52i and the knob 30, Ckj denotes an electrostatic capacitance formed between the knob 30 and the electrode 52j, Cky denotes an electrostatic capacitance formed between the knob 30 and the electrode 54k, and Ckf denotes an electrostatic capacitance formed between the knob 30 and a finger Hf.

The following description relates to an operation performed when, while the drive signal Sd is applied to all the X electrodes, the signal Sb applied to the selected Y electrode 54k is switched from the high potential Vh to the ground potential Vg, thereby switching the intersections between the X electrodes and the Y electrode 54k from the high potential Vh to the ground potential Vg.

As shown in FIGS. 18(a) to 18(c), a charging current flows into the electrostatic capacitance Ciy when the Y electrode 54k is switched to the ground potential Vg.

If the knob 30 is in contact with the touch panel 15 as shown in FIGS. 18(b) and 18(c), when the signal Sb is switched to the ground potential Vg, charging of the electrostatic capacitance Cky due to the drive signal Sd takes place. If neither the knob 30 nor a finger Hf is in contact with the touch panel 15 as shown in FIG. 18(a), the electrostatic capacitance Cky is not formed, and no charging current to the electrostatic capacitance Cky flows.

If a finger Hf is in contact with the knob 30 as shown in FIG. 18(c), the electrostatic capacitance Ckf is charged while the signal Sb is at a high potential Vh, and part of the current for charging the electrostatic capacitance Cky at the time of switching of the signal Sb to the ground potential Vg is provided by the discharge from the electrostatic capacitance Ckf.

As has been described, in the situation of FIG. 18(c) (and FIG. 17(d)), compared with the situation in FIG. 18(b) (and FIG. 17(b)), the electric charge stored in the electrostatic capacitance Ckf contributes to the charging of the electrostatic capacitance Cky, so that the supply of the current from the drive signal Sd is smaller, and the variation in the current flowing through the electrode 52i is reduced, and a detection signal Sr corresponding to the smaller current variation is obtained.

Based on such a difference in the detection signal Sr, it is possible to make determination (knob-finger contact determination) as to whether a finger is in contact with the knob which is in contact with the intersection region (the region centered on the intersection).

Also, in both of the case of FIG. 18(b) and the case of FIG. 18(c), a current is supplied from the drive signal Sd for charging the electrostatic capacitance Cky, whereas when neither the knob nor a finger is in contact (FIG. 18(a)), the electrostatic capacitance Cky is not formed, and there occurs no supply of current for charging the electrostatic capacitance Cky, with the result that variation in the detection signal Sr is very small. It is possible to determine whether or not the knob is in contact with the intersection region based on this difference in the detection signal Sr.

Figure 19:
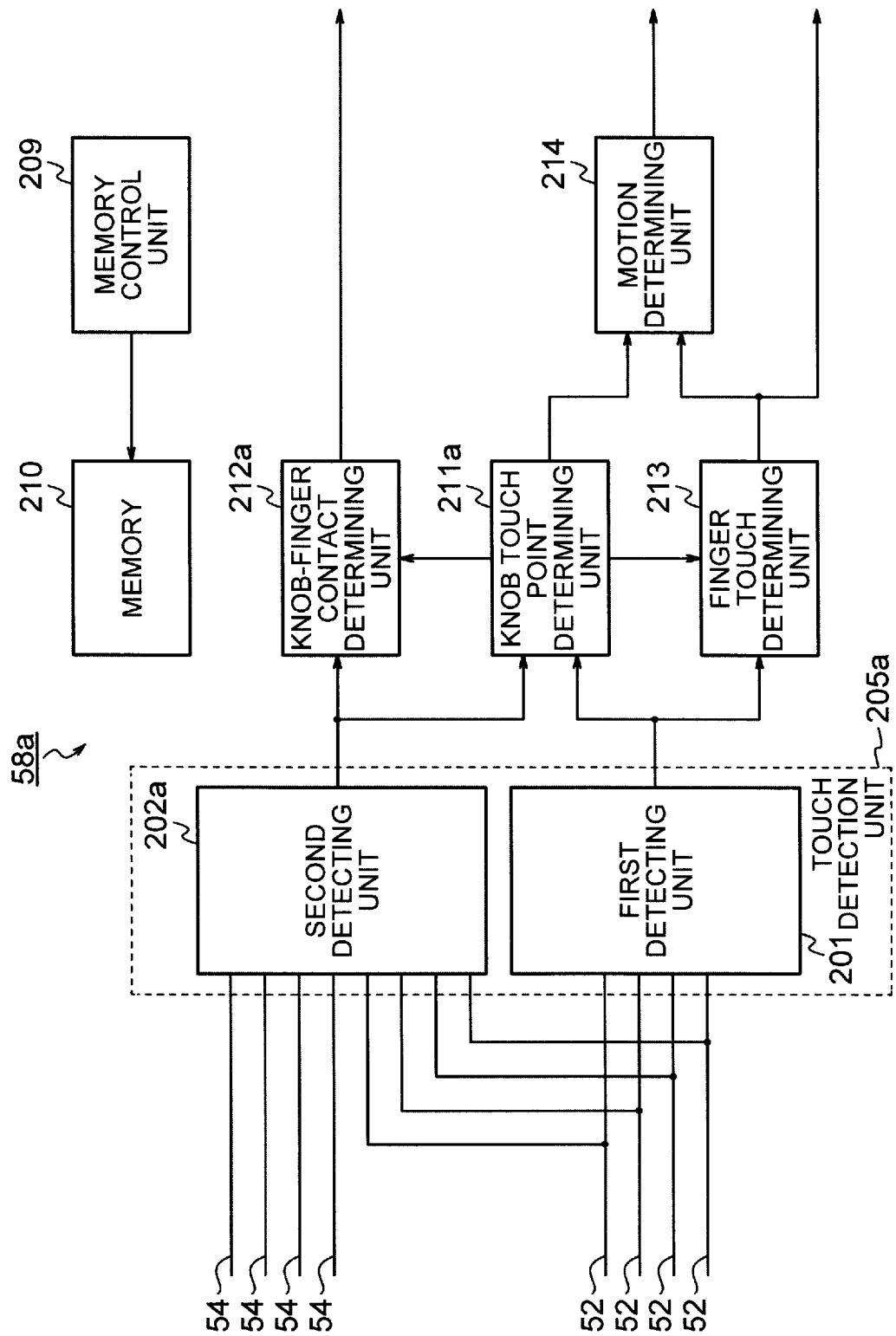
FIG. 19 is a block diagram showing an example of a configuration of an operation input processing unit used in a touch input device of a second embodiment of the present invention.

FIG. 19 shows an example of a configuration of an operation input processing unit 58a used in the second embodiment.

The operation input processing unit 58a includes a first detecting unit 201, a second detecting unit 202a, a memory control unit 209, a memory 210, a knob touch point determining unit 211a, a knob-finger contact determining unit 212a, a finger touch determining unit 213, and a motion determining unit 214.

The first detecting unit 201 and the second detecting unit 202a in combination form a touch detection unit 205a.

Reference characters in In FIG. 19 identical to those in FIG. 11 denote similar functional parts.

For example, the operation of the first detecting unit 201 is identical to that in the first embodiment.

The second detecting unit 202a, in cooperation with the driving unit 56, performs detection of the capacitance variation amount in the intersection grounding method.

At the time of detection of the capacitance variation amount in the intersection grounding method, the second detecting unit 202a detects the capacitance variation amount at the intersection between the selected X electrode 52 and the selected Y electrode 54 based on the detection signal obtained from the selected X electrode and information indicating the selected Y electrode, acquires the detection value corresponding to the capacitance variation amount, and outputs data indicating the acquired detection value.

The second detecting unit 202a also detects one or more touch points from the detection values acquired with regard to a plurality of intersections.

The second detecting unit 202a outputs data indicating the detected touch points.

The data obtained by the detection by the second detecting unit 202a is also stored in the memory 210.

The knob touch point determining unit 211a makes overall evaluation regarding the position of the touch point, based on the detection results of the touch point by the first detecting unit 201, and the detection results by the second detection unit 202a, e.g., the detection results of the touch points, and determines whether the touch points identified as a result of the overall determination include knob touch points.

For example, when the reliability of the information indicating the position of the touch point obtained from the first detecting unit 201 is low, or when no information indicating the position of the touch point is obtained from the first detecting unit 201, information indicating the position of the touch point obtained from the second detecting unit 202a may be used as the result of the overall determination.

Alternatively, only when the information indicating the touch point from the first detecting unit 201 and the information indicating the touch point from the second detecting unit 202a agree with each other, such information may be used as the result of the overall determination.

Furthermore, when the number of the touch points identified as a result of the above-mentioned overall determination is not smaller than three, the knob touch point determining unit 211a extracts, from the detection results of all the detected touch points, a combination of three touch points satisfying a predetermined condition, and recognizes the extracted combination of the touch points as the knob touch points.

The knob-finger contact determining unit 212a is similar to the knob-finger contact determining unit 212 in the first embodiment, but performs the knob-finger contact determination using the output of the second detecting unit 202a and the output of the knob touch point determining unit 211a, instead of the output of the second detecting unit 202 and the output of the knob touch point determining unit 211, as in the first embodiment.

For example, it is determined that a finger is in contact with the knob, if, with regard to at least one knob touch point among the three knob touch points recognized by the knob touch point determining unit 211a, an average or a total of the detection values of the capacitance variation amounts in the intersection grounding method pertaining to the region at the same position as the above-mentioned knob touch point (outputs of the second detecting unit 202a) is not smaller than a threshold value (knob-finger contact determination threshold value).

Here, each of the knob touch points may extend over a plurality of intersections, so that the region at the same position as the knob touch point may include a plurality of intersections.

"An average or a total of the detection values of the capacitance variation amounts" mentioned above means an average or a total pertaining to such a plurality of intersections.

As was explained in connection with the first embodiment, the position of the touch point can be detected with a high reliability from the detection results in the mutual capacitance method, whereas the reliability of the result of the determination as to whether a finger is in contact with the knob based on the detection results in the mutual capacitance method is relatively low.

On the other hand, from the detection results of the intersection grounding method explained with reference to FIGS. 17(a) to 17(d) and FIGS. 18(a) to 18(c), the determination as to whether a finger is in contact with the knob can be made with a high reliability, and information indicating the position of the touch point can also be obtained. Generally, the information of the position of the touch point obtained from the detection results in the intersection grounding method is of a lower reliability than the information of the position of the touch point obtained from the detection results in the mutual capacitance method. However, there are situations in which detection in the mutual capacitance method cannot yield but information of a relatively low reliability. In such situations, by additionally using the information of the position of the touch point obtained from the detection in the intersection grounding method, information concerning the position of the touch point with a higher reliability can be obtained.

That is, in the configuration shown in FIG. 19, the knob touch point determining unit 211a performs identification of the touch points using both of the detection results of the touch points by the first detecting unit 201, and the detection results of the touch points by the second detecting unit 202a, so that the reliability of the results of the identification of the touch points is improved.

Figure 20:
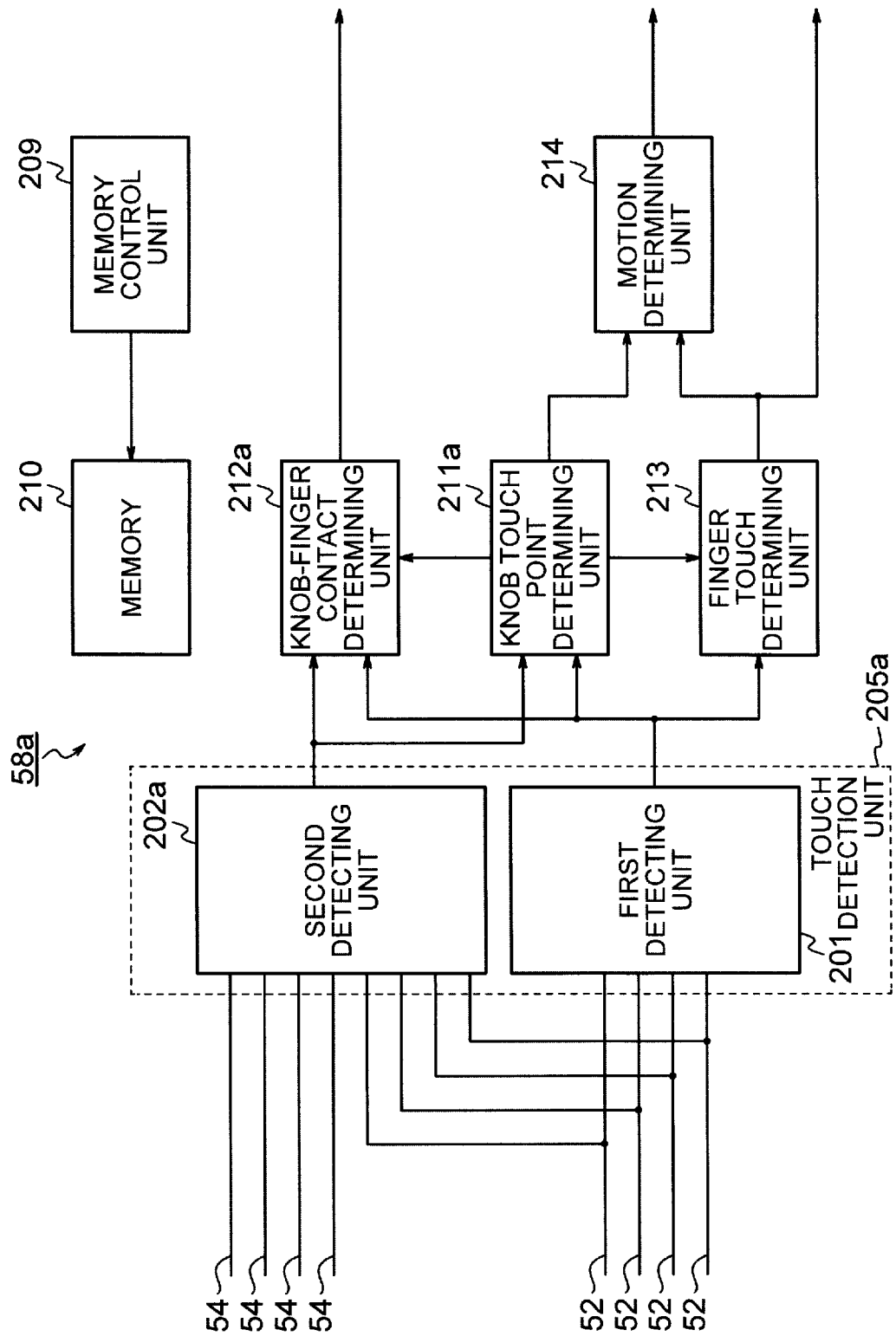
FIG. 20 is a block diagram showing a variation of the operation input processing unit used in the touch input device of the second embodiment.

FIG. 20 shows a variation of the operation input processing unit 58a used in the second embodiment.

In the operation input processing unit 58a shown in FIG. 20, the knob-finger contact determining unit 212a performs the knob-finger contact determination based, not only, on the data indicating the position of each knob touch point recognized by the knob touch point determining unit 211a, and the detection result (capacitance variation amount pertaining to each intersection) by the second detecting unit 202a, but also, on the detection result (capacitance variation amount pertaining to each intersection) by the first detecting unit 201.

For example, the knob-finger contact determination may be made using a weighted average of the capacitance variation amount pertaining to each intersection obtained by the second detecting unit 202a and the capacitance variation amount pertaining to the particular intersection (the same intersection) obtained by the first detecting unit 201, in place of the capacitance variation amount pertaining to the particular intersection (the same intersection) obtained by the second detecting unit 202a.

The weighted average may be calculated using a greater weight on the detection result of the higher reliability.

When the operation input processing unit 58a shown in FIG. 20 is used, the knob-finger contact determining unit 212a performs the knob-finger contact determination using both of the detection result by the first detecting unit 201 and the detection result by the second detecting unit 202a, so that the reliability of the result of the knob-finger contact determination is further improved.

It is possible to use the second detecting unit 202a explained in the second embodiment in combination with the first detecting unit 201a which performs the detection in the detection method described with reference to FIGS. 15(a) and 15(b) in the first embodiment. In such a case, the detection result by the second detecting unit 202a may be used for the identification of the knob touch point in the first detecting unit 201a.

Third Embodiment

In the first and second embodiments, by using the first detection method and the second detection method are used to improve the accuracy of the determination as to whether a finger is in contact with the knob improved, and it is possible to identify the position of the knob touch point (acquire the coordinates) even in a state in which the knob is placed on the touch panel 15, and no finger is in contact with the knob.

However, the detection signal obtained in the first detection method is relatively small (SN ratio is small), so that there are situations in which the accuracy of detection of the position of the knob touch point is not sufficient because of the effect of an external noise.

The third embodiment is to solve this problem. Specifically, it enables the sensitivity of detection in the first detection method to be raised when required.

Figure 21:
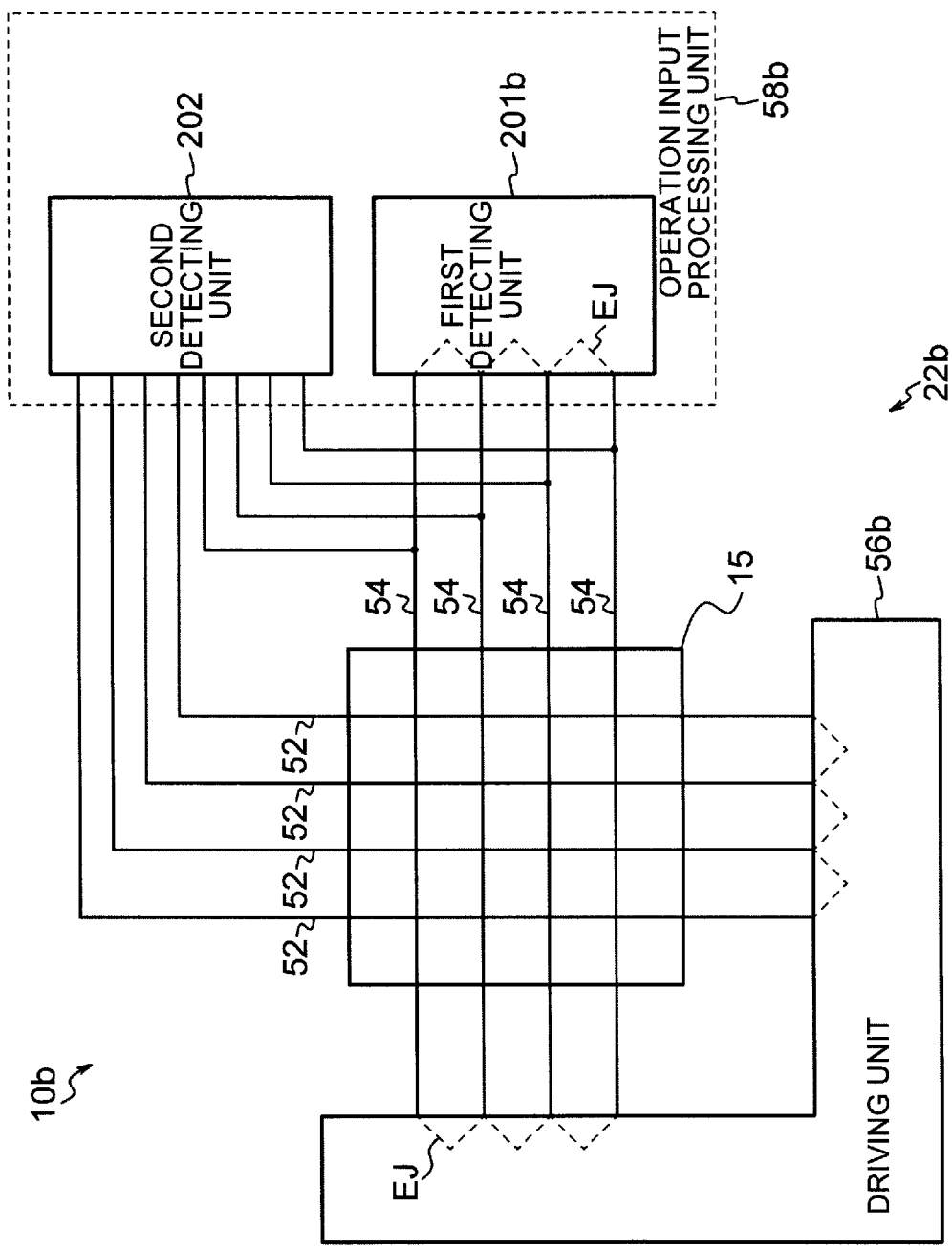
FIG. 21 is a schematic diagram showing a touch input device of a third embodiment of the present invention.

FIG. 21 shows a touch input device 10b used in the third embodiment.

The illustrated touch input device 10b includes a touch panel 15 and an input operation detecting device 22b.

The touch panel 15 used in the third embodiment is, for example, identical to the touch panel used in the first embodiment.

The input operation detecting device 22b is generally identical to the input operation detecting device 22 shown in FIG. 1, but includes a driving unit 56b and an operation input processing unit 58b, in place of the driving unit 56 and the operation input processing unit 58.

The operation input processing unit 58b is generally identical with the operation input processing unit 58 but includes a first detecting unit 201b in place of the first detecting unit 201. The first detecting unit 201b and the second detecting unit 202 in combination form a touch detection unit 205b. In FIG. 21, illustration of the constituent elements other than the first detecting unit 201b and the second detecting unit 202 is omitted.

The driving unit 56b is generally identical with the driving unit 56, but differs in the method of inputting the drive signal when detection is made in the first detection method.

That is, when the sensitivity is to be raised in performing the detection in the first detection method, the driving unit 56b interconnects a plurality of electrodes which are mutually consecutive to each other, e.g., each pair of electrodes adjacent to each other, as indicated by dotted lines EJ in FIG. 21, and applies a common drive signal. When the sensitivity is not to be raised, the driving unit 56b does not interconnect the mutually consecutive electrodes, and drives the individual electrodes separately. The operation in this case is identical to that of the driving unit 56 in the first embodiment.

When the sensitivity is to be raised, the first detecting unit 201b interconnects a plurality of mutually consecutive electrodes, e.g. each pair of mutually adjacent electrodes, as indicated by dotted lines EJ in FIG. 21, and performs a detection process using combinations of signals from the plurality of electrodes. When the sensitivity is not to be raised, the first detecting unit 201b performs a detection process using signals from the individual electrodes, without interconnecting the mutually consecutive electrodes. The operation in this case is identical to that of the first detecting unit 201 in the first embodiment.

The driving method of the driving unit 56b and the detection process in the second detecting unit 202 at the time of the detection in the second detection method are identical to those described in connection with the driving unit 56 and the second detecting unit 202 in the first embodiment.

Whether the sensitivity is to be raised or not in the driving by the driving unit 56b and in the detection by the first detecting unit 201b may be determined, for example, based on the result of the determination as to whether or not knob touch points have been detected by the knob touch point determining unit 211, or the result of the determination as to whether or not a finger is in contact with the knob, by the knob-finger contact determining unit 212.

As the method for raising the sensitivity, the following methods may be used in place of the above-described method.
(a) to enlarge the drive signal.
(b) to strengthen the coordinate filter.
(c) to sum the detection values obtained by a plurality of detections.
(d) to enlarge the amplification factor for the detection signal.

By adopting the above-described configuration, the accuracy of detection of the position of the knob touch point based on the detection results in the first detecting unit 201b can be improved. By having the second detecting unit 202 operate in the same way as in the first embodiment, it is possible to restrain the reduction in the coordinate resolution at the edge of the panel due to the interconnection of the electrodes, reduction in the tracking performance due to the increase in the detection time, increase in the power consumption, erroneous function due to static electricity, and the like.

So far, a configuration for raising the sensitivity of the first detecting unit has been described. The sensitivity of the second detecting unit may be raised. For example, the configuration may be such that by raising the sensitivity of the second detecting unit, a sufficient capacitance variation occurs by merely causing a hand to approach the case part 31 of the knob 30, so that the knob-finger contact determining unit 212 can detect the approach of a hand to the knob 30.

The third embodiment has been described as a modification of the first embodiment. A similar modification may be applied to the second embodiment.

Fourth Embodiment

In the first and third embodiments, the first detecting unit 201, 201b detects the capacitance variation amount in the mutual capacitance method, the knob touch point determining unit 211 identifies the knob touch point based on the detection results by the first detecting unit 201, 201b, the second detecting unit 202 detects the capacitance variation amount in the self capacitance method, and the knob-finger contact determining unit 212 determines whether or not a finger is in contact with the knob based on the detection result by the second detecting unit 202. In the second embodiment, the second detecting unit 202a detects the capacitance variation amount in the intersection grounding method in place of the self capacitance method, the knob touch point determining unit 211a identifies the knob touch point based on the detection result by the first detecting unit 201 and the detection result by the second detecting unit 202a, and the knob-finger contact determining unit 212a determines whether or not a finger is in contact with the knob based on the detection result by the second detecting unit 202a, or based on the detection result by the first detecting unit 201 and the detection result by the second detecting unit 202a.

In the fourth embodiment, a third detecting unit 203 performing detection in a third detection method is provided, and the result of detection by the third detecting unit 203 is used for the identification of the knob touch point or determination regarding the knob-finger contact. The detection result by the third detecting unit 203 is also stored in the memory 210, and used in other functional blocks.

Figure 22:
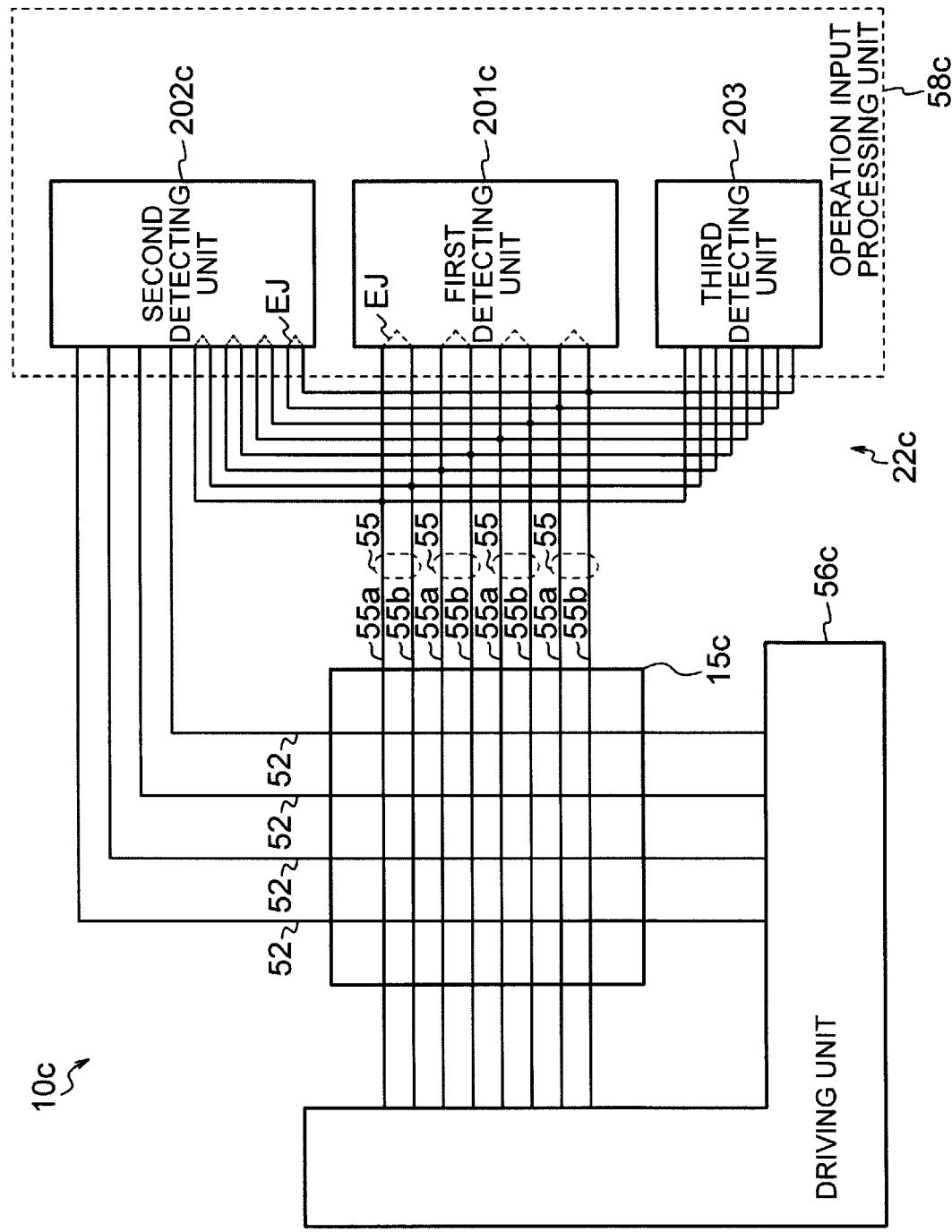
FIG. 22 is a schematic diagram showing a touch input device of a fourth embodiment of the present invention.
Figure 23:
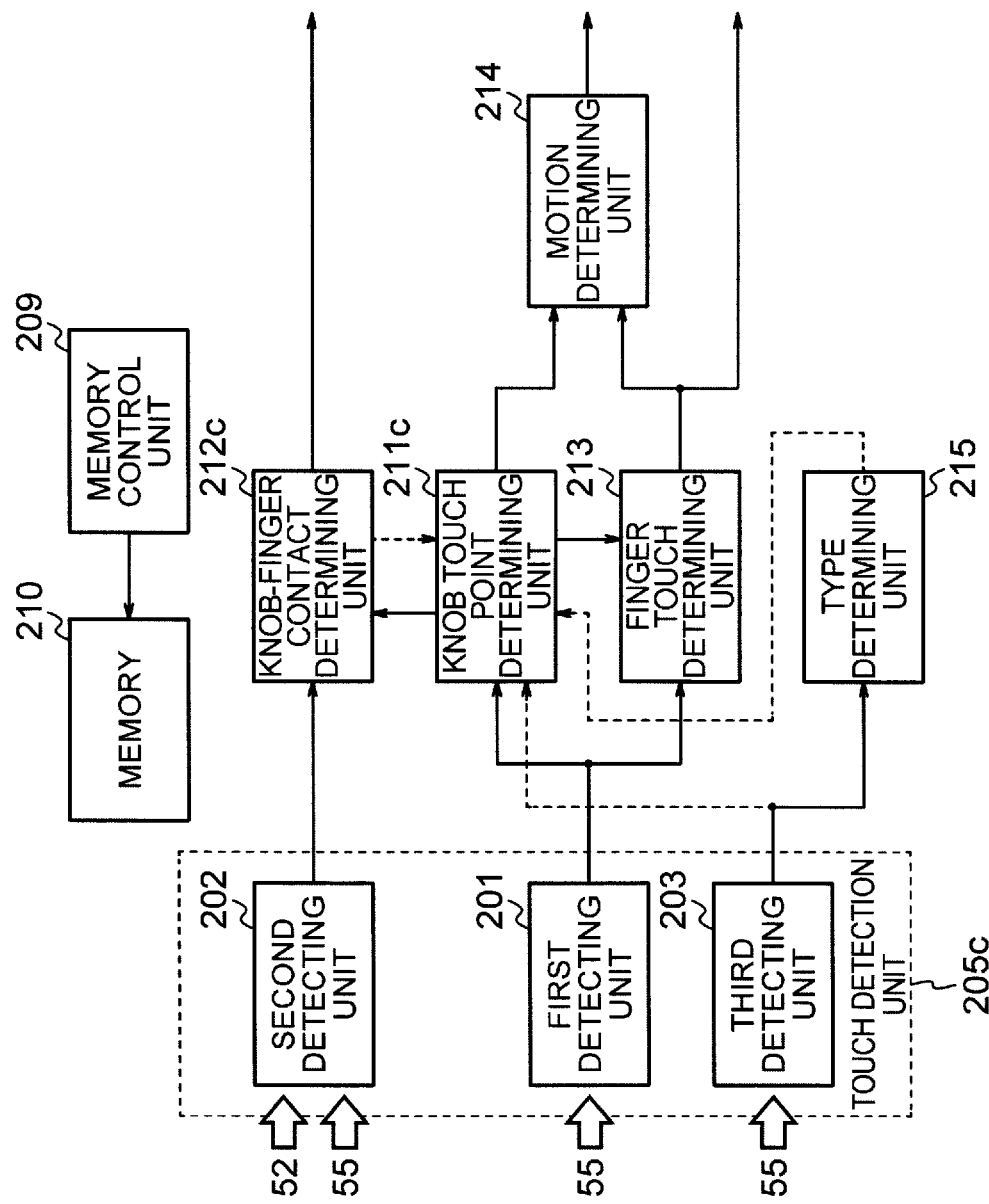
FIG. 23 is a block diagram showing an example of a configuration of the operation input processing unit shown in FIG. 22.

FIG. 22 shows a touch input device 10c used in the fourth embodiment. The illustrated touch input device 10c includes a touch panel 15c and an input operation detecting device 22c. The input operation detecting device 22c includes a driving unit 56c and an operation input processing unit 58c. FIG. 23 shows an example of a configuration of the operation input processing unit 58c in FIG. 22.

The operation input processing unit 58c shown in FIG. 22 and FIG. 23 is generally identical to the operation input processing unit 58 shown in FIG. 11, but includes a first detecting unit 201c, a second detecting unit 202c, a knob touch point determining unit 211c, and a knob-finger contact determining unit 212c in place of the first detecting unit 201, the second detecting unit 202, the knob touch point determining unit 211, and the knob-finger contact determining unit 212, and additionally includes a third detecting unit 203 and a type determining unit 215. The first detecting unit 201c, the second detecting unit 202c, and the third detecting unit 203 in combination form a touch detection unit 205c. In FIG. 22, only the first detecting unit 201c, the second detecting unit 202c and the third detecting unit 203 are illustrated, and illustration of other constituent elements of the operation input processing unit 58c is omitted.

Figure 24:
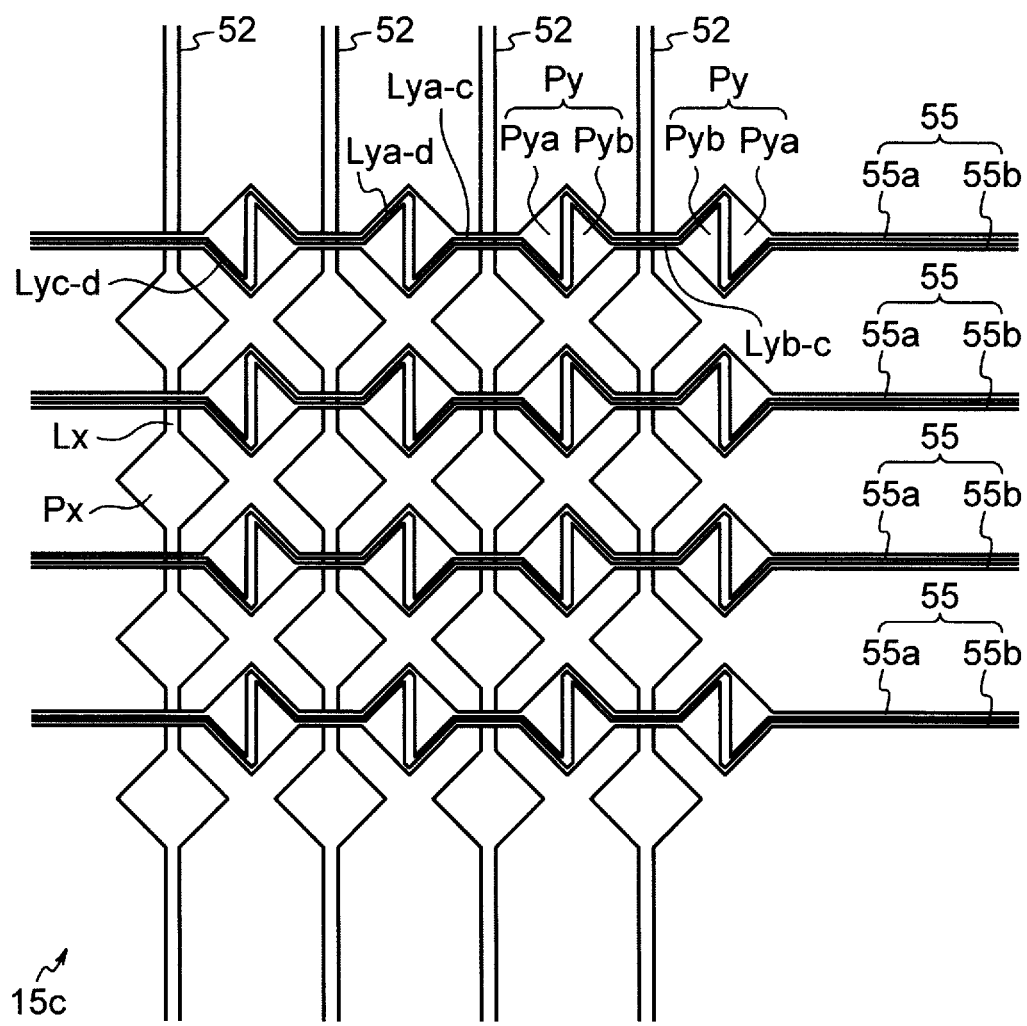
FIG. 24 shows a concrete example of shapes of the electrodes of the touch panel used in the fourth embodiment.

FIG. 24 shows a concrete example of shapes of the electrodes of the touch panel 15c used in the fourth embodiment.

The touch panel 15c shown in FIG. 24 includes a first group of electrodes (X electrodes) 52 and a second group of electrodes (Y electrodes) 55.

The X electrodes 52 are identical to the first group of electrodes 52 shown in FIG. 3.

Each of the Y electrodes 55 is divided into two parts 55a, 55b.

Each of the pads Py of each of the Y electrodes 55 is divided into two parts Pya, Pyb.

In the pad Py positioned to the right of the odd-numbered X electrodes 52 as counted from the left and positioned to the left of the even-numbered X electrodes 52 as counted from the left, the part Pya is positioned to the left and the part Pyb is positioned to the right.

In the pad Py positioned to the left of the odd-numbered X electrodes 52 as counted from the left and positioned to the right of the even-numbered X electrodes 52 as counted from the left, the part Pya is positioned to the right and the part Pyb is positioned to the left.

As a result, the part Pya is positioned closer than the part Pyb to the odd-numbered X electrode 52 as counted from the left, and the part Pyb is positioned closer than the part Pya to the even-numbered X electrode 52 as counted from the left.

The parts Pya of the plurality of pads Py of each of the Y electrodes 55 are connected by connecting parts Lya, and the parts Pyb of the plurality of pads Py of each of the Y electrodes 55 are connected by connecting parts Lyb.

The pad parts Pya on both sides of each odd-numbered X electrode 52 as counted from the left are connected by a connecting part Lya-c extending linearly, whereas the pad parts Pya on both sides of each even-numbered X electrode 52 are connected by a connecting part Lya-d extending to detour around the pad part Pyb.

The pad parts Pyb on both sides of each even-numbered X electrode 52 as counted from the left are connected by a connecting part Lyb-c extending linearly, whereas the pad parts Pyb on both sides of each odd-numbered X electrode 52 are connected by a connecting part Lyb-d extending to detour around the pad part Pya.

Incidentally, the connecting part Lya-d may be formed to pass below the pad part Pyb instead of detouring around the pad part Pyb, and the connecting part Lyb-d may be formed to pass below the pad part Pya instead of detouring around the pad part Pya.

At the time of detection in the first detection method and the second detection method, the two electrode parts 55a, 55b forming each of the electrodes 55 are connected together as indicated by a dotted line EJ in FIG. 22, and each combination of the two parts functions as one electrode.

That is, the driving unit 56c connects the two electrode parts 55a, 55b together, and applies the drive signal to them.

The first detecting unit 201c and the second detecting unit 202c connect the electrodes parts 55a, 55b together, and receive a detection signal from them.

At the time of detection in the third detection method, the driving unit 56c applies the drive signal to the X electrodes 52 sequentially, and the third detecting unit 203 receives separate detection signals from the two parts 55a, 55b of each of the Y electrodes 55.

The detection signals generated, by the application of the drive signal to one electrode 52, in the two parts 55a, 55b of each of the Y electrodes 55 intersecting the X electrode 52 to which the drive signal is applied will next be described with reference to FIGS. 25(a) and 25(b).

FIGS. 25(a) and 25(b) show electric fields generated in the neighborhood of the electrode 52 when a voltage is applied to the electrode 52. FIG. 25(a) shows a case in which a conductor Oc is in contact with the touch panel 15c, while FIG. 25(b) shows a case in which a non-conductor Od is in contact with the touch panel 15c.

In FIGS. 25(a) and 25(b), Px denotes one of the pads of the odd-numbered electrode 52 as counted from the left in FIG. 24. Pya, Pyb denote pad parts positioned to the right of such a pad Px. Electrostatic capacitances Ca, Cb are formed between the pad Px, and the pad parts Pya, Pyb. The greater the voltage applied to the electrode 52 is, and hence the stronger the electric field is, the greater the signals generated in the pad parts Pya, Pyb are.

The electrostatic capacitance Cb generated when a non-conductor Od is in contact as shown in FIG. 25(b) is greater than the electrostatic capacitance Cb generated when the conductor Oc is in contact as shown in FIG. 25(a). On the other hand, the electrostatic capacitance Ca does not differ much between when the conductor Oc is in contact, and the non-conductor Od is in contact. The detection signals generated in the pad parts Pya, Pyb vary depending on the magnitudes of these electrostatic capacitances Ca, Cb.

It is therefore possible to determine what is in contact with the touch panel at the intersection between each electrode 52 and the pair of the electrode parts 55a, 55b forming each electrode 55 is a conductor or a non-conductor, based on the detection signal generated in the pad part Pya and the detection signal generated in the pad part Pyb.

For example, the determination may be made as to whether what is in contact with the touch panel 15c at the intersection between each electrode 52 and the pair of electrode parts 55a, 55b forming each electrode 55 is a conductor or a non-conductor, based on the difference between the detection signal generated in the pad part Pya and the detection signal generated in the pad part Pyb.

By successively selecting the plurality of electrodes 52, accumulating information identifying whether what is in contact with the touch panel at the intersection between the selected electrode 52 and the pair of electrode parts 55a, 55b of each of the electrodes 55 is a conductor or a non-conductor, and synthesizing the accumulated information, the contour of the part formed of a conductor and the contour of the part formed of a non-conductor can be identified. If, for example, the non-conductor is of a cylindrical shape, its diameter can be identified.

Furthermore, with regard to a knob comprising a part formed of a conductor and a part formed of a non-conductor, it is possible to identify the contour of the part formed of a conductor and the contour of the part formed of a non-conductor. It is also possible to identify the type of the knob from the information concerning the contour.

The type determining unit 215 shown in FIG. 23 identifies the type of the knob from the information concerning the contour from the third detecting unit 203.

By using the information obtained in the manner described above (contour of the conductor part, contour of the non-conductor part, type of the knob), the knob touch point determining unit 211c can perform the identification of the position of the knob touch point, with a higher accuracy or with a higher certainty (with a higher reliability).

By using the information obtained in the manner described above (contour of the conductor part, contour of the non-conductor part, type of the knob), the knob-finger contact determining unit 212c can make the determination as to whether or not a finger is in contact with the knob more accurately, or with a higher certainty (with a higher reliability).

Incidentally, when the third detecting unit 203 performs the detection in the manner described with reference to FIG. 22 to FIG. 25, because the strength of the electrostatic field is changed when a human finger touches the knob, the reliability of the determination as to whether the touch panel is touched by a conductor or a non-conductor at the intersection of each electrode 52 and a pair of electrode parts forming each electrode 55 may be lowered, and accordingly, the accuracy of detection of the position of the contour of the part formed of a conductor and the contour of the part formed of a nonconductor may be lowered. For example, the accuracy of detection of the position of the knob touch point may be lowered.

Therefore, the detection results obtained by the detection by the third detecting unit 203 while the knob is not found to be contacted by a finger by the knob-finger contact determining unit 212c may be used for the identification of the contour of the part formed of a conductor and the contour of the part formed of a non-conductor. For example, information obtained by detection by the third detecting unit 203 while the knob is not found to be contacted by a finger by the knob-finger contact determining unit 212c may be stored in the memory 210, and the stored information may be used for the identification of the position of the knob touch point by the knob touch point determining unit 211c.

Also, based on the detection results by the first detecting unit 201c, the position (coordinates) of the touch point (knob touch point) by the operation member identified by the knob touch point determining unit 211c, and the position (coordinates) of the operation member identified by the third detecting unit 203 may be stored in the memory 210, when the position has varied with the lapse of time, it may be estimated that the position of the operation member of the knob has changed, and the detection by the second detecting unit 202 and the knob-finger contact determination by the knob-finger contact determining unit 212 may be carried out.

With such an arrangement, the frequencies of the detection by the second detecting unit 202 and the determination by the knob-finger contact determining unit 212 can be lowered.

Fifth Embodiment

In the third detection method used in the fourth embodiment, the electrodes 52 and combinations of electrode parts 55a, 55b are used to determine whether a conductor or a nonconductor is in contact with the touch panel at the intersection between each electrode 55 and each pair of electrode parts 55a, 55b from the detection signal generated responsive to the drive signal.

In contrast, in the fifth embodiment, the frequency of the drive signal (voltage signal) applied to the electrode is changed (swept) over a wide range, and, the frequency characteristic of the impedance of the knob in contact with the touch panel is measured based on the detection signal (current signal) obtained from the same electrode.

Figure 26:
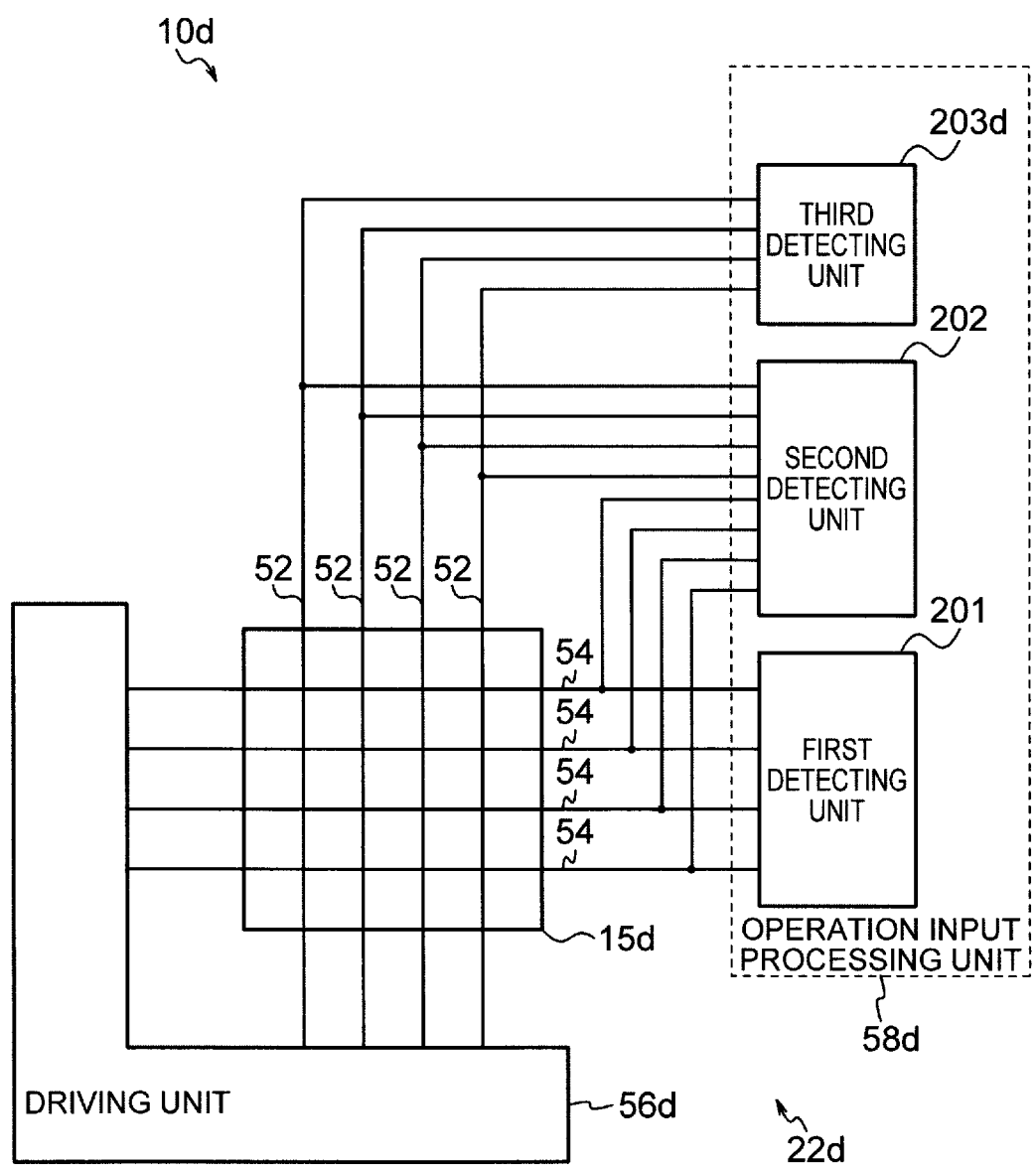
FIG. 26 is a schematic view showing a touch input device of a fifth embodiment of the present invention.
Figure 27:
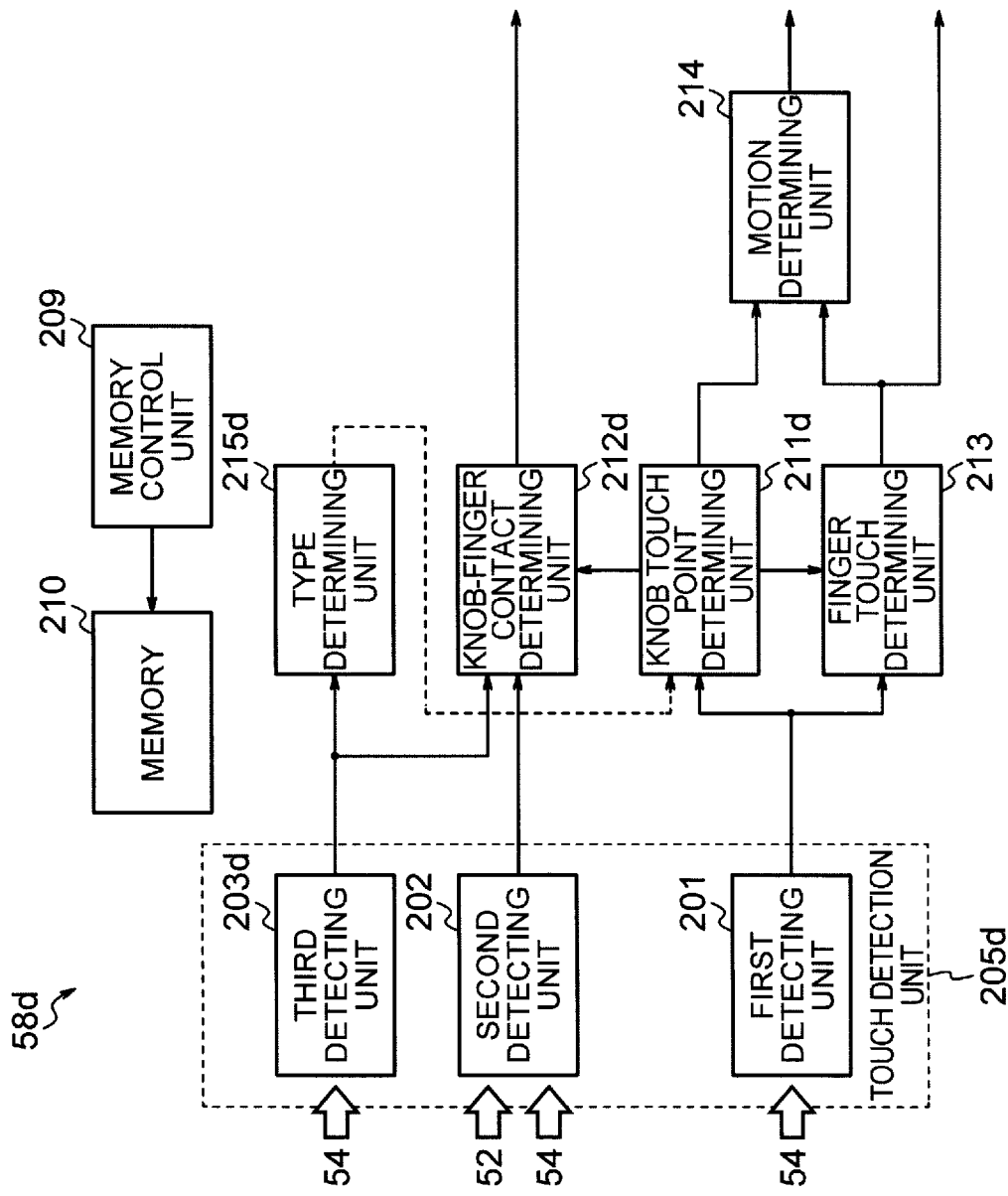
FIG. 27 is a block diagram showing an example of a configuration of the operation input processing unit shown in FIG. 26.

FIG. 26 shows a touch input device 10d used in the fifth embodiment. The touch input device 10d includes a touch panel 15d, and an input operation detecting device 22d. The input operation detecting device 22d includes a driving unit 56d and an operation input processing unit 58d. FIG. 27 shows an example of a configuration of the operation input processing unit 58d in FIG. 26.

The operation input processing unit 58d shown in FIG. 26 and FIG. 27 is generally identical to the operation input processing unit 58c shown in FIG. 22 and FIG. 23, but, in place of the first detecting unit 201c and the second detecting unit 202c, a first detecting unit 201 and a second detecting unit 202 are provided, and in place of the third detecting unit 203, a third detecting unit 203d is provided. The first detecting unit 201 and the second detecting unit 202 may be the same as those described in the first embodiment. The first detecting unit 201, the second detecting unit 202, and the third detecting unit 203d in combination form a touch detection unit 205d. In FIG. 26, illustration of the constituent elements of the operation input processing unit 58d, other than the first detecting unit 201, the second detecting unit 202, and the third detecting unit 203d is omitted.

Figure 25:
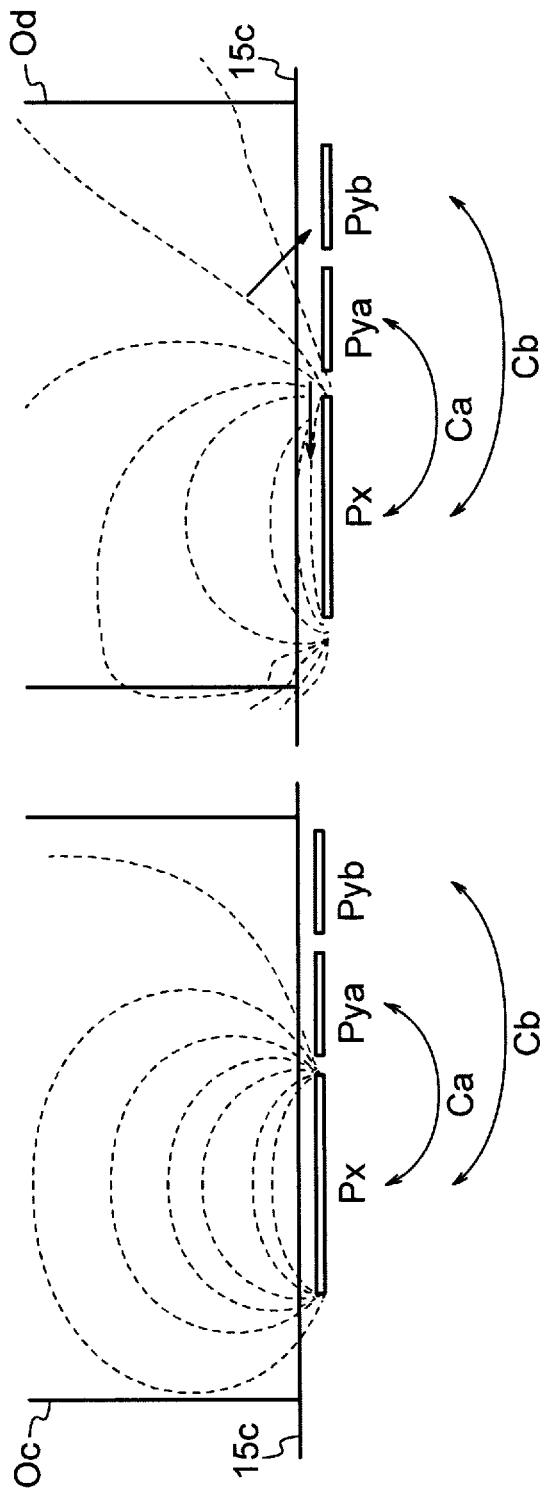
FIGS. 25(a) and 25(b) are diagrams showing an electric field generated in the vicinity of an electrode shown in FIG. 24 when a voltage is applied to the electrode.

The touch panel 15d used in the fifth embodiment may, for example, be the same as the touch panel described with reference to FIG. 1 and FIG. 3 in the first embodiment, or the touch panel described with reference to FIG. 22, FIG. 24 and FIG. 25 in the fourth embodiment. In the following description, it is assumed to be the same as the touch panel described with reference to FIG. 1 and FIG. 3 in the first embodiment.

In the detection in the third detection method, the driving unit 56d applies a drive signal (voltage signal) to all the X electrodes 52, and changes (sweeps) the frequency of the drive signal with the lapse of time.

The third detecting unit 203d receives the detection signal (current signal) appearing at the X electrode 52, stores the amplitude for each frequency, and acquires the frequency characteristic of the detection signal.

The frequency characteristic obtained in this way reflects the frequency characteristic of the impedance of the object in contact with the touch panel 15d, so that the process of acquiring the frequency characteristic of the detection signal can also be said to be a process of acquiring the frequency characteristic of the impedance of the object in contact with the touch panel 15d.

The frequency characteristic of the impedance obtained in this way differs depending on the kind, and the state of the object (Non-patent reference 1).

In the fifth embodiment, the frequency characteristic of the impedance of the knob in contact with the touch panel 15d is measured, and, from the results of the measurement, the type determining unit 215d can identify the type of the knob, and the knob-finger contact determining unit 212d can estimate the state of the knob.

In connection with the knob 30 on the touch panel 15d (the knob being of a certain type or of a certain configuration), different frequency characteristics are obtained between:
(a) a case in which no finger is in contact with the knob,
(b) a case in which one finger is in contact with the knob, and
(c) a case in which the knob is grasped.

Figure 28:
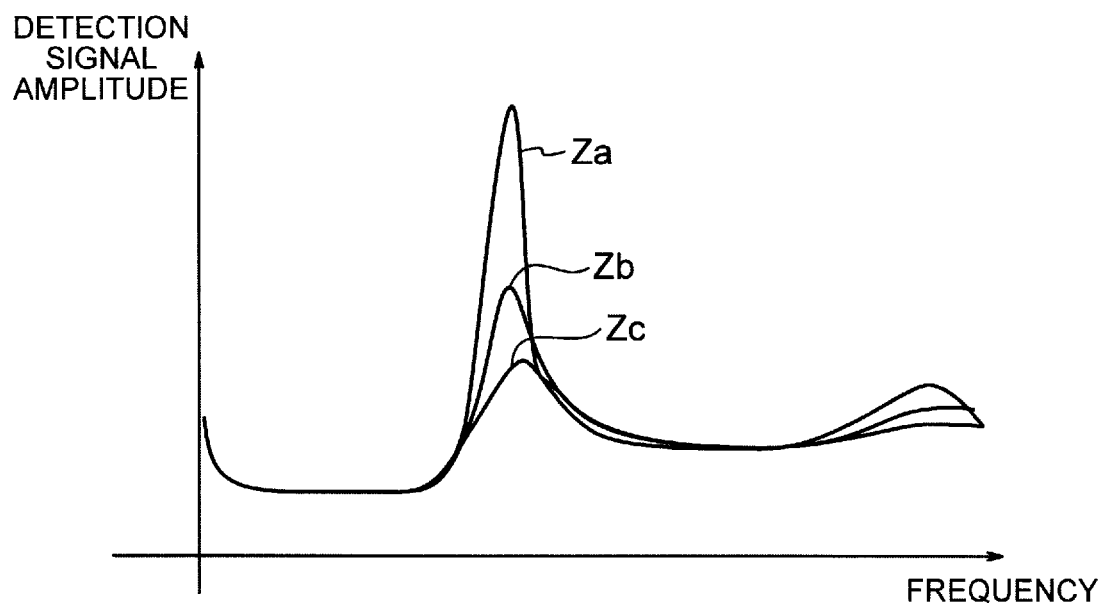
FIG. 28 is a diagram showing an example of a frequency characteristic of the detection signal obtained by a third detecting unit shown in FIG. 27.

In FIG. 28, the curves Za, Zb, Zc respectively indicate examples of frequency characteristics of the detection signal obtained for the above-mentioned cases (a), (b), (c).

By utilizing the fact that the frequency characteristic differs depending on the state of the knob, it is possible to identify the state of the knob, i.e., to discriminate between the states (a), (b) and (c) mentioned above, from the frequency characteristic obtained by the measurement by means of the third detecting unit 203d.

That is, based on the frequency characteristic obtained by the measurement by means of the third detecting unit 203d, the detection result by means of the knob touch point determining unit 211, and the detection result by means of the second detecting unit 202, the knob-finger contact determining unit 212d determines which of the above-mentioned states (a), (b) and (c) the knob 30 of which the knob touch point has been detected by the knob touch point determining unit 211 is in.

In a situation in which any of a plurality of types of the knob 30 may be placed on the touch panel 15, the type determining unit 215d may be adapted to identify the type of the knob 30 which is placed, from the frequency characteristic obtained by the measurement by the third detecting unit 203d. Moreover, where the number and the arrangement (relative positional relation) of the operation members differ depending on the type of the knob 30, information indicating the number and the arrangement of the operation members may be stored in the memory 210 for each type of the knob 30, and the knob touch point determining unit 211c may read, from the memory 210, the information indicating the number and the arrangement of the operation members pertaining to the type identified by the type determining unit 215d, and may use the information for the identification of the positions of the touch points by the operation members.

Incidentally, depending on the constitution of the user using the knob 30, the garment the user is wearing, the sweating rate, and the like, the frequency characteristic of the impedance obtained by the measurement by means of the third detecting unit 203d may vary, so that the relation between the frequency characteristic obtained and the state of the knob 30 may also change.

However, when the operation for rotating the knob 30 is made, it is probable that the knob is grasped, and, otherwise, it is probable that just one finger is used.

Therefore, by measuring the frequency characteristic periodically, and acquiring the information indicating the state of the knob 30 at the time of the measurement, and accumulating the measured frequency characteristic and the acquired information, it is possible to estimate the relation between the frequency characteristic and the state of the knob 30.

For example, the frequency characteristic obtained by the third detecting unit 203d when the motion determining unit 214 senses the rotation of the knob, may be stored in the memory 210, as the frequency characteristic at the time when the knob is grasped. When, in a subsequent measurement of the frequency characteristic, a frequency characteristic identical or similar to the frequency characteristic stored in the memory 210 is obtained, it may be determined that the knob is grasped.

Incidentally, the motion determining unit 214 may be adapted to sense the rotation of the knob, based, for example, on the history of the position of the knob touch points identified by the knob touch point determining unit 211d, in a manner similar to that explained in the first embodiment.

By adding the third detecting unit 203d and the type determining unit 215d as in the fifth embodiment, and using the knob-finger contact determining unit 212d capable of determining whether just one finger is in contact with the knob, or the knob is grasped, it becomes possible to improve the accuracy of detection of the positions of the knob touch points, and to make more detailed discrimination on the state of contact of a finger or fingers with the knob 30.

Sixth Embodiment

As has been described, detection is made in the first and second detection methods in the first to third embodiments, while detection is made also in the third detection method in the fourth and fifth embodiments.

As will be apparent from the description of the fourth and fifth embodiments, more than one type of the knob may be used for input operation on the touch panel, and it may be desired to cope with the input operation by means of various knobs.

Moreover, there is a possibility that, in addition to the knobs of the types or configurations which are known today, knobs of new types or configurations may be developed and come to be used in the future.

For example, the number, the shape, and the material of the operation members of the knob may be changed.

Similar consideration may be necessary on the stylus pens.

Moreover, there may be a situation in which, depending on the type or configuration of the knob, the above-described combination of the above detection methods cannot accurately identify the state of the knob, and it may become necessary to alter the combination of the detection methods for each type or configuration of the knob. The sixth embodiment has been devised in preparation for such a situation.

Figure 29:
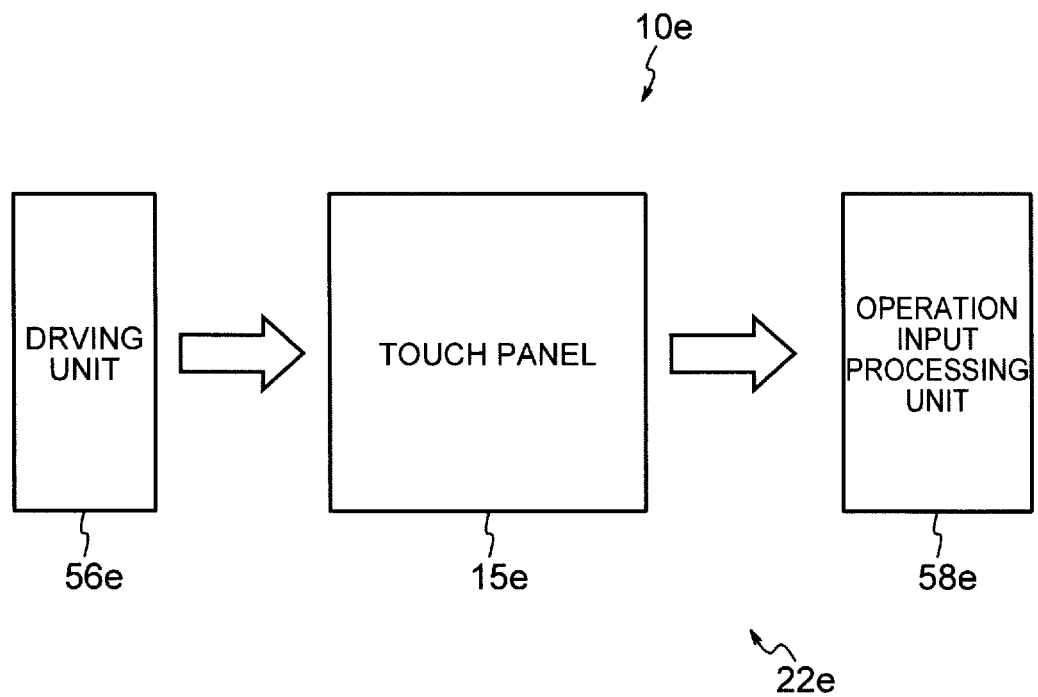
FIG. 29 is a schematic diagram showing a touch input device of a sixth embodiment of the present invention.

FIG. 29 shows a touch input device 10e of the sixth embodiment. The touch input device 10d includes a touch panel 15e and an input operation detecting device 22e. The input operation detecting device 22e includes a driving unit 56e and an operation input processing unit 58e.

Figure 30:
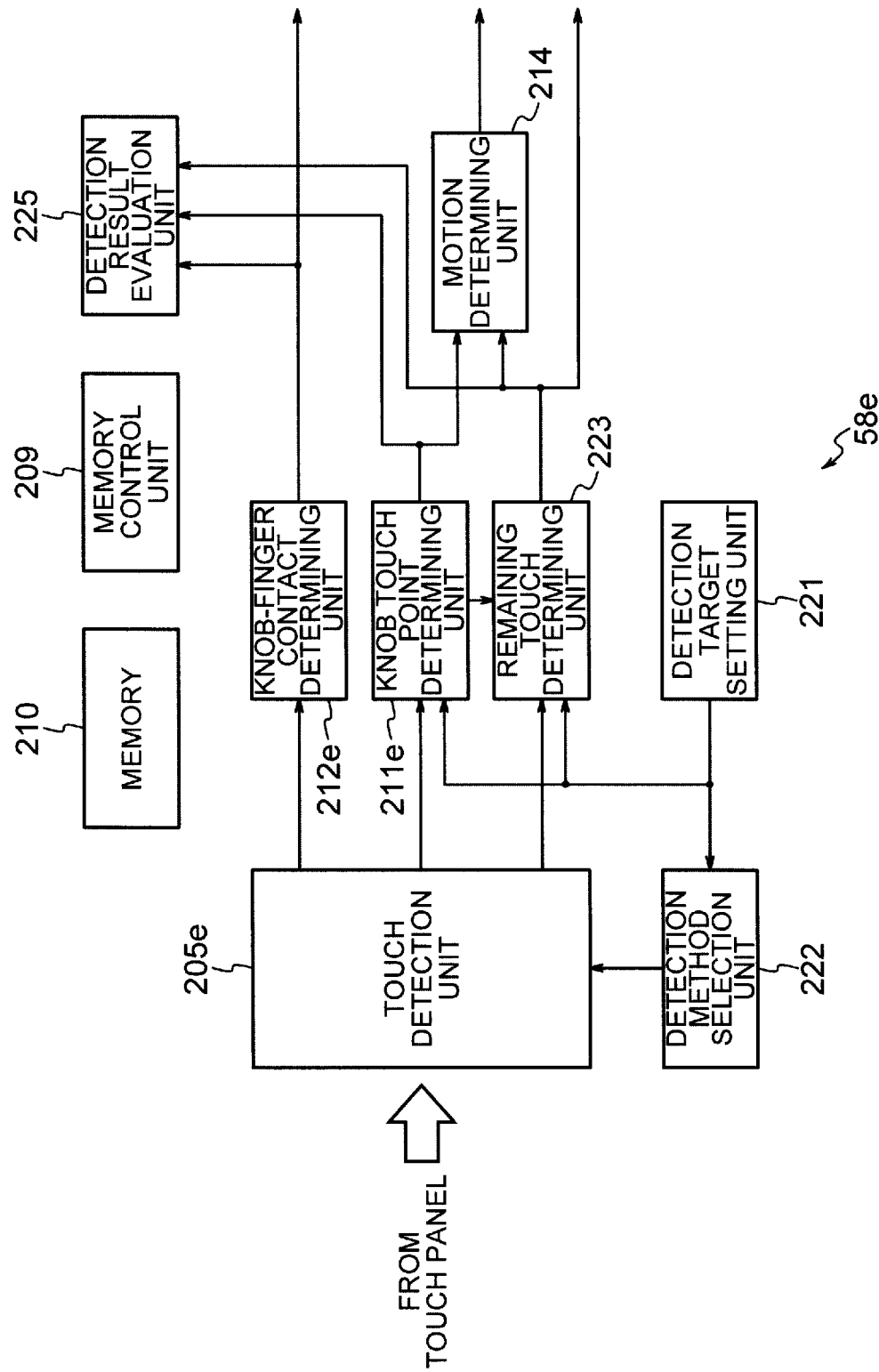
FIG. 30 is a block diagram showing an example of a configuration of an operation input processing unit shown in FIG. 29.

FIG. 30 shows an example of a configuration of the operation input processing unit 58e in FIG. 29.

The operation input processing unit 58e shown in FIG. 30 includes a touch detection unit 205e, a memory control unit 209, a memory 210, a knob touch point determining unit 211e, a knob-finger contact determining unit 212e, a detection target setting unit 221, a detection method selection unit 222, a remaining touch determining unit 223, a motion determining unit 214, and an evaluation unit 225.

The touch panel 15 may be identical to the touch panel 15 used in the first to third, and fifth embodiments, or the touch panel 15c used in the fourth embodiment, or may be one of these touch panels, with additional functions.

The touch detection unit 205e can perform detection, in cooperation with the driving unit 56e, in any of a plurality of detection methods. The plurality of detection methods include the first detection method and the second detection method explained in the first to third embodiments. The plurality of detection methods may additionally include at least one of the third detection method explained in the fourth embodiment, and the third detection method explained in the fifth embodiment.

The detection target setting unit 221 sequentially selects a plurality of detection targets included in a list of detection targets prepared in advance, and sets the selected detection target. The detection targets include, for example, the operation member of the knob, a stylus pen, a finger, and water.

The detection method selection unit 222 selects one or more detection methods among the plurality of detection methods in which the touch detection unit 205e can perform detection. In this selection, all the detection methods which have a possibility of being effective in the detection of the detection target set by the detection target setting unit 221 may be selected, or, alternatively, only such detection methods which are considered to be optimum for the detection of each detection target may be selected.

The touch detection unit 205*e* performs detection in one or more detection methods selected by the detection method selection unit 222.

When the knob is selected as the detection target, the knob touch point determining unit 211*e* identifies the position of the knob touch point, based on the detection result by the touch detection unit 205*e*.

When the knob is selected as the target, it is determined whether a finger is in contact with the knob, based on the information on the position of the knob touch point identified by the knob touch point determining unit 211*e*, and the detection result by the touch detection unit 205*e*.

The remaining touch determining unit 223 receives the determination result by the knob touch point determining unit 211*e*, and the detection result by the touch detection unit 205*e*, and, when a detection target other than the knob is selected, determines whether the selected target is in contact with (or attached to) the touch panel. By performing such determination for the detection targets other than the knob, it is possible, for example, to determine whether the touch point other than the knob touch point is one due to contact of a stylus pen with the touch panel, one due to contact of a finger with the touch panel, or one due to attachment of water to the touch panel.

The evaluation unit 225 performs evaluation of the detection result by the touch detection unit 205*e*, the result of determination by the knob touch point determining unit 211*e*, the result of determination by the knob-finger contact determining unit 212*e*, the result of determination by the remaining touch determining unit 223, and the result of determination by the motion determining unit 214, and outputs the results of the evaluation.

In this evaluation, the detection sensitivity with regard to each detection target, the accuracy (coordinate accuracy) of detection of the position of the knob touch point, the accuracy of determination as to whether a finger is in contact with the knob, and the accuracy of determination regarding a stylus pen, a finger, and water, and the like are determined.

The memory control unit 209 causes the detection result by the touch detection unit 205*e*, and the evaluation result determined by the evaluation unit 225 for each detection result, to be recorded in the memory 210.

The memory control unit 209 also causes the detection method used for the detection, together with the detection result and the evaluation result, to be recorded in the memory 210.

The above-mentioned selection of the detection method by the detection method selection unit 222 may be performed based on the detection result and the evaluation result for each detection result accumulated in the memory 210.

In connection each of the detection targets, its features are stored in advance in the memory 210. For example, the impedance, the dielectric constant, the number of contact points, the area of contact are stored in the form of a table, as shown in FIG. 32.

The memory 210 also stores the detection result and the evaluation result for each of the detection targets. For example, the detection method, the optimum detection method, the sensitivity value, the sensitivity value at the time of contact by a finger, and the coordinate accuracy are stored in the form of a table, as shown in FIG. 33.

As the detection method, all the detection methods which have a possibility of being effective in the detection of the particular detection target are stored.

As the optimum detection method, the detection method considered to be optimum for the detection of the particular detection target is stored. The optimum detection method may be one determined in advance, or one which has come to be found optimum because of the good result of detection having been obtained.

As the sensitivity value, the ratio of the received signal between when the particular detection target is in contact with the touch panel, and when it is not in contact with the touch panel is stored.

As the sensitivity value at the time of contact by a finger, the ratio of the received signal between when a finger is in contact with the knob in contact with the touch panel, and when no finger is in contact with such a knob is stored.

As the coordinate accuracy, the accuracy of detection of the position at which the particular detection target is in contact is stored.

Next, a procedure of the processes in the input operation detecting device 22*e* shown in FIG. 29 is explained with reference to FIG. 31.

In step ST31, the detection target setting unit 221 selects one detection target from the list of detection targets. The detection targets include the knob, a finger, a stylus pen, and water.

In step ST32, the detection method selection unit 222 selects one of the plurality of detection methods based on the detection result and the evaluation result in the past (history of the detection result and the evaluation result) recorded in the memory 210.

In step ST33, the touch detection unit 205*e*, in cooperation with the driving unit 56*e*, performs detection in the detection method selected in step ST32, and the memory control unit 209 stores the acquired detection result in the memory 210.

The processes in step ST31 to step ST33 are repeated by which all the detection targets are sequentially selected, and all the detection methods which have a possibility of being effective in the detection of the selected detection target are sequentially selected. Alternatively, only such a detection method which is considered to be optimum for each detection target may be used.

For each detection target, all the detection methods which have a possibility of being effective in the detection and the detection method which is considered to be optimum for the detection are stored in the memory 210. In step ST32, the selection of the detection method is performed by referring to the memory 210.

The optimum detection method may be the one determined in advance, or the one for which a good result has been obtained in the detection.

In the latter case, the column for the optimum detection method may be empty, before the process of FIG. 31 is performed. When the process of FIG. 31 is performed for the first time, the detection methods which have a possibility of being effective are all selected in turn.

Once the optimum detection method has been determined (after the optimum detection method is written in the table of FIG. 33), the execution of the step ST3*l* to step ST33 can be limited to the optimum detection method for each detection target.

In step ST34, the knob touch point determining unit 211*d* identifies the knob touch point from the recorded detection values.

This process can, for example, be performed in the same manner as in the first embodiment.

Alternatively, the knob touch point may be identified using the detection results in a plurality of detection methods. For example, the detection result in the first detection method (mutual capacitance method) explained in the first embodiment, and the detection result in the method of additionally detecting the non-conductor explained with reference to FIG. 25 may be combined by weighing, or the like, and used for the determination.

In step ST35, the knob-finger contact determining unit 212e determines whether a finger is in contact with the knob, based on the detection value obtained by the touch detection unit 205e (for example, the detection value obtained in the second detection method in the first embodiment), and the information indicating the knob touch point outputted from the knob touch point determining unit 211e, as in the first embodiment.

In step ST36, the remaining touch determining unit 223 determines whether a finger is in contact with the touch panel, a stylus pen is in contact with the touch panel, or water is attached to the touch panel, using the detection value obtained by detection by the touch detection unit 205e, with regard to the remaining touch points, which have not been identified as the knob touch point by the knob touch point determining unit 211e.

For example, in the case of attachment of water, a capacitance value corresponding to the area of the part where water is attached is obtained from the detection result in the first detection method (mutual capacitance method) explained in the first embodiment. Attachment of water which is not grounded is hardly detected, and attachment of water which is grounded, and contact by a finger or a stylus pen with the touch panel can be detected, from the detection result in the second detection method (the self capacitance method in which the neighboring electrodes are made to have the same potential as the driven electrode) explained in the first embodiment.

By using the detection results in the plurality of detection methods, it is possible to detect attachment of water in the mutual capacitance method, and to detect contact of a finger or a stylus pen in the self capacitance method.

In step ST37, the evaluation unit 225 calculates the detection sensitivity of the detection target set by the detection target setting unit 221. As the detection sensitivity, the ratio (S/N) of the magnitude of the received signal between the case in which the detection target is in contact and the case in which it is not in contact may be calculated.

Also, for the detection target other than a finger, the ratio of the magnitude of the received signal between a case in which a finger is in contact with the detection target and a case in which a finger is not in contact may be calculated.

Furthermore, the detection accuracy of the position (errors in the detection coordinates) obtained when a specific detection method is used may be calculated.

Also, a touch operation may be performed at a designated position using a robot arm, for example, and the error of the touch position detected by the touch input device 10e from the designated position may be calculated.

The above operation may be performed for a plurality of designated positions, and an average, a variance, and the like of the errors may be calculated.

Such a process may be performed before the shipment of the touch input device, and the result of the measurement may be stored in the memory 210.

The evaluation unit 225 makes overall evaluation on the detection results in the plurality of detection methods, and results of determination based on the detection results, determines which combination of the detection methods yields the best result, and causes the memory 210 to store the best combination of the detection methods, i.e., the optimum detection method for each detection target. For example, it is recorded as the item of the optimum detection method in the table shown in FIG. 33.

In step ST38, the evaluation unit 225 adjusts one or more of the determination criteria, the determination threshold values (threshold values used for the determination), and the like, used by the knob touch point determining unit 211d, the knob-finger contact determining unit 212c, and the remaining touch determining unit 223, based on the results of evaluation.

The adjustment of the determination criteria, the determination threshold values, and the like, and the optimization of the combination of the detection methods may be performed by machine learning.

In this case, the evaluation unit 225 may use the detection results obtained in the detection method selected by the detection method selection unit 222 as input values, use the determination results of the knob touch point by the knob touch point determining unit 211d, the knob-finger contact determination result by the knob-finger contact determining unit 212d, and the touch determination result by the remaining touch determining unit 223, as output values, and use the detection result and the determination result when the object actually in contact with the touch panel 15 is known as the teaching signals.

In the machine learning, a CNN (Convolution Neural Network), an LSTM (Long Short-Term Memory), and the like may be used.

Also, in addition to the optimization of the combination of the detection methods by machine learning, a weak learner, such as a random forest, may be prepared using, as feature values, the detection method selected by the detection method selection unit 222, and the magnitude, the frequency, and the like of the drive signal used for the detection, and a search may be performed for the detection method which has a higher contribution in improving the performance of the detection result.

Also, a search may be performed for the method by which the detection target can be correctly identified by a combination of a smaller number of detection methods.

In the sixth embodiment, optimization of the combination of the methods for detecting the electrostatic capacitance, impedance, and the like by means of the touch panel 15 has been described.

In the circumstance in which there can be various combinations of the knobs and other objects of various shapes, which may be in contact or in proximity, by evaluating the detection method suitable for the detection of the operation members of the knob and objects other than the knobs, and adjusting the detection methods based on the results of the evaluation, the accuracy of the knob detection can be improved.

Also, the process of determining the combination of the detection methods, or the decision on the determination criteria, the determination threshold values, and the like for each detection method may be performed, not manually, but automatically by machine learning, and it is possible to save the labor required for the determination of the processes and the like.

Also in this machine learning, the detection results obtained in the detection method selected by the detection method selection unit 222 may be used as input values, the knob touch point determination result by the knob touch point determining unit 211d, the knob-finger contact determination result by the knob-finger contact determining unit 212d, and the touch determination result by the remaining touch determining unit 223 may be used as output values, and the detection results and the determination results when the object actually in contact with the touch panel 15 is known may be used as teaching signals.

Incidentally, the above-mentioned inputs and outputs may not necessarily be ones obtained by actual measurement, but ones obtained by physical simulation.

Part or the entirety of the control device 20 explained in the first to sixth embodiments can be formed of processing circuitry.

The processing circuitry may be formed of hardware or software, i.e., a programmed computer.

Figure 34:
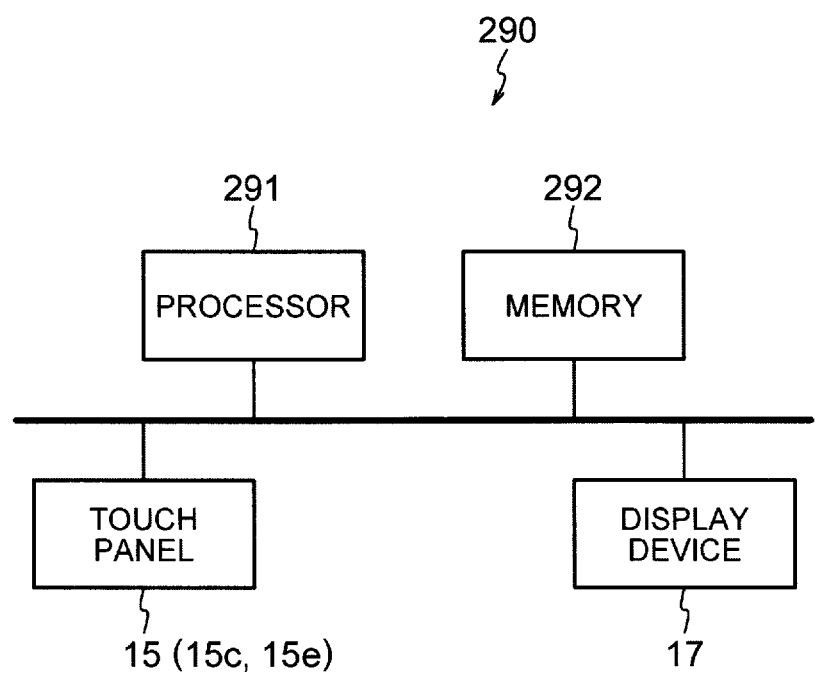
FIG. 34 is a diagram showing an example of a configuration of a computer constituting the control device.

When the control device 20 is formed of a programmed computer, a configuration of the processing circuitry 290 is for example as shown in FIG. 34.

In the illustrated example, the processing circuitry 290 includes a processor 291 and a memory 292.

The memory 292 stores a program for implementing the functions of various parts of the control device 20.

The memory 292 also serves as the memory 210 in the control device 20.

The processor 291 may be formed of a CPU (Central Processing Unit), a GPU (Graphics Processing Unit), a microprocessor, a microcontroller, a DSP (Digital Signal Processor), or the like.

The memory 292 may be in the form of a semiconductor memory such as a RAM (Random Access Memory), a ROM (Read Only Memory), a flash memory, an EPROM (Erasable Programmable Read Only Memory), or an EEPROM (Electrically Erasable Programmable Read Only Memory), or in the form of a magnetic disk, an optical disk, or a magneto-optical disk.

The processor 291 reads and executes the program stored in the memory 292, thereby implementing the functions of the control device 20.

The processor 291 executes the functions of the control device 20 (the control device having the input operation detecting device 22 in the first embodiment, the control device similar to the control device of the first embodiment with the operation input processing unit 58 replaced with the operation input processing unit 58a in the second embodiment, the control device having the driving unit 56b and the operation input processing unit 58b in the third embodiment, the control device having the driving unit 56c and the operation input processing unit 58c in the fourth embodiment, the control device having the driving unit 56d and, the operation input processing unit 58d in the fifth embodiment, or the control device having the driving unit 56e and the operation input processing unit 58e in the sixth embodiment).

So far, the present invention has been described as a touch input device. The touch input method implemented by the touch input device also forms part of the present invention. A program for causing a computer to execute the processes in the touch input device or the touch input method, and a computer-readable recording medium in which the program is recorded also form part of the present invention.

What is claimed is:

1. A touch panel input device including:
    a touch panel;
    a knob configured to be placed on the touch panel for input operation, and a touch operation being performed by means of said knob or an operation object other than said knob; and
    processing circuitry
    to detect the touch operation on said touch panel in a first detection method and a second detection method which are different from each other;
    the first detection method being capable of providing a result of detection enabling determination as to whether a conductor is in contact with or in proximity to said touch panel without regard to whether the conductor is grounded or not,
    the second detection method being capable of providing a result of detection enabling determination as to whether a grounded conductor is in contact with or in proximity to said touch panel,
    to identify a position where the touch operation is performed by said knob as a knob touch point, based on the result of detection in said first detection method,
    to output touch information concerning said knob touch point; and
    to determine whether a finger is in contact with said knob, based on said touch information, and the result of detection in said second detection method, wherein,
    touch points which consist of one or more response points at which an electrostatic capacitance variation satisfying a predetermined condition has occurred in the detection in said first detection method, and which satisfy a predetermined condition are identified as said knob touch points.

2. The touch panel input device as set forth in claim 1, wherein
    said touch panel includes a first group of electrodes extending at different positions in a first direction, in a second direction perpendicular to said first direction; and a second group of electrodes extending at different positions in said second direction, in said first direction.

3. The touch panel input device as set forth in claim 2, wherein said processing circuitry
    acquires a detection value corresponding to an amount of variation of an electrostatic capacitance at each of intersections between said first group of electrodes and said second group of electrodes, in the detection in said first detection method; and
    acquires a detection value corresponding to an amount of variation of an electrostatic capacitance on each of said first group of electrodes and said second group of electrodes, in the detection in said second detection method.

4. The touch panel input device as set forth in claim 1, wherein
    said knob has two or more conductive operation members, and
    said processing circuitry detects positions where said operation members have contacted or approached said touch panel, as the position where the touch operation is performed by said knob.

5. The touch panel input device as set forth in claim 4, wherein said processing circuitry
    senses variation of the electrostatic capacitance due to contact or approach of the conductor with or to said touch panel, in the detection in said first detection method, and
    senses variation of the electrostatic capacitance due to contact or approach of the grounded conductor with or to said touch panel in the detection in said second detection method.

6. The touch panel input device as set forth in claim 5, wherein
    said conductor is said operation member, and said grounded conductor is said operation member of said knob with which a human finger is in contact.

7. The touch panel input device as set forth in claim 1, wherein
said processing circuitry adjusts sensitivity in the detection in said first detection method, based on a result of determination as to whether a finger is in contact with said knob.

8. The touch panel input device as set forth in claim 1, wherein said processing circuitry
detects said touch operation also in a third detection method different from said first detection method and said second detection method, and
identifies the position of said knob touch point also using a result of detection in said third detection method.

9. The touch panel input device as set forth in claim 8, wherein
said processing circuitry uses the result of detection in said third detection method obtained when said processing circuitry determines that a finger is not in contact with said knob, for the identification of the position of said knob touch point.

10. The touch panel input device as set forth in claim 8, wherein said processing circuitry
makes determination on motion of said knob based on the result of detection in said first detection method, and
stores the result of detection in said third detection method obtained when said processing circuitry determines that said knob is rotating,
said processing circuitry determines that said knob is grasped by a hand when the result of detection in said third detection method is identical or similar to the stored result of detection.

11. The touch panel input device as set forth in claim 1, wherein
said processing circuitry identifies the position where the touch operation is performed by said knob as the knob touch point, based not only on the result of detection in said first detection method, but also on the result of detection in said second detection method, and outputs the touch information concerning said knob touch point.

12. The touch panel input device as set forth in claim 11, wherein said processing circuitry determines whether a finger is in contact with said knob, based not only on said touch information and the result of detection in said second detection method, but also on the result of detection in said first detection method.

13. The touch panel input device as set forth in claim 1, wherein said processing circuitry
sequentially selects two or more detection methods among a plurality of detection methods including said first detection method and said second detection method,
detects contact or approach of a detection target with or to said touch panel in each of the sequentially selected detection methods, and
performs at least one of identification of said detection target and determination of a state of said detection target.

14. The touch panel input device as set forth in claim 13, wherein
said processing circuitry determines a combination of two or more detection methods, which can detect and discriminate any of the plurality of detection targets which have a possibility of contacting or approaching said touch panel, from a history of the result of detection in each of said plurality of detection methods, and sequentially selects the two or more detection methods forming the combination having been determined.

15. The touch panel input device as set forth in claim 14, wherein
said plurality of detection targets include said knob, and
said processing circuitry adjusts, by machine learning, a method of determining the knob touch point and a method of determining whether a finger is in contact with said knob.

16. The touch panel input device as set forth in claim 15, wherein said processing circuitry performs said machine learning
using the results of detection in said plurality of detection methods, as input values,
using the result of identification of the position of the knob touch point, and the result of determination as to whether a finger is in contact with said knob, as output values, and
using said results of detection and said result of determination when the detection target which is actually in contact with or in proximity to the touch panel is known, as teaching signals.

17. A touch panel input device including:
a touch panel;
a knob configured to be placed on the touch panel for input operation, and a touch operation being performed by means of said knob or an operation object other than said knob; and
processing circuitry
to detect the touch operation on said touch panel in a first detection method and a second detection method which are different from each other;
to identify a position where the touch operation is performed by said knob as a knob touch point, based on a result of detection in said first detection method,
to output touch information concerning said knob touch point; and
to determine whether a finger is in contact with said knob, based on said touch information, and a result of detection in said second detection method, wherein,
touch points which consist of one or more response points at which an electrostatic capacitance variation satisfying a predetermined condition has occurred in the detection in said first detection method, and which satisfy a predetermined condition are identified as said knob touch points;
wherein said touch panel includes a first group of electrodes extending at different positions in a first direction, in a second direction perpendicular to said first direction; and a second group of electrodes extending at different positions in said second direction, in said first direction;
wherein said processing circuitry
acquires a detection value corresponding to an amount of variation of an electrostatic capacitance at each of intersections between said first group of electrodes and said second group of electrodes, in the detection in said first detection method; and
acquires a detection value corresponding to an amount of variation of an electrostatic capacitance on each of said first group of electrodes and said second group of electrodes, in the detection in said second detection method;
wherein
in the detection in said first detection method, said processing circuitry detects, as the response point, an intersection where variation of the electrostatic capacitance not smaller than a threshold value is detected, and detects a region formed of one or more mutually consecutive response points, as the touch point, and said processing circuitry determines that the touch point, among said touch points, which satisfies the predetermined condition, as said knob touch point.

18. The touch panel input device as set forth in claim 17, wherein, when said processing circuitry determines that there are one or more response points at positions different from said knob touch point, said processing circuitry alters the method of determining whether a finger is in contact with said knob, depending on the positions of the response points different from said knob touch point.

19. The touch panel input device as set forth in claim 17, wherein said processing circuitry uses the detection value obtained, in the detection in said second detection method, by the electrode, among said first group of electrodes, which is at the same position in said first direction as said knob touch point, for the determination as to whether a finger is in contact with said knob, and uses the detection value obtained, in the detection in said second detection method, by the electrode, among said second group of electrodes, which is at the same position in said second direction as said knob touch point, for the determination as to whether a finger is in contact with said knob.

20. The touch panel input device as set forth in claim 17, wherein when one or more response points at positions different from the identified knob touch point are at the positions aligned in said first direction with said knob touch point, said processing circuitry does not use the detection value obtained by the electrode, among said first group of electrodes, which is at a position in said first direction different from said knob touch point, for the determination as to whether a finger is in contact with said knob, in said second detection method, and when one or more response points at positions different from the identified knob touch point are at positions aligned in said second direction with said knob touch point, said processing circuitry does not use the detection value obtained by the electrodes, among said second group of electrodes, which is at a position in said second direction different from said knob touch point, for the determination as to whether a finger is in contact with said knob, in said second detection method.

21. The touch panel input device as set forth in claim 17, wherein when one or more response points at positions different from the identified knob touch point are at positions aligned in said first direction or at positions aligned in said second direction with said knob touch point, said processing circuitry performs the determination as to whether a finger is in contact with said knob based on the result of detection in said first detection method.

22. The touch panel input device as set forth in claim 17, wherein when one or more response points at positions different from the identified knob touch point are at positions aligned in said first direction or at positions aligned in said second direction with said knob touch point, at least one of output of a result of determination as to whether a finger is in contact with said knob, and output of the touch information concerning said knob touch point is not performed.

23. The touch panel input device as set forth in claim 17, wherein when a response point at a position different from the identified knob touch point is at an edge of said touch panel, said processing circuitry determines whether a finger is in contact with said knob based on a temporal change of the result of detection in said second detection method.

24. The touch panel input device as set forth in claim 23, wherein when said processing circuitry cannot identify said knob touch point, or the reliability of a result of identification of said knob touch point by said processing circuitry is low, said processing circuitry does not output said touch information until said processing circuitry determines that a finger is in contact with said knob, based on the result of detection in said second detection method.

25. A touch panel input device including:

a touch panel;

a knob configured to be placed on the touch panel for input operation, and a touch operation being performed by means of said knob or an operation object other than said knob; and processing circuitry to detect the touch operation on said touch panel in a first detection method and a second detection method which are different from each other;

to identify a position where the touch operation is performed by said knob as a knob touch point, based on a result of detection in said first detection method, to output touch information concerning said knob touch point; and to determine whether a finger is in contact with said knob, based on said touch information, and a result of detection in said second detection method, wherein, touch points which consist of one or more response points at which an electrostatic capacitance variation satisfying a predetermined condition has occurred in the detection in said first detection method, and which satisfy a predetermined condition are identified as said knob touch points;

wherein said processing circuitry stores information indicating the position of the knob touch point identified when said processing circuitry determines that a finger is in contact with said knob, and when said processing circuitry cannot identify said knob touch point, said processing circuitry determines whether a finger is in contact with said knob, using the stored information indicating the position of said knob touch point.

26. A touch panel input method including:

detecting a touch operation by means of a knob or an operation object other than said knob, on the touch panel on which the knob for input operation can be placed, in a first detection method and a second detection method which are different from each other, the first detection method being capable of providing a result of detection enabling determination as to whether a conductor is in contact with or in proximity to said touch panel without regard to whether the conductor is grounded or not, the second detection method being capable of providing a result of detection enabling determination as to whether a grounded conductor is in contact with or in proximity to said touch panel, identifying the position where the touch operation has been performed by said knob, as a knob touch point, based on a result of detection in said first detection method, and outputting touch information concerning said knob touch point, and determining whether a finger is in contact with said knob, based on said touch information and a result of detection in said second detection method, wherein, touch points which consist of one or more response points at which an electrostatic capacitance variation satisfying a predetermined condition has occurred in the detection in said first detection method, and which satisfy a predetermined condition are identified as said knob touch points.

27. A computer-readable recording medium in which a program for causing a computer to execute the processes in the touch panel input method as set forth in claim 26 is recorded.

\* \* \* \* \*